(12) United States Patent
Shattil

(10) Patent No.: US 11,646,929 B1
(45) Date of Patent: *May 9, 2023

(54) SPREADING AND PRECODING IN OFDM

(71) Applicant: Genghiscomm Holdings, LLC, Boulder, CO (US)

(72) Inventor: Steve Shattil, Cheyenne, WY (US)

(73) Assignee: Genghiscomm Holdings, LLC, Boulder, CO (US)

( * ) Notice: Subject to any disclaimer, the term of this patent is extended or adjusted under 35 U.S.C. 154(b) by 166 days.

This patent is subject to a terminal disclaimer.

(21) Appl. No.: 17/329,141

(22) Filed: May 25, 2021

Related U.S. Application Data

(60) Continuation of application No. 16/864,709, filed on May 1, 2020, now Pat. No. 11,018,917, which is a
(Continued)

(51) Int. Cl.
*H04L 27/26* (2006.01)
*H04B 7/024* (2017.01)
(Continued)

(52) U.S. Cl.
CPC ......... *H04L 27/2628* (2013.01); *H04B 7/024* (2013.01); *H04B 7/026* (2013.01); *H04B 7/0452* (2013.01); *H04B 7/0456* (2013.01); *H04B 7/0617* (2013.01); *H04B 7/0697* (2013.01); *H04J 11/0093* (2013.01); *H04J 13/0003* (2013.01); *H04J 13/004* (2013.01); *H04J 13/12* (2013.01); *H04L 5/0007* (2013.01);
(Continued)

(58) Field of Classification Search
None
See application file for complete search history.

(56) References Cited

U.S. PATENT DOCUMENTS

| 4,164,714 A | 8/1979 | Swanson |
| 4,471,399 A | 9/1984 | Udren |

(Continued)

FOREIGN PATENT DOCUMENTS

| EP | 2763321 A1 | 8/2014 |
| EP | 2449690 B1 | 1/2016 |

(Continued)

OTHER PUBLICATIONS

D.A. Wiegandt, C.R. Nassar; "Higher-Speed, Higher-Performance 802.11a Wireless LAN via Carrier-Interferometry Orthogonal Frequency Division Multiplexing"; 2002 IEEE International Conference on Communications. Conference Proceedings. ICC 2002 (Cat. No. 02CH37333). Apr. 28-May 2, 2002.
(Continued)

*Primary Examiner* — Diane L Lo
(74) *Attorney, Agent, or Firm* — Steven J Shattil

(57) ABSTRACT

A user equipment (UE) in a wireless network employs orthogonal polyphase codes for encoding data symbols to generate a set of coded data symbols, which are modulated onto Orthogonal Frequency Division Multiplex (OFDM) subcarrier frequencies assigned for use by the UE, and the resulting OFDM signal is transmitted to a base station in the wireless network. The orthogonal polyphase codes include pairs of orthogonal polyphase codes that are complex conjugates of each other.

27 Claims, 14 Drawing Sheets

Related U.S. Application Data continuation of application No. 16/199,221, filed on Nov. 26, 2018, now Pat. No. 10,644,916, which is a continuation of application No. 16/027,191, filed on Jul. 3, 2018, now Pat. No. 10,574,497, which is a continuation of application No. 15/642,850, filed on Jul. 6, 2017, now Pat. No. 10,015,034, which is a continuation of application No. 15/489,664, filed on Apr. 17, 2017, now Pat. No. 9,800,448, which is a continuation of application No. 15/149,382, filed on May 9, 2016, now Pat. No. 9,628,231, which is a continuation-in-part of application No. 14/727,769, filed on Jun. 1, 2015, now Pat. No. 11,201,644, said application No. 16/864,709 is a continuation of application No. 14/727,769, filed on Jun. 1, 2015, now Pat. No. 11,201,644, which is a continuation of application No. 14/276,309, filed on May 13, 2014, now Pat. No. 9,048,897, which is a continuation of application No. 12/545,572, filed on Aug. 21, 2009, now Pat. No. 8,750,264, which is a division of application No. 11/187,107, filed on Jul. 22, 2005, now Pat. No. 8,670,390.

(60) Provisional application No. 60/598,187, filed on Aug. 2, 2004.

(51) Int. Cl.
| | |
|---|---|
| *H04B 7/026* | (2017.01) |
| *H04B 7/0452* | (2017.01) |
| *H04B 7/0456* | (2017.01) |
| *H04B 7/06* | (2006.01) |
| *H04J 11/00* | (2006.01) |
| *H04J 13/00* | (2011.01) |
| *H04J 13/12* | (2011.01) |
| *H04L 5/00* | (2006.01) |
| *H04L 12/28* | (2006.01) |
| *H04L 41/0226* | (2022.01) |
| *H04L 45/24* | (2022.01) |
| *H04L 47/10* | (2022.01) |
| *H04W 52/42* | (2009.01) |
| *H04B 7/185* | (2006.01) |
| *H04W 84/18* | (2009.01) |
| *H04W 88/02* | (2009.01) |
| *H04W 72/21* | (2023.01) |
| *H04W 72/044* | (2023.01) |

(52) U.S. Cl.
CPC ........ *H04L 5/0035* (2013.01); *H04L 12/2854* (2013.01); *H04L 27/2602* (2013.01); *H04L 27/2614* (2013.01); *H04L 27/2633* (2013.01); *H04L 41/0226* (2013.01); *H04L 45/24* (2013.01); *H04L 47/10* (2013.01); *H04W 52/42* (2013.01); *H04W 72/21* (2023.01); *H04B 7/0626* (2013.01); *H04B 7/18506* (2013.01); *H04L 5/0021* (2013.01); *H04L 5/0023* (2013.01); *H04L 5/0037* (2013.01); *H04L 5/0073* (2013.01); *H04L 27/2601* (2013.01); *H04W 72/046* (2013.01); *H04W 84/18* (2013.01); *H04W 88/02* (2013.01)

(56) References Cited

U.S. PATENT DOCUMENTS

| | | |
|---|---|---|
| 4,479,226 A | 10/1984 | Prabhu et al. |
| 4,550,402 A | 10/1985 | Gable et al. |
| 4,590,511 A | 5/1986 | Bocchi et al. |
| 4,628,517 A | 12/1986 | Schwarz |
| 4,700,341 A | 10/1987 | Huang |
| 4,827,480 A | 5/1989 | Kowalski |
| 4,901,307 A | 2/1990 | Gilhousen et al. |
| 4,912,422 A | 3/1990 | Kobayashi et al. |
| 4,943,973 A | 7/1990 | Werner |
| 5,003,545 A | 3/1991 | Kowalski |
| 5,016,242 A | 5/1991 | Tang |
| 5,093,863 A | 3/1992 | Galand et al. |
| 5,125,100 A | 6/1992 | Katznelson |
| 5,191,459 A | 3/1993 | Thompson et al. |
| 5,249,201 A | 9/1993 | Posner et al. |
| 5,282,222 A | 1/1994 | Fattouche et al. |
| 5,309,514 A | 5/1994 | Johnson et al. |
| 5,406,551 A | 4/1995 | Saito et al. |
| 5,410,538 A | 4/1995 | Roche et al. |
| 5,412,648 A | 5/1995 | Fan |
| 5,422,952 A | 6/1995 | Kennedy et al. |
| 5,425,049 A | 6/1995 | Dent et al. |
| 5,457,557 A | 10/1995 | Zarem et al. |
| 5,463,376 A | 10/1995 | Stoffer |
| 5,491,727 A | 2/1996 | Petit |
| 5,500,856 A | 3/1996 | Nagase et al. |
| 5,504,775 A | 4/1996 | Chouly et al. |
| 5,504,783 A | 4/1996 | Tomisato et al. |
| 5,519,692 A | 5/1996 | Hershey |
| 5,521,937 A | 5/1996 | Kondo et al. |
| 5,528,581 A | 6/1996 | De Bot |
| 5,533,012 A | 7/1996 | Fukasawa et al. |
| 5,543,806 A | 8/1996 | Wilkinson |
| 5,548,582 A | 8/1996 | Brajal et al. |
| 5,555,268 A | 9/1996 | Fattouche et al. |
| 5,563,906 A | 10/1996 | Hershey et al. |
| 5,579,304 A | 11/1996 | Sugimoto et al. |
| 5,612,978 A | 3/1997 | Blanchard et al. |
| 5,630,154 A | 5/1997 | Bolstad et al. |
| 5,640,698 A | 6/1997 | Shen et al. |
| 5,691,832 A | 11/1997 | Liedenbaum et al. |
| 5,694,393 A | 12/1997 | Kaye |
| 5,704,013 A | 12/1997 | Watari et al. |
| 5,712,716 A | 1/1998 | Vanoli et al. |
| 5,765,097 A | 6/1998 | Dail |
| 5,790,516 A | 8/1998 | Gudmundson et al. |
| 5,793,413 A | 8/1998 | Hylton et al. |
| 5,793,759 A | 8/1998 | Rakib et al. |
| 5,809,426 A | 9/1998 | Radojevic et al. |
| 5,815,801 A | 9/1998 | Hamalainen et al. |
| 5,818,619 A | 10/1998 | Medved et al. |
| 5,822,368 A | 10/1998 | Wang |
| 5,828,658 A | 10/1998 | Ottersten et al. |
| 5,831,977 A | 11/1998 | Dent |
| 5,838,268 A | 11/1998 | Frenkel et al. |
| 5,844,951 A | 12/1998 | Proakis et al. |
| 5,862,189 A | 1/1999 | Huisken et al. |
| 5,931,893 A | 8/1999 | Dent et al. |
| 5,940,196 A | 8/1999 | Piehler et al. |
| 5,940,379 A | 8/1999 | Startup et al. |
| 5,943,322 A | 8/1999 | Mayor et al. |
| 5,943,332 A | 8/1999 | Liu et al. |
| 5,949,796 A | 9/1999 | Kumar |
| 5,955,983 A | 9/1999 | Li |
| 5,955,992 A | 9/1999 | Shattil |
| 5,960,032 A | 9/1999 | Letaief et al. |
| 5,991,334 A | 11/1999 | Papadopoulos et al. |
| 6,008,760 A | 12/1999 | Shattil |
| 6,018,317 A | 1/2000 | Dogan et al. |
| 6,047,190 A | 4/2000 | Haleem et al. |
| 6,055,432 A | 4/2000 | Haleem et al. |
| 6,058,105 A | 5/2000 | Hochwald |
| 6,075,812 A | 6/2000 | Cafarella et al. |
| 6,084,871 A | 7/2000 | Engstrom et al. |
| 6,088,351 A | 7/2000 | Jenkin et al. |
| 6,091,967 A | 7/2000 | Kruys et al. |
| 6,097,712 A | 8/2000 | Secord et al. |
| 6,097,773 A | 8/2000 | Carter et al. |
| 6,107,954 A | 8/2000 | Li |
| 6,122,295 A | 9/2000 | Kato et al. |
| 6,128,276 A | 10/2000 | Agee |
| 6,128,350 A | 10/2000 | Shastri et al. |

(56) References Cited

U.S. PATENT DOCUMENTS

| | | |
|---|---|---|
| 6,130,918 A | 10/2000 | Humphrey et al. |
| 6,141,393 A | 10/2000 | Thomas et al. |
| RE36,944 E | 11/2000 | Li |
| 6,144,711 A | 11/2000 | Raleigh et al. |
| 6,154,443 A | 11/2000 | Huang et al. |
| 6,175,550 B1 | 1/2001 | van Nee et al. |
| 6,175,551 B1 | 1/2001 | Awater et al. |
| 6,178,158 B1 | 1/2001 | Suzuki et al. |
| 6,188,717 B1 | 2/2001 | Kaiser et al. |
| 6,192,068 B1 | 2/2001 | Fattouche et al. |
| 6,208,295 B1 | 3/2001 | Dogan et al. |
| 6,211,671 B1 | 4/2001 | Shattil |
| 6,215,983 B1 | 4/2001 | Dogan et al. |
| 6,233,248 B1 | 5/2001 | Sautter et al. |
| 6,236,642 B1 | 5/2001 | Shaffer et al. |
| 6,240,129 B1 | 5/2001 | Reusens et al. |
| 6,243,565 B1 | 6/2001 | Smith et al. |
| 6,243,581 B1 | 6/2001 | Jawanda |
| 6,252,909 B1 | 6/2001 | Tzannes et al. |
| 6,266,702 B1 | 7/2001 | Darnell et al. |
| 6,282,167 B1 | 8/2001 | Michon et al. |
| 6,282,185 B1 | 8/2001 | Hakkinen et al. |
| 6,289,220 B1 | 9/2001 | Spear |
| 6,292,473 B1 | 9/2001 | Duske et al. |
| 6,301,221 B1 | 10/2001 | Paterson |
| 6,307,892 B1 | 10/2001 | Jones et al. |
| 6,310,704 B1 | 10/2001 | Dogan et al. |
| 6,320,897 B1 | 11/2001 | Fattouche et al. |
| 6,331,837 B1 | 12/2001 | Shattil |
| 6,348,791 B2 | 2/2002 | Shattil |
| 6,351,499 B1 | 2/2002 | Paulraj et al. |
| 6,359,923 B1 | 3/2002 | Agee et al. |
| 6,377,566 B1 | 4/2002 | Cupo et al. |
| 6,389,034 B1 | 5/2002 | Guo et al. |
| 6,405,147 B1 | 6/2002 | Fera |
| 6,418,136 B1 | 7/2002 | Naor et al. |
| 6,421,528 B1 | 7/2002 | Rosen et al. |
| 6,434,390 B2 | 8/2002 | Rahman |
| 6,438,173 B1 | 8/2002 | Stantchev et al. |
| 6,442,130 B1 | 8/2002 | Jones, IV et al. |
| 6,442,193 B1 | 8/2002 | Hirsch |
| 6,442,222 B1 | 8/2002 | Ghazi-Moghadam et al. |
| 6,452,981 B1 | 9/2002 | Raleigh et al. |
| 6,459,740 B1 | 10/2002 | Lo |
| 6,463,295 B1 | 10/2002 | Yun |
| 6,470,055 B1 | 10/2002 | Feher |
| 6,473,393 B1 | 10/2002 | Ariyavisitakul et al. |
| 6,473,418 B1 | 10/2002 | Laroia et al. |
| 6,496,290 B1 | 12/2002 | Lee |
| 6,504,862 B1 | 1/2003 | Yang et al. |
| 6,507,319 B2 | 1/2003 | Sikina |
| 6,510,133 B1 | 1/2003 | Uesugi |
| 6,512,737 B1 | 1/2003 | Agee |
| 6,526,105 B1 | 2/2003 | Harikumar et al. |
| 6,532,224 B1 | 3/2003 | Dailey |
| 6,549,581 B1 | 4/2003 | Izumi et al. |
| 6,563,881 B1 | 5/2003 | Sakoda et al. |
| 6,567,482 B1 | 5/2003 | Popovic |
| 6,567,982 B1 | 5/2003 | Howe et al. |
| 6,570,913 B1 | 5/2003 | Chen |
| 6,603,827 B2 | 8/2003 | Bottomley et al. |
| 6,606,351 B1 | 8/2003 | Dapper et al. |
| 6,631,175 B2 | 10/2003 | Harikumar et al. |
| 6,636,495 B1 | 10/2003 | Tangemann |
| 6,650,645 B2 | 11/2003 | Scott et al. |
| 6,654,408 B1 | 11/2003 | Kadous et al. |
| 6,654,719 B1 | 11/2003 | Papadias |
| 6,662,024 B2 | 12/2003 | Walton et al. |
| 6,665,521 B1 | 12/2003 | Gorday et al. |
| 6,667,714 B1 | 12/2003 | Solondz |
| 6,674,810 B1 | 1/2004 | Cheng |
| 6,674,999 B2 | 1/2004 | Ramachandran |
| 6,678,318 B1 | 1/2004 | Lai |
| 6,686,879 B2 | 2/2004 | Shattil |
| 6,687,511 B2 | 2/2004 | McGowan et al. |
| 6,693,984 B1 | 2/2004 | Andre et al. |
| 6,694,154 B1 | 2/2004 | Molnar et al. |
| 6,704,794 B1 | 3/2004 | Kejriwal et al. |
| 6,717,908 B2 | 4/2004 | Vijayan et al. |
| 6,728,295 B1 | 4/2004 | Nallanathan et al. |
| 6,747,946 B1 | 6/2004 | Kaneko et al. |
| 6,751,187 B2 | 6/2004 | Walton et al. |
| 6,757,344 B2 | 6/2004 | Carleton et al. |
| 6,760,373 B2 | 7/2004 | Gross et al. |
| 6,765,969 B1 | 7/2004 | Vook et al. |
| 6,778,514 B1 | 8/2004 | Boccussi et al. |
| 6,785,513 B1 | 8/2004 | Sivaprakasam |
| 6,813,485 B2 | 11/2004 | Sorrells et al. |
| 6,832,251 B1 | 12/2004 | Gelvin et al. |
| 6,850,481 B2 | 2/2005 | Wu et al. |
| 6,859,506 B1 | 2/2005 | McCorkle |
| 6,859,641 B2 | 2/2005 | Collins et al. |
| 6,882,619 B1 | 4/2005 | Gerakoulis |
| 6,901,422 B1 | 5/2005 | Sazegari |
| 6,907,270 B1 | 6/2005 | Blanz |
| 6,928,047 B1 | 8/2005 | Xia |
| 6,944,168 B2 | 9/2005 | Paatela et al. |
| 6,980,768 B2 | 12/2005 | Arend et al. |
| 6,982,968 B1 | 1/2006 | Barratt et al. |
| 6,985,533 B2 | 1/2006 | Attallah et al. |
| 6,996,076 B1 | 2/2006 | Forbes et al. |
| 7,009,958 B1 | 3/2006 | Gerakoulis |
| 7,010,015 B2 | 3/2006 | Hervey |
| 7,010,048 B1 | 3/2006 | Shattil |
| 7,020,110 B2 | 3/2006 | Walton et al. |
| 7,031,309 B1 | 4/2006 | Sautter et al. |
| 7,031,371 B1 | 4/2006 | Lakkis |
| 7,035,661 B1 | 4/2006 | Yun |
| 7,057,555 B2 | 6/2006 | Lewis |
| 7,075,999 B2 | 7/2006 | Redfern |
| 7,076,168 B1 | 7/2006 | Shattil |
| 7,082,153 B2 | 7/2006 | Balachandran et al. |
| 7,099,268 B2 | 8/2006 | Ichihara et al. |
| 7,139,321 B2 | 11/2006 | Giannakis et al. |
| 7,149,211 B2 | 12/2006 | Bennett et al. |
| 7,154,936 B2 | 12/2006 | Bjerke et al. |
| 7,155,255 B2 | 12/2006 | Blum et al. |
| 7,158,474 B1 | 1/2007 | Gerakoulis |
| 7,158,504 B2 | 1/2007 | Kadaba et al. |
| 7,194,766 B2 | 3/2007 | Noehring et al. |
| 7,197,084 B2 | 3/2007 | Ketchum et al. |
| 7,263,133 B1 | 8/2007 | Miao |
| 7,283,799 B2 | 10/2007 | Shattil |
| 7,286,604 B2 | 10/2007 | Shattil |
| 7,295,509 B2 | 11/2007 | Laroia et al. |
| 7,317,750 B2 | 1/2008 | Shattil |
| 7,366,117 B2 | 4/2008 | Kim et al. |
| 7,376,074 B2 | 5/2008 | Jung et al. |
| 7,391,804 B2 | 6/2008 | Shattil |
| 7,406,261 B2 | 7/2008 | Shattil |
| 7,418,043 B2 | 8/2008 | Shattil |
| 7,426,196 B2 | 9/2008 | Gopalakrishnan et al. |
| 7,430,257 B1 | 9/2008 | Shattil |
| 7,469,013 B1 | 12/2008 | Bolt et al. |
| 7,508,798 B2 | 3/2009 | Tong et al. |
| 7,570,956 B2 | 8/2009 | Bigham et al. |
| 7,594,010 B2 | 9/2009 | Dohler et al. |
| 7,606,137 B2 | 10/2009 | Shattil |
| 7,764,594 B2 | 7/2010 | Walton et al. |
| 7,787,514 B2 | 8/2010 | Shattil |
| 7,787,556 B2 | 8/2010 | Zhang et al. |
| 7,801,247 B2 | 9/2010 | Onggosanusi et al. |
| 7,876,729 B1 | 1/2011 | Grilli et al. |
| 7,907,588 B2 | 3/2011 | Schaepperle et al. |
| 8,031,583 B2 | 10/2011 | Classon et al. |
| 8,102,907 B2 | 1/2012 | Kim |
| 8,107,965 B2 | 1/2012 | Hui et al. |
| 8,301,139 B2 | 10/2012 | Lotze et al. |
| 8,320,301 B2 | 11/2012 | Walton et al. |
| 8,345,693 B1 | 1/2013 | Kim |
| 8,363,739 B2 | 1/2013 | Ma et al. |
| 8,391,913 B2 | 3/2013 | Zimmer et al. |
| 8,396,153 B1 | 3/2013 | Shen et al. |
| 8,401,095 B2 | 3/2013 | Han et al. |

(56) References Cited

U.S. PATENT DOCUMENTS

| | | |
|---|---|---|
| 8,416,837 B2 | 4/2013 | Wu et al. |
| 8,472,335 B2 | 6/2013 | De Pasquale et al. |
| 8,498,647 B2 | 7/2013 | Gorokhov et al. |
| 8,526,400 B2 | 9/2013 | Tong et al. |
| 8,670,390 B2 | 3/2014 | Shattil |
| 8,724,721 B2 | 5/2014 | Soler Garrido |
| 8,780,830 B2 | 7/2014 | Doppler et al. |
| 8,885,628 B2 | 10/2014 | Palanki et al. |
| 8,929,550 B2 | 1/2015 | Shattil |
| 8,942,082 B2 | 1/2015 | Shattil |
| 8,976,838 B2 | 3/2015 | Jaeckel et al. |
| 9,025,684 B2 | 5/2015 | Jeong et al. |
| 9,026,790 B2 | 5/2015 | Bolton et al. |
| 9,042,468 B2 | 5/2015 | Barbu et al. |
| 9,130,810 B2 | 9/2015 | Laroia et al. |
| 9,225,471 B2 | 12/2015 | Shattil |
| 9,485,063 B2 | 11/2016 | Shattil |
| 9,628,231 B2 | 4/2017 | Shattil |
| 9,693,339 B2 | 6/2017 | Palanki et al. |
| 9,698,888 B2 | 7/2017 | Ko et al. |
| 9,768,842 B2 | 9/2017 | Shattil |
| 9,798,329 B2 | 10/2017 | Shattil |
| 9,800,448 B1 | 10/2017 | Shattil |
| 9,819,449 B2 | 11/2017 | Shattil |
| 9,870,341 B2 | 1/2018 | Badin et al. |
| 10,211,892 B2 | 2/2019 | Shattil |
| 10,243,773 B1 | 3/2019 | Shattil |
| 10,554,353 B2 | 2/2020 | Zhao et al. |
| 10,568,143 B2 | 2/2020 | Delfeld et al. |
| 10,602,507 B2 | 3/2020 | Nammi et al. |
| 10,637,705 B1 | 4/2020 | Shattil |
| 10,917,167 B2 | 2/2021 | Jia et al. |
| 10,992,998 B2 | 4/2021 | Bergstrom |
| 11,018,917 B1* | 5/2021 | Shattil .................. H04L 47/10 |
| 11,018,918 B1 | 5/2021 | Shattil |
| 11,025,377 B2 | 6/2021 | Rakib et al. |
| 11,025,471 B2 | 6/2021 | Kuchi |
| 2001/0050926 A1 | 12/2001 | Kumar |
| 2002/0009096 A1 | 1/2002 | Odenwalder |
| 2002/0034191 A1 | 3/2002 | Shattil |
| 2002/0044524 A1 | 4/2002 | Laroia et al. |
| 2002/0051433 A1 | 5/2002 | Affes et al. |
| 2002/0061068 A1 | 5/2002 | Leva et al. |
| 2002/0118727 A1 | 8/2002 | Kim et al. |
| 2002/0118781 A1 | 8/2002 | Thomas et al. |
| 2002/0127978 A1 | 9/2002 | Khatri |
| 2002/0137472 A1 | 9/2002 | Quinn et al. |
| 2002/0168016 A1 | 11/2002 | Wang et al. |
| 2002/0172184 A1 | 11/2002 | Kim et al. |
| 2002/0172213 A1 | 11/2002 | Laroia et al. |
| 2002/0181509 A1 | 12/2002 | Mody et al. |
| 2002/0193146 A1 | 12/2002 | Wallace et al. |
| 2002/0196733 A1 | 12/2002 | Shen et al. |
| 2003/0026222 A1 | 2/2003 | Kotzin |
| 2003/0043732 A1 | 3/2003 | Walton et al. |
| 2003/0072380 A1 | 4/2003 | Huang |
| 2003/0086363 A1 | 5/2003 | Hernandes |
| 2003/0128658 A1 | 7/2003 | Walton et al. |
| 2003/0133469 A1 | 7/2003 | Brockmann et al. |
| 2003/0147655 A1 | 8/2003 | Shattil |
| 2003/0154262 A1 | 8/2003 | Kaiser et al. |
| 2003/0169824 A1 | 9/2003 | Chayat |
| 2003/0206527 A1 | 11/2003 | Yim |
| 2003/0218973 A1 | 11/2003 | Oprea et al. |
| 2004/0013101 A1 | 1/2004 | Akin et al. |
| 2004/0017824 A1 | 1/2004 | Koenck |
| 2004/0047405 A1 | 3/2004 | Boesel et al. |
| 2004/0057501 A1 | 3/2004 | Balachandran et al. |
| 2004/0086027 A1 | 5/2004 | Shattil |
| 2004/0100897 A1 | 5/2004 | Shattil |
| 2004/0131011 A1* | 7/2004 | Sandell .................. H04L 27/261 370/208 |
| 2004/0141548 A1 | 7/2004 | Shattil |
| 2004/0151109 A1 | 8/2004 | Batra et al. |
| 2004/0178954 A1 | 9/2004 | Vook et al. |
| 2004/0223476 A1 | 11/2004 | Jose et al. |
| 2004/0240535 A1 | 12/2004 | Verma et al. |
| 2004/0243258 A1 | 12/2004 | Shattil |
| 2005/0058098 A1 | 3/2005 | Klein et al. |
| 2005/0075081 A1 | 4/2005 | Catreux-Erceg et al. |
| 2005/0078742 A1 | 4/2005 | Cairns et al. |
| 2005/0179607 A1 | 8/2005 | Gorsuch et al. |
| 2005/0198199 A1 | 9/2005 | Dowling |
| 2005/0255808 A1 | 11/2005 | Ahmed et al. |
| 2005/0259627 A1 | 11/2005 | Song et al. |
| 2005/0265275 A1 | 12/2005 | Howard et al. |
| 2005/0265293 A1 | 12/2005 | Ro et al. |
| 2005/0270968 A1 | 12/2005 | Feng et al. |
| 2005/0286476 A1 | 12/2005 | Crosswy et al. |
| 2006/0023803 A1 | 2/2006 | Perlman et al. |
| 2006/0034378 A1 | 2/2006 | Lindskog et al. |
| 2006/0057958 A1 | 3/2006 | Ngo et al. |
| 2006/0106600 A1 | 5/2006 | Bessette |
| 2006/0153283 A1 | 7/2006 | Scharf et al. |
| 2006/0245346 A1 | 11/2006 | Bar-Ness et al. |
| 2006/0262870 A1 | 11/2006 | Khan |
| 2007/0041311 A1 | 2/2007 | Baum et al. |
| 2007/0041404 A1 | 2/2007 | Palanki et al. |
| 2007/0071125 A1 | 3/2007 | Tan et al. |
| 2007/0081580 A1 | 4/2007 | Breiling |
| 2007/0078924 A1 | 5/2007 | Hassan et al. |
| 2007/0098099 A1 | 5/2007 | Gore et al. |
| 2007/0140102 A1 | 6/2007 | Oh et al. |
| 2007/0160014 A1 | 7/2007 | Larsson |
| 2007/0177681 A1 | 8/2007 | Choi et al. |
| 2007/0183386 A1 | 8/2007 | Muharemovic et al. |
| 2007/0206686 A1 | 9/2007 | Vook et al. |
| 2007/0211807 A1 | 9/2007 | Han et al. |
| 2007/0218942 A1 | 9/2007 | Khan et al. |
| 2008/0075188 A1 | 3/2008 | Kowalski et al. |
| 2008/0095121 A1 | 4/2008 | Shattil |
| 2008/0151743 A1 | 6/2008 | Tong et al. |
| 2008/0240022 A1 | 10/2008 | Yoon et al. |
| 2008/0298335 A1 | 12/2008 | Lee |
| 2008/0298502 A1 | 12/2008 | Xu et al. |
| 2008/0310484 A1 | 12/2008 | Shattil |
| 2008/0317172 A1 | 12/2008 | Zhang et al. |
| 2009/0074093 A1 | 3/2009 | Han et al. |
| 2009/0086848 A1 | 4/2009 | Han et al. |
| 2009/0092182 A1 | 4/2009 | Shin et al. |
| 2009/0110033 A1 | 4/2009 | Shattil |
| 2009/0112551 A1 | 4/2009 | Hollis |
| 2009/0147870 A1 | 6/2009 | Lin et al. |
| 2009/0156252 A1 | 6/2009 | Harris |
| 2009/0316643 A1 | 9/2009 | Yamada et al. |
| 2009/0274103 A1 | 11/2009 | Yang et al. |
| 2009/0304108 A1 | 12/2009 | Kwon et al. |
| 2010/0008432 A1 | 1/2010 | Kim et al. |
| 2010/0039928 A1 | 2/2010 | Noh et al. |
| 2010/0041350 A1 | 2/2010 | Zhang et al. |
| 2010/0056200 A1 | 3/2010 | Tolonen |
| 2010/0080112 A1 | 4/2010 | Bertrand et al. |
| 2010/0091919 A1 | 4/2010 | Xu et al. |
| 2010/0098042 A1 | 4/2010 | Dent |
| 2010/0110875 A1 | 5/2010 | No et al. |
| 2010/0165829 A1 | 7/2010 | Narasimha et al. |
| 2010/0184369 A1 | 7/2010 | Cho et al. |
| 2010/0185541 A1 | 7/2010 | Hassan et al. |
| 2010/0232525 A1 | 9/2010 | Xia et al. |
| 2010/0248739 A1 | 9/2010 | Westerberg et al. |
| 2010/0254484 A1 | 10/2010 | Hamaguchi et al. |
| 2010/0254497 A1 | 10/2010 | To et al. |
| 2010/0317343 A1 | 12/2010 | Krishnamurthy et al. |
| 2011/0041021 A1 | 2/2011 | Khoshnevis et al. |
| 2011/0058471 A1 | 3/2011 | Zhang |
| 2011/0064156 A1 | 3/2011 | Kim et al. |
| 2011/0096658 A1 | 4/2011 | Yang et al. |
| 2011/0105051 A1 | 5/2011 | Thomas et al. |
| 2011/0107174 A1 | 5/2011 | Liu et al. |
| 2011/0135016 A1 | 6/2011 | Ahn et al. |
| 2011/0206207 A1 | 8/2011 | Priotti |
| 2011/0228878 A1 | 9/2011 | Sorrentino |
| 2011/0281534 A1 | 11/2011 | Liao et al. |
| 2012/0014392 A1 | 1/2012 | Bhushan et al. |

(56) References Cited

U.S. PATENT DOCUMENTS

| | | |
|---|---|---|
| 2012/0057660 A1 | 3/2012 | Nguyen et al. |
| 2012/0087393 A1 | 4/2012 | Jeong et al. |
| 2012/0093200 A1 | 4/2012 | Kyeong |
| 2012/0113816 A1 | 5/2012 | Bhattad et al. |
| 2012/0177140 A1 | 7/2012 | Sahara |
| 2012/0188994 A1 | 7/2012 | Palanki et al. |
| 2012/0213054 A1 | 8/2012 | Hamaguchi et al. |
| 2012/0224517 A1 | 9/2012 | Yun et al. |
| 2012/0250740 A1 | 10/2012 | Ling |
| 2012/0252387 A1 | 10/2012 | Haskins et al. |
| 2012/0269285 A1 | 10/2012 | Jeong et al. |
| 2012/0294346 A1 | 11/2012 | Kolze |
| 2013/0058239 A1 | 3/2013 | Wang et al. |
| 2013/0058432 A1 | 3/2013 | Futatsugi et al. |
| 2013/0077508 A1 | 3/2013 | Axmon et al. |
| 2013/0142275 A1 | 6/2013 | Baik et al. |
| 2013/0198590 A1 | 8/2013 | Kim et al. |
| 2013/0223269 A1 | 8/2013 | To et al. |
| 2013/0315211 A1 | 11/2013 | Balan et al. |
| 2014/0064392 A1 | 3/2014 | Jonsson et al. |
| 2014/0086186 A1 | 3/2014 | Hamaguchi et al. |
| 2014/0198863 A1 | 7/2014 | Terry |
| 2014/0348253 A1 | 11/2014 | Mobasher et al. |
| 2015/0009971 A1 | 1/2015 | Han et al. |
| 2015/0103723 A1 | 4/2015 | Kim et al. |
| 2015/0117558 A1 | 4/2015 | Phillips |
| 2015/0124765 A1 | 5/2015 | Rong et al. |
| 2015/0195840 A1 | 7/2015 | Ahn et al. |
| 2015/0199963 A1 | 7/2015 | Maaninen |
| 2015/0227747 A1 | 8/2015 | Gassi |
| 2015/0234033 A1 | 8/2015 | Jamieson et al. |
| 2015/0271000 A1 | 9/2015 | Yang et al. |
| 2015/0304153 A1 | 10/2015 | Moffatt et al. |
| 2015/0358190 A1 | 12/2015 | Kruglick et al. |
| 2016/0006594 A1 | 1/2016 | Persson et al. |
| 2016/0050096 A1 | 2/2016 | DelMarco |
| 2016/0050099 A1 | 2/2016 | Siohan et al. |
| 2016/0197756 A1 | 7/2016 | Mestdagh et al. |
| 2016/0248443 A1 | 8/2016 | Murakami et al. |
| 2016/0254889 A1 | 9/2016 | Shattil |
| 2016/0269083 A1 | 9/2016 | Porat et al. |
| 2016/0344497 A1 | 11/2016 | Myung et al. |
| 2016/0353446 A1 | 12/2016 | Abdoli et al. |
| 2017/0019284 A1 | 1/2017 | Ankarali et al. |
| 2017/0026218 A1 | 1/2017 | Shattil |
| 2017/0054480 A1 | 2/2017 | Shattil |
| 2017/0126291 A1 | 5/2017 | Lea et al. |
| 2017/0126454 A1 | 5/2017 | Huan et al. |
| 2017/0126458 A1 | 5/2017 | Shattil |
| 2017/0134202 A1 | 5/2017 | Baligh et al. |
| 2017/0134235 A1 | 5/2017 | Wu et al. |
| 2017/0250848 A1 | 8/2017 | Lee et al. |
| 2017/0255593 A9 | 9/2017 | Agee |
| 2017/0264474 A1 | 9/2017 | He et al. |
| 2017/0279648 A1 | 9/2017 | Song et al. |
| 2017/0295000 A1 | 10/2017 | Yoo et al. |
| 2017/0353340 A1 | 12/2017 | Raphaeli et al. |
| 2018/0006692 A1 | 1/2018 | Noh et al. |
| 2018/0062904 A1 | 3/2018 | Hwang et al. |
| 2018/0075482 A1 | 3/2018 | Gierach |
| 2018/0091338 A1 | 3/2018 | Mayer et al. |
| 2018/0092086 A1 | 3/2018 | Nammi et al. |
| 2018/0109408 A1 | 4/2018 | Sandell et al. |
| 2018/0167244 A1 | 6/2018 | Cheng et al. |
| 2018/0191543 A1 | 7/2018 | Park et al. |
| 2018/0212810 A1 | 7/2018 | Park et al. |
| 2018/0219590 A1 | 8/2018 | Matsuda et al. |
| 2018/0262253 A1 | 9/2018 | Rahman et al. |
| 2018/0278303 A1 | 9/2018 | Hong et al. |
| 2018/0288809 A1 | 10/2018 | Delfeld et al. |
| 2018/0309599 A1 | 10/2018 | Lee |
| 2019/0036657 A1 | 1/2019 | Zhao et al. |
| 2019/0181928 A1 | 6/2019 | Pan et al. |
| 2019/0393948 A1 | 9/2019 | Zhao et al. |

FOREIGN PATENT DOCUMENTS

| | | |
|---|---|---|
| JP | H08331093 | 12/1996 |
| JP | 2012-100323 | 5/2012 |
| KR | 10-2010-0019974 | 2/2010 |
| KR | 10-20090033703 | 8/2011 |
| WO | WO/2001/054303 | 7/2001 |
| WO | WO/2001/054303 | 4/2002 |
| WO | 0237771 | 5/2002 |

OTHER PUBLICATIONS

Z. Wu, et al.; "High-Performance 64-QAM OFDM via Carrier Interferometry Spreading Codes"; 2003 IEEE 58th Vehicular Technology Conference. VTC 2003-Fall (IEEE Cat. No. 03CH37484). Oct. 6-9, 2003.

B.Natarajan, C.R. Nassar and S.Shattil; "High-Throughput High-Performance TDMA Through Pseudo-Orthogonal Carrier Interferometry Pulse Shaping"; IEEE Transactions on Wireless Communications, vol. 3, No. 3, May 2004.

B.Natarajan, C.R. Nassar; "Introducing Novel FDD and FDM in MC-CDMA to Enhance Performance"; RAWCON 2000. 2000 IEEE Radio and Wireless Conference (Cat. No. 00EX404). Sep. 13-13, 2000.

B.Natarajan, Z Wu, C.R. Nassar and S.Shattil; "Large Set of CI Spreading Codes for High-Capacity MC-CDMA"; IEEE Transactions on Communications, vol. 52, No. 11, Nov. 2004.

B.Natarajan, C.R. Nassar, Z Wu; "Multi-carrier platform for wireless communications. Part 1: High-performance, high-throughput TDMA and DS-CDMA via multi-carrier implementations"; Wireless Communications and Mobile Computing; Wirel. Commun. Mob. Comput. 2002; 2:357-379 (DOI: 10.1002/wcm.51) Jun. 18, 2002.

S.A. Zekavat, C.R. Nassar and S.Shattil; "Merging Multicarrier CDMA and Oscillating-Beam Smart Antenna Arrays: Exploiting Directionality, Transmit Diversity, and Frequency Diversity"; IEEE Transactions on Communications, vol. 52, No. 1, pp. 110-119, Jan. 2004.

C.R. Nassar, B.Natarajan, Z. Wu, D. Wiegandt, and S.Shattil; Multi-Carrier Technologies for Wireless Communication; Kluwer Academic Publishers 2002.

B.Natarajan, C.R. Nassar, S. Shattil; "Novel Multi-Carrier Implementation of FSK for Bandwidth Efficient, High Performance Wireless Systems"; 2002 IEEE International Conference on Communications. Conference Proceedings. ICC 2002 (Cat. No. 02CH37333) Apr. 28-May 2, 2002.

D.A. Wiegandt, C.R. Nassar, Z. Wu; "Overcoming Peak-to-Average Power Ratio Issues in OFDM via Carrier-Interferometry Codes"; IEEE 54th Vehicular Technology Conference. VTC Fall 2001. Proceedings (Cat. No. 01CH37211), Oct. 7-11, 2001.

D.A. Wiegandt, C.R. Nassar; "Peak-to-Average Power Reduction in High-Performance, High-Throughput OFDM via Pseudo-Orthogonal Carrier-Interferometry Coding"; PACRIM. 2001 IEEE Pacific Rim Conference on, vol. 2, Feb. 2001.

X. Lin, et al.; "5G New Radio: Unveiling the Essentials of the Next Generation Wireless Access Technology"; IEEE Communications Standards Magazine (vol. 3 , Issue: 3 , Sep. 2019 ) pp. 30-37. Dec. 6, 2019.

"D2.2 Architecture, system and interface definitions of a 5G for Remote Area network"; Project website: http://5g-range.eu; Version 1 date Apr. 26, 2018.

R. Rani, et al.; "Peak-to-Average Power Ratio Analysis of SCFDMA Signal by Hybrid Technique"; International Journal of Computer Applications (0975-8887) vol. 69—No. 15, May 2013.

H. Kim, et al.; "Multiple Access for 5G New Radio: Categorization, Evaluation, and Challenges"; arXiv:1703.09042 [cs.IT], Mar. 27, 2017.

A. Anand, et al.; "Joint Scheduling of URLLC and eMBB Traffic in 5G Wireless Networks"; IEEE INFOCOM 2018—IEEE Conference on Computer Communications; Apr. 16-19, 2018.

(56) References Cited

OTHER PUBLICATIONS

M. Bennis, et al.; "Ultra-Reliable and Low-Latency Wireless Communication: Tail, Risk and Scale"; Proceedings of the IEEE ( vol. 106 , Issue: 10 , Oct. 2018 ).

B.G. Agee; "Efficient Allocation of RF Transceiver Resources in Spatially Adaptable Communication Networks"; SDR Forum/MPRG Workshop on Advanced in Smart Antennas for Software Radios, At Virginia Polytechnic Institute, Blacksburg, VA.

C.A. Azurdia-Meza, et al.; "PAPR reduction in SC-FDMA by pulse shaping using parametric linear combination pulses"; IEEE Communications Letters, vol. 16, No. 12, Dec. 2012.

C.A. Azurdia-Meza, et al.; "PAPR Reduction in Single Carrier FDMA Uplink by Pulse Shaping Using a β-α Filter"; Wireless Pers Commun 71, 23-44 (2013). https://doi.org/10.1007/s11277-012-0794-0; Aug. 9, 2012.

A Hamed, et al.; "Bandwidth and Power efficiency analysis of fading communication link"; 2016 International Symposium on Performance Evaluation of Computer and Telecommunication Systems (SPECTS); Jul. 24-27, 2016.

Y. Akhtman, L Hanzo; "Power Versus Bandwidth Efficiency in Wireless Communications: from Economic Sustainability to Green Radio"; China Communications 7(2) • Apr. 2010.

L. Militano, et al.; "Device-to-Device Communications for 5G Internet of Things"; EAI Endorsed Transactions on Internet of Things; Ghent vol. 1, Iss. 1, (Oct. 2015).

M. Vergara, et al.; "Multicarrier Chip Pulse Shape Design With Low PAPR"; 21st European Signal Processing Conference (EUSIPCO 2013); Sep. 9-13, 2013.

C. Liu, et al.; "Experimental demonstration of high spectral efficient 4×4 MIMO SCMA-OFDM/OQAM radio over multi-core fiber system"; Optics Express 18431, vol. 25, No. 15 | Jul. 24, 2017.

F. Wei, et al.; "Message-Passing Receiver Design for Joint Channel Estimation and Data Decoding in Uplink Grant-Free SCMA Systems"; IEEE Transactions on Communications, vol. 18 , Issue: 1 , Jan. 2019: Nov. 6, 2018.

H. Jiang, et al.; "Distributed Layered Grant-Free Non-Orthogonal Multiple Access for Massive MTC"; 2018 IEEE 29th Annual International Symposium on Personal, Indoor and Mobile Radio Communications (PIMRC); Sep. 9-12, 2018.

S. Sengar, P.B. Bhattacharya; "Performance Improvement in OFDM System by PAPR Reduction Using Pulse Shaping Technique"; International Journal of Emerging Technology and Advanced Engineering, vol. 2, Issue 12, Dec. 2012.

B.H. Alhassoun; "Peak-To-Average-Power-Ratio (PAPR) Reduction Techniques For Orthogonal-Frequency-Division-Multiplexing (OFDM) Transmission"; Thesis, University of Denver, Jun. 1, 2012.

A. Boonkajay, et al.; "Performance Evaluation of Low-PAPR Transmit Filter for Single-Carrier Transmission"; 2012 18th Asia-Pacific Conference on Communications (APCC); Oct. 15-17, 2012.

D. Das; "Peak to Average Power Ratio Reduction in OFDM Using Pulse Shaping Technique"; Computer Engineering and Applications vol. 5, No. 2, ISSN: 2252-5459 (Online) Jun. 2016.

D. Wulich, et al.; "Peak to Average Power Ratio in Digital Communications"; https://www.academia.edu/6222108/Peak_to_Average_Power_Ratio_in_Digital_Communications 2005.

S. Singh, et al.; "Analysis of Roll-Off-Factor to Reduce the PAPR in SC-FDMA System"; International Journal of Computational Intelligence Techniques, ISSN: 0976-0466 & E-ISSN: 0976-0474, vol. 3, Issue 2, 2012, pp. 76-78.

M. Mahlouji, T. Mahmoodi; "Analysis of Uplink Scheduling for Haptic Communications"; arXiv:1809.09837 [cs.NI], Sep. 26, 2018.

K. Au, et al.; "Uplink Contention Based SCMA for 5G Radio Access"; 2014 IEEE Globecom Workshops (GC Wkshps), Dec. 8-12, 2014.

S. Shah, A.R. Patel; "LTE—Single Carrier Frequency Division Multiple Access"; Jan. 1, 2010.

S.L. Ariyavisitakul, et al.; "Frequency Domain Equalization for Single-Carrier Broadband Wireless Systems"; IEEE Communications Magazine ( vol. 40 , Issue: 4 , Apr. 2002 ); pp. 58-66, Aug. 7, 2002.

A. Agarwal and P. R. Kumar, "Improved capacity bounds for wireless networks." Wireless Communications and Mobile Computing, vol. 4, pp. 251-261, 2004.

J.F. Cardoso, A. Souloumiac, "Blind Beamforming for non-Gaussian Signals," IEEE-Proceedings-F, vol. 140, No. 6, pp. 362-370, Dec. 1993.

D. Galda; H. Rohling, "A low complexity transmitter structure for OFDM-FDMA uplink systems", IEEE 55th Vehicular Technology Conference. VTC Spring 2002, May 6-9, 2002.

P. Gupta and P.R. Kumar, "The Capacity of Wireless Networks," IEEE Trans. Info. Theory, vol. IT-46, No. 2, Mar. 2000, pp. 388-404.

T. Kailath, Linear Systems, Prentice-Hall, Inc., 1980.

T. May; H. Rohling, "Reducing the peak-to-average power ratio in OFDM radio transmission systems", VTC '98. 48th IEEE Vehicular Technology Conference. May 21-21, 1998.

J.D. Schaffer, "Multiple objective optimization with vector evaluated genetic algorithms," Proceedings of 1st International Conference on Genetic Algorithms, 1991, pp. 93-100.

Z. Wu, C.R. Nassar, "Combined Directionality and Transmit Diversity via Smart Antenna Spatial Sweeping," RAWCON 2000, IEEE Radio and Wireless Conference 2000, p. 103-106. Sep. 13, 2000.

S.A. Zekavat; C.R. Nassar; S. Shattil, "Combining multi-input single-output systems and multi-carrier systems: achieving transmit diversity, frequency diversity and directionality", Vehicular Technology Conference. IEEE 55th Vehicular Technology Conterence. VTC Spring 2002, May 6-9, 2002.

S.A. Zekavat, C. R. Nassar and S. Shattil, "Smart antenna spatial sweeping for combined directionality and transmit diversity," Journal of Communications and Networks (JCN), Special Issue on Adaptive Antennas for Wireless Communications, vol. 2, No. 4, pp. 325-330, Dec. 2000.

E. Zitzler and L. Thiele, "Multiobjective evolutionary algorithms: A comparative case study and the strength pareto approach," IEEE Tran. on Evol. Comput., vol. 3, No. 4, Nov. 1999, pp. 257-271.

D. Gerakoulis and E. Geraniotis, CDMA: Access and Switching for Terrestrial and Satellite Networks, John Wiley & Sons, LTD, 2001.

ITU-T, Asymmetric Digital Subscriber Line (ADSL) Transceivers, G.992.1, Jun. 1999.

H. Prakash, C.D.Suriyakala; "PAPR Reduction in MIMO SC-FDMA—A Survey"; Int. J Rec. Adv. Sci. Tech., 2015; 2(2):11-19.

E. Hajlaoui, M. Abdellaoui; "SOCP Approach for Reducing PAPR for MIMO-OFDM Via Tone Reservation"; International Journal of Distributed and Parallel Systems (IJDPS) vol. 2, No. 3, May 2011.

J. Shin, B. Seo; "PAPR Reduction Scheme for MISO and MIMO OFDM Systems with Limited Feedback"; WSEAS Transactions on Communications 13:355-362 • Jan. 2014.

D. Sinanovic, et al.; "Low PAPR Spatial Modulation for SC-FDMA"; IEEE Transactions on Vehicular Technology; vol. 66, Issue: 1, Jan. 2017.

G.H. Karande, et al.; "Peak-to-Average Power Reduction in MIMO-OFDM Systems using SLM technique"; IPASJ International Journal of Electronics & Communication (IIJEC); vol. 2, Issue 8, Aug. 2014.

M. Lieberei, U. Zolzer; "Time Domain PAPR Reduction in MIMO-OFDM Spatial Multiplexing Systems"; in Proceedings of the 14th International OFDM-Workshop (InOWo'09), S. 218-222, 2009.

M. Vu, A. Paulraj; "MIMO Wireless Linear Precoding"; IEEE Signal Processing Magazine. Submitted Feb. 2006, revised Nov. 2006 and Dec. 2006.

H.G. Myung, et al.; "Peak Power Characteristics of Single Carrier FDMA MIMO Precoding System"; 2007 IEEE 66th Vehicular Technology Conference, Sep. 30-Oct. 3, 2007.

B. Naik, et al.; "Reduction of PAPR in MIMO-OFDM/A System Using Polyphase Complementary Modulation"; International Journal of Innovative Research in Computer and Communication Engineering; vol. 2, Issue 5, May 2014.

A.S. Parihar, A. Rai; "A Review: PAPR Reduction Techniques in MIMO OFDM System"; International Journal of Engineering and Innovative Technology (IJEIT); vol. 4, Issue 12, Jun. 2015.

B. Rihawi, Y.Louet; "PAPR Reduction Scheme with SOCP for MIMO-OFDM Systems"; I. J. Communications, Network and System Sciences. 2008; 1: 1-103; Published Online Feb. 2008 in SciRes (http://www.SRPublishing.org/journal/ijcns/).

(56) References Cited

OTHER PUBLICATIONS

C.A. Devlin, et al.; "Peak to Average Power Ratio Reduction Technique for OFDM Using Pilot Tones and Unused Carriers"; 2008 IEEE Radio and Wireless Symposium; Year: 2008; pp. 33-36.
K Mhatre, U.P. Khot; "Efficient Selective Mapping PAPR Reduction Technique"; International Conference on Advanced Computing Technologies and Applications (ICACTA-2015); Procedia Computer Science 45 ( 2015 ) 620-627.
K. Srinivasarao, et al.; "Peak-to-Average Power Reduction in MIMO-OFDM Systems Using Sub-Optimal Algorithm"; International Journal of Distributed and Parallel Systems (IJDPS) vol. 3, No. 3, May 2012.
K. Xu, et al.; "Beamforming MISO-OFDM PAPR Reduction: A Space-User Perspective"; 2007 IEEE International Conference on Acoustics, Speech and Signal Processing—ICASSP '07, Apr. 15-20, 2007.
H. Zhang, D.L. Goeckel; "Peak Power Reduction in Closed-Loop MIMO-OFDM Systems via Mode Reservation"; IEEE Communications Letters, vol. 11, No. 7, Jul. 2007.
C.L. Wang, Y. Ouyang; "Low-Complexity Selected Mapping Schemes for Peak-to-Average Power Ratio Reduction in OFDM Systems"; IEEE Transactions on Signal Processing, vol. 53, No. 12, Dec. 2005.
P. Sindhu, G. Krishnareddy; "Peak and Average Power Reduction in OFDM System with Trellis Shaping Method"; International Journal of Advanced Research in Electrical, Electronics and Instrumentation Engineering; vol. 6, Issue 7, Jul. 2017.
H-B Jeon, et al.; "Bit-Based SLM Schemes for PAPR Reduction in QAM Modulated OFDM Signals"; IEEE Transactions on Broadcasting, vol. 55, No. 3, Sep. 2009.
H-B Jeon, et al.; "A Low-Complexity SLM Scheme Using Additive Mapping Sequences for PAPR Reduction of OFDM Signals"; IEEE Transactions on Broadcasting, vol. 57, No. 4, Dec. 2011.
S-J Heo, et al.; "A Modified SLM Scheme With Low Complexity for PAPR Reduction of OFDM Systems"; IEEE Transactions on Broadcasting, vol. 53, No. 4, Dec. 2007.
M.I. Abdullah, et al.; "Comparative Study of PAPR Reduction Techniques in OFDM"; ARPN Journal of Systems and Software; vol. 1, No. 8, Nov. 2011.
E. Abdullah, et al.; "Modified selective mapping scheme with low complexity for minimizing high peak average power ratio in orthogonal frequency division multiplexing system"; AIP Conference Proceedings 1774, 050005 (2016).
S.T. O'Hara, J.R. Periard; "Orthogonal-Coded Selective Mapping (OCSM) for OFDM Peakto-Average Power Reduction Without Side Information"; Proceeding of the SDR 04 Technical Conference and Product Exposition 2004, Syracuse, NY, Technology Center—Syracuse Research Corporation. 2004.
P. Sharma, S. Verma; "PAPR Reduction of OFDM Signals Using Selective Mapping With Turbo Codes"; International Journal of Wireless & Mobile Networks (IJWMN) vol. 3, No. 4, Aug. 2011.
D. Wiegandt et al., "Overcoming peak-to-average power ratio issues in OFDM via carrier-interferometry codes", VTC 2001 Fall. IEEE VTS 54th Vehicular Technology Conference, 2001, vol. 2, pp. 660-663, Oct. 7-11, 2001.
B. Natarajan, et al. "Crest factor considerations in MC-CDMA with carrier interferometry codes", PACRIM. 2001 IEEE Communications Pacific Rim Conference on Computers and signal Processing, 2001, vol. 2, pp. 445-448 Aug. 26-28, 2001.
C.R. Nassar et al., "High-Performance Broadband DS-CDMA via Carrier Interferometry Chip Shaping," 2000 Int'l Symposium on Advanced Radio Technologies, Boulder, CO, Sep. 6-8, 2000.
C.R. Nassar, B. Natarajan, S. Shattil, "Introduction of carrier interference to spread spectrum multiple access," Wireless Communications and Systems, 1999 Emerging Technologies Symposium Apr. 12-13, 1999 pp. 4.1-4.5.
B. Natarajan, C.R. Nassar, S. Shattil, M. Michelini, and Z. Wu; "High-Performance MC-CDMA Via Carrier Interferometry Codes," Vehicular Technology, IEEE Transactions on; vol. 50, Issue 6, Nov. 2001, pp. 1344-1353.

Z. Wu, B. Natarajan, C.R. Nassar, S. Shattil; "High-performance, high-capacity MC-CDMA via carrier interferometry," Personal, Indoor and Mobile Radio Communications, 2001 12th IEEE International Symposium on; vol. 2, Sep. 30-Oct. 3, 2001 pp. G-11-G-16.
S.A. Zekavat, C.R. Nassar, S. Shattil; "The merger of a single oscillating-beam smart antenna and MC-CDMA: transmit diversity, frequency diversity and directionality," Broadband Communications for the Internet Era Symposium digest, 2001 IEEE Emerging Technologies Symposium on Sep. 10-11, 2001 pp. 107-112.
B. Natarajan, C.R. Nassar, S. Shattil; "Enhanced Bluetooth and IEEE 802.11 (FH) via multi-carrier implementation of the physical layer," Broadband Communications for the Internet Era Symposium digest, 2001 IEEE Emerging Technologies Symposium on; Sep. 10-11, 2001 pp. 129-133.
Z. Wu; C.R. Nassar, S. Shattil; "Ultra wideband DS-CDMA via innovations in chip shaping," Vehicular Technology Conference, 2001. VTC 2001 Fall. IEEE VTS 54th; vol. 4, Oct. 7-11, 2001 pp. 2470-2474.
B. Natarajan, C.R. Nassar, S. Shattil; "Innovative pulse shaping for high-performance wireless TDMA," Communications Letters, IEEE vol. 5, Issue 9, Sep. 2001 pp. 372-374.
B.Natarajan, C.R. Nassar and S.Shattil; "Throughput Enhancement in TDMA through Carrier Interference Pulse Shaping," IEEE Vehicular technology Conference Proceedings, vol. 4, Fall 2000, Boston, Sep. 24-28, 2000, pp. 1799-1803.
V.Thippavajjula, B.Natarajan; "Parallel Interference Cancellation Techniques for Synchronous Carrier Interferometry/MC-CDMA Uplink"; IEEE 60th Vehicular Technology Conference, 2004. VTC2004-Fall. Sep. 26-29, 2004.
A. Serener, et al.; "Performance of Spread OFDM with LDPC Coding in Outdoor Environments"; 2003 IEEE 58th Vehicular Technology Conference. VTC 2003-Fall (IEEE Cat. No. 03CH37484), Oct. 6-9, 2003.
LTE: Evolved Universal Terrestrial Radio Access (E-UTRA); Multiplexing and channel coding (3GPP TS 36.212 version 8.8.0 Release 8), Jan. 2010.
LTE: Evolved Universal Terrestrial Radio Access (E-UTRA); Physical channels and modulation (3GPP TS 36.211 version 8.7.0 Release 8), Jun. 2009.
B.Natarajan, C.R. Nassar and S.Shattil; "CI/FSK: Bandwidth-Efficient Multicarrier FSK for High Performance, High Throughput, and Enhanced Applicability"; IEEE Transactions on Communications, vol. 52, No. 3, Mar. 2004.
G. Wunder, K.G. Paterson; "Crest-Factor Analysis of Carrier Interferometry MC-CDMA and OFDM systems"; International Symposium onInformation Theory, 2004. ISIT 2004. Proceedings. Jun. 27-Jul. 2, 2004.
B.Natarajan, C.R. Nassar "Crest Factor Reduction in MC-CDMA Employing Carrier Interferometry Codes"; EURSAP Journal on Wireless Comm. and Networking 2004:2, 374-379.
A.J. Best, B.Natarajan; "The Effect of Jamming on the Performance of Carrier Interferometry/OFDM"; WiMob'2005), IEEE International Conference on Wireless And Mobile Computing, Networking And Communications, 2005. Aug. 24-22, 2005.
S. Hijazi, et al.; "Enabling FCC's Proposed Spectral Policy via Carrier Interferometry"; 2004 IEEE Wireless Communications and Networking Conference (IEEE Cat. No. 04TH8733). Mar. 21-25, 2004.
Z. Wu, et al.; "FD-MC-CDMA: A Frequency-based Multiple Access Architecture for High Performance Wireless Communication"; Proceedings RAWCON 2001. 2001 IEEE Radio and Wireless Conference (Cat.No. 01EX514). Aug. 19-22, 2001.
P. Barbosa, et al.; "High-Performance MIMO-OFDM via Carrier Interferometry"; GLOBECOM '03. IEEE Global Telecommunications Conference (IEEE Cat. No. 03CH37489). Dec. 1-5, 2003.
D.A. Wiegandt, C.R. Nassar; "High-Throughput, High-Performance OFDM via Pseudo-Orthogonal Carrier Interferometry"; 12th IEEE International Symposium on Personal, Indoor and Mobile Radio Communications. PIMRC 2001. Proceedings (Cat. No. 01TH8598) Sep. 30-Oct. 3, 2001.
D.A. Wiegandt, C.R. Nassar; "High-Throughput, High-Performance OFDM via Pseudo-Orthogonal Carrier Interferometry

(56) References Cited

OTHER PUBLICATIONS

Type 2"; The 5th International Symposium on Wireless Personal Multimedia Communications. Oct. 27-30, 2002.

D.A. Wiegandt, C.R. Nassar; "High-Throughput, High-Performance OFDM via Pseudo-Orthogonal Carrier Interferometry Spreading Codes"; IEEE Transactions on Communications, vol. 51, No. 7, pp. 1123-1134. Jul. 2003.

C-Y. Hsu, et al.; "Novel SLM Scheme with Low-Complexity for PAPR Reduction in OFDM System", IEICE Trans. Fundamentals, vol. E91-A. No. 7, pp. 1689-1696, Jul. 2008.

N. Jacklin, et al.; "A Linear Programming Based Tone Injection Algorithm for PAPR Reduction of OFDM and Linearly Precoded Systems", IEEE Trans. on Circuits and Systems-I: Regular Papers, vol. 60, No. 7, pp. 1937-1945, Jul. 2013.

T. Dias, R.C. de Lamare; "Study of Unique-Word Based GFDM Transmission Systems"; https://arxiv.org/pdf/1805.10702.pdf, May 27, 2018.

R. Ferdian, et al.; "Efficient Equalization Hardware Architecture for SC-FDMA Systems without Cyclic Prefix"; 2012 International Symposium on Communications and Information Technologies (ISCIT): pp. 936-941, Oct. 2012.

M. Au, et al.; "Joint Code-Frequency Index Modulation for IoT and Multi-User Communications"; IEEE Journal of Selected Topics in Signal Processing (vol. 13, Issue: 6, Oct. 2019).

I.M. Hussain; "Low Complexity Partial SLM Technique for PAPR Reduction in OFDM Transmitters"; Int. J. on Electrical Engineering and Informatics, vol. 5, No. 1, Mar. 2013.

"Defendant Asustek Compupter Inc.'S Answer to First Amended Complaint"; U.S. District Court for the Eastern District of Texas, Civil Action No. 2:22-CV-00066; Document 30, Filed Mar. 7, 2023.

\* cited by examiner

SPREADING AND PRECODING IN OFDM

CROSS REFERENCE TO PRIOR APPLICATIONS

This application is a Continuation of U.S. patent application Ser. No. 16/864,709, filed May 1, 2020, now U.S. Pat. No. 11,018,917, which is a Continuation of U.S. patent application Ser. No. 16/199,221, filed Nov. 26, 2018, now U.S. Pat. No. 10,644,916, which is a Continuation of U.S. pat. appl. Ser. No. 16/027,191, filed Jul. 3, 2018, now U.S. Pat. No. 10,574,497, which is a Continuation of U.S. patent application Ser. No. 15/642,850, filed on Jul. 6, 2017, now U.S. Pat. No. 10,015,034, which is a Continuation of U.S. patent application Ser. No. 15/489,664, filed Apr. 17, 2017, now U.S. Pat. No. 9,800,448, which is a Continuation of U.S. patent application Ser. No. 15/149,382, filed May 9, 2016, now U.S. Pat. No. 9,628,231, which is a Continuation-in-Part of U.S. patent application Ser. No. 14/727,769, filed Jun. 1, 2015, which is a Continuation of U.S. patent application Ser. No. 14/276,309, filed May 13, 2014, now U.S. Pat. No. 9,048,897, which is a Continuation of U.S. patent application Ser. No. 12/545,572, filed Aug. 21, 2009, now U.S. Pat. No. 8,750,264, which is a Divisional of U.S. patent application Ser. No. 11/187,107, filed on Jul. 22, 2005, now U.S. Pat. No. 8,670,390, which claims priority to Provisional Appl. No. 60/598,187, filed Aug. 2, 2004; and application Ser. No. 16/864,709 is a Continuation of U.S. patent application Ser. No. 14/727,769, filed Jun. 1, 2015; all of which are hereby incorporated by reference in their entireties and all of which this application claims priority under at least 35 U.S.C. 120 and/or any other applicable provision in Title 35 of the United States Code.

BACKGROUND

I. Field

The present invention relates generally to wireless communication networks, and more specifically to precoding multicarrier waveforms.

II. Background

The background description includes information that may be useful in understanding the present inventive subject matter. It is not an admission that any of the information provided herein is prior art or relevant to the presently claimed inventive subject matter, or that any publication, specifically or implicitly referenced, is prior art.

The most pressing need in mobile wireless wide area networks (WWANs), such as cellular networks, is to meet the increasing demand for data services. However, only a very small portion of the radio spectrum is suitable for WWAN communications. Above a few Gigahertz, path losses become too great for wide area communications in typical terrestrial environments. Only a fraction of the suitable spectrum is allocated for WWANs, and those allocations are divided among (ostensibly) competing cellular companies.

Various techniques have been proposed to enable more efficient use of the available spectrum, such as spectrum sharing, dynamic bandwidth exchange, and various "smart" radio schemes. Other techniques, such as joint scheduling and power control, can improve frequency reuse in cell configurations. Carrier aggregation simply allocates more radio channels to each client device without improving spectrum efficiency, providing a temporary increase in data services until those channels become congested.

While such techniques can provide more efficient use of the available WWAN spectrum, the laws of Physics still dictate a limit to the amount of information that can be carried with a given amount of WWAN spectrum and power. Unfortunately, demand for data bandwidth continues to grow, irrespective of the limitations imposed by Physics.

SUMMARY

In accordance with some aspects of the disclosure, this most pressing need for ever-increasing data bandwidth within a finite amount of spectrum is solved.

By way of example, a Cooperative-MIMO network comprises a distributed antenna system coordinated with Cooperative-MIMO functionality to serve multiple client devices, such as User Equipments (UEs) in a mobile WWAN. This may be referred to as server-side Cooperative MIMO. The distributed antennas can comprise a fronthaul network configured to deliver precoded Cooperative MIMO baseband signals (such as from a central processor, a distributed computing system (e.g., Cloud computing system), a remote processor, or other processor(s)) to the antennas to provide for precoded MIMO transmissions into the WWAN channel. Precoding can be configured to produce a localized coherence zone at each of the multiple client devices, which can enable each client device to be served with the entire available WWAN spectrum without causing interference to other ones of the multiple client devices. The localized coherence zone can be referred to as a spatial subchannel or a subspace channel. In one aspect, Cooperative-MIMO precoding configures the distributed network of antennas and the natural scattering environment to focus transmissions that coherently combine at each of the client devices, thereby producing the localized coherence zones. Similarly, Cooperative-MIMO demultiplexing can separate same-band transmissions from the client devices. While server-side Cooperative MIMO can provide nearly ideal frequency reuse of the WWAN spectrum, the amount of data that can be transmitted to each client device is limited by the WWAN spectrum (and power).

Therefore, in accordance with some aspects of the disclosure, the aforementioned server-side Cooperative-MIMO system(s) can further comprise a client-side Cooperative-MIMO system. By way of example, nearby client devices may self-organize into Cooperative-MIMO clusters, or some other technique may be employed to group client devices to provide for Cooperative-MIMO processing. For example, a server-side or some other centralized coordination technique may be employed. A wireless fronthaul network communicatively couples together the client devices to provide a cluster. The wireless fronthaul network can employ short-range wireless links, such as extremely high-bandwidth (relative to WWAN link bandwidth), low-power transmissions. The fronthaul transmissions can employ millimeter-wave, infrared, and/or optical spectrum, which is usually impractical for use in mobile WWANs, but which supports much higher data bandwidth than a WWAN channel. In some aspects, the fronthaul links might enable 10,000 times (or more) spectrum than the total available WWAN spectrum.

In systems disclosed herein, the theoretical limit of the WWAN data bandwidth is no longer limited by the WWAN spectrum, but rather, it can increase up to the data bandwidth of the cluster's very wideband fronthaul network minus some processing overhead. For example, on the downlink, cooperative processing among client devices in a cluster can allow one client device to aggregate the data bandwidth of all the subspace channels (i.e., localized coherence zones) serving the cluster. This is advantageous since each client device, even when it is active, does not employ its available downlink channel one hundred percent of the time. Rather, a client device typically transmits and receives data only a small fraction of the time it is being used. This is sometimes referred to as an activity factor. In accordance with aspects of the disclosure, as the cluster grows, each client device has more available instantaneous data bandwidth for the WWAN uplink and downlink. This is because multiple independent parallel spatial subchannels in the WWAN can be exploited to serve a single client device, thus expanding its data bandwidth far beyond the limited amount of spectrum in a single WWAN subspace channel.

Such aspects of the disclosure can provide the counter-intuitive result that as more client devices join a WWAN, the data bandwidth per client device increases instead of decreases, provided that there is a sufficient number of server-side antennas to accommodate the additional devices. In accordance with some aspects of the disclosure, client devices can be provisioned to operate as server-side antennas communicatively coupled to the server-side fronthaul network. This allows the network infrastructure to grow as client devices join the WWAN. A generalized concept of a relay node is introduced in which the relay node may be part of a server-side distributed antenna system, a client-side cluster, or both. A relay node can operate in multiple clusters and/or multipoint groups. The relay node can be a client device, a server-side device or component, or some other device, and it can be configured to adapt its function as it operates with different cooperating devices.

In accordance with some aspects of the disclosure, cooperative processing can be configured to reduce backhaul overhead, including the data bandwidth required for backhaul communications. For example, in some aspects, cooperative processing at the edge of the radio access network can reduce backhaul loads. However, in many aspects, the backhaul network's spectrum is far larger than the amount of spectrum allocated to the WWAN. Thus, in some implementations, a practical limitation to the WWAN data bandwidth might be related to the processing capability of the cooperating devices. This limitation can be advantageous in view of the alternative, because unlike the hard limitation imposed by Physics, processing power approximately doubles every eighteen months according to Moore's Law.

Some aspects of the disclosure provide for configuring distributed processing to enhance processing efficiency. For example, processing performed by cooperating client devices can be configured via various techniques and/or algorithms to improve processing efficiency. As used herein, processing efficiency can be achieved by employing signal processing algorithms that require a fewer number of total operations, require a fewer number of complex operations, require a fewer number of data exchanges with other processors, reduce latency, reduce power consumption, reduce processor idle time, and the like. Various processing techniques, such as pipelined processing architectures and the like, can be configured to improve processing efficiency. An end result of improved processing efficiency can include, among other things, a cluster being able to comprise a larger number of cooperating devices.

In some aspects of the disclosure, system configurations produce a high-rank channel matrix, which permits lower-complexity maximum ratio combining/transmission to be employed instead of zero forcing or other higher-complexity algorithms.

In accordance with some aspects of the disclosure, various signal-processing algorithms employed in a WWAN transceiver can be combined, thus enabling a more efficient implementation. In some aspects, complex spreading codes can be employed to spread data symbols (e.g., user data and/or reference signals) to enable certain benefits, such as crest-factor reduction, which can enable lower power consumption, less-expensive radio components, and/or other benefits.

While some aspects of the disclosure can employ techniques to reduce the peak-to-average power (PAPR) of an OFDM transmission at the inverse discrete Fourier transform (IDFT), such as by operating on the signal output at the IDFT (e.g., via clipping, signal cancellation, or selecting one of a set of candidate OFDM signals that has the lowest PAPR), certain advantages can be realized by spreading the data symbols before the IDFT operation in a manner that causes the IDFT output signal to have a low PAPR. In such aspects, the spreading codes can be configured in response to OFDM subcarrier assignment to the device (e.g., uplink subcarriers assigned to a client device) to produce a transmitted OFDM signal with low PAPR. Parameters of the assigned subcarriers, such as subcarrier frequency spacing and number of subcarriers, can be used to determine complex spreading codes that produce a low-PAPR signal at the IDFT output. Configuring the spreading codes to provide a spread-OFDM signal with low PAPR can comprise an appropriate mapping of spread symbols to OFDM subcarriers in a manner that produces the desired low-PAPR signal. This can include re-ordering the output of the spreader prior to its input to the IDFT. In some aspects, OFDM subcarriers are assigned to a client device by a server-side device, such as to provide for channel-dependent scheduling. Thus, the server-side device can also determine the complex spreading codes for the purpose of de-spreading signals received from the client device In some aspects of the disclosure, characteristics of a data signal, such as its spectral information (i.e., frequency response) may be processed. In accordance with some aspects of the disclosure, this processing is responsive to OFDM subcarrier assignment to configure complex spreading of the data signal (and/or its spectral information) in a manner that, based on parameters of the assigned subcarriers (such as frequency spacing), produces a spread-OFDM signal with low PAPR. Without complex spreading configured in the aforementioned manner, the spectral information modulated onto an OFDM signal can produce a transmission with high PAPR. In some aspects of the disclosure, a transmitter receives an OFDM subcarrier assignment, and based on subcarrier parameters (such as frequency spacing, number of subcarriers, and/or other parameters) configures a transform operation that includes complex spreading codes which spread a data signal in a manner that, when modulated onto the OFDM subcarriers, produces a superposition signal (i.e., a transmitted OFDM signal) with a low PAPR.

By way of example, data spreading in the WWAN uplink channel can be performed by the individual client devices, wherein the spreading codes can be configured to employ fast algorithms for spreading and/or spreading-code generation. In some aspects, the data spreading can be configured to employ a similar fast algorithm used for a different signal processing operation, such as an IDFT used for modulating data onto an OFDM signal and/or a DFT used for demodulation. This can permit a given logical structure and/or physical processor architecture to perform similar signal processing algorithms (e.g., fast algorithms) for different radio transceiver operations (e.g., coding and modulation). In some aspects, a pipelined architecture can be employed, such as to make efficient use of one or more processors (e.g., a specialized hardware component or a general-purpose processor configured to perform the fast algorithm) to perform the different radio transceiver operations. In some aspects, multiple processors residing on different devices (e.g., client devices, server devices, combinations thereof) can be configured to cooperatively process signals via fast algorithms, wherein the client-side fronthaul can function as a computer bus (such as between processors, memories, ports, and/or other network resources) between computing components distributed across multiple network nodes, including client devices. In such aspects, the networked processors can be pipelined to provide efficient processing of multiple radio transceiver operations.

By way of example, a fast algorithm can be a fast Fourier transform (FFT), such as a radix-2 FFT. Thus, a client device can be configured to perform a radix-2 FFT as part of a DFT-spreading of original data symbols, and the client device can be configured to perform a radix-2 FFT to modulate the spread data symbols onto OFDM subcarrier signals. In some aspects, the client device can configure processing hardware and/or software to employ the same radix-2 FFT (although possibly with different input parameters, transform size, etc.) for different, typically unrelated, radio transceiver operations, such as DFT-spreading and OFDM modulation, or DFT-spreading and OFDM demodulation, as well as others. It should be appreciated that such aspects may be performed as part of cooperative processing among multiple client devices, on the server side, with the aid of one or more relay devices, and/or some combination thereof.

In accordance with some aspects of the disclosure, spreading produces a different result than spectrum analysis. For example, spectrum analysis can provide for calculating frequency responses of a signal corresponding to tones. The term, "tones," is commonly used to mean orthogonal frequencies, such as in relation to the term, "discrete multitone modulation," which denotes OFDM-based communication systems that adapt the transmission to the channel conditions individually for each subcarrier. In OFDM, as in spectrum analysis, the tones are a set of frequency-multiplexed signals with the exact frequencies needed to make them orthogonal so they do not interfere with each other. In discrete systems, spectrum analysis expresses a discrete signal of N complex data symbols as a set of N/2 frequency responses. This is because frequencies between the Nyquist rate $f_{sam}/2$ and the sample rate $f_{sam}$ alias to negative frequencies due to sampling above the Nyquist rate. These are the same tones as the corresponding positive frequencies. While the output of a DFT comprises N values, there are only N/2 tones, so the N/2 redundant frequency responses are typically discarded to provide spectral analysis, resulting in only half the values that DFT spreading would otherwise provide.

In some aspects of the disclosure, a radio transceiver can be configured to perform another type of signal-processing operation for different, typically unrelated, radio transceiver operations. By way of example, linear network coding can be configured to employ similar processing operations as in MIMO subspace precoding (i.e., multiplexing) and/or demultiplexing. Similarly, linear network decoding can employ similar operations as MIMO subspace multiplexing and/or demultiplexing. Thus, client-side and/or server-side processors can be configured to perform linear network coding that employs basically the same algorithms used to provide for spatial multiplexing and/or demultiplexing.

Aspects disclosed herein can be implemented as apparatus configurations comprising structural features that perform the functions, algorithms, and methods described herein. Flow charts and descriptions disclosed herein can embody instructions, such as in software residing on a non-transitory computer-readable medium, configured to operate a processor (or multiple processors). Flow charts and functional descriptions, including apparatus diagrams, can embody methods for operating a communication network(s), coordinating operations which support communications in a network(s), operating network components (such as client devices, server-side devices, relays, and/or supporting devices), and assembling components of an apparatus configured to perform the functions disclosed herein.

Groupings of alternative elements or aspect of the disclosed subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified, thus fulfilling the written description of all Markush groups used in the appended claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element as essential to the practice of the inventive subject matter.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the invention will become more fully apparent from the following description and appended claims, or may be learned by the practice of the invention as set forth herein.

The following patent applications and patents are hereby incorporated by reference in their entireties: U.S. Pat. No. 8,670,390, patent applicationSer. No. 10/145,854, patent application Ser. No. 10/414,663, patent application Ser. No. 10/360,346, U.S. Pat. No. 9,225,471, U.S. Pat. No. 9,270,421, U.S. Pat. No. 9,325,805, patent application Ser. No. 14/789,949, patent application Ser. No. 62/197,336, patent application Ser. No. 14/967,633, patent application Ser. No. 60/286,850, U.S. Pat. No. 8,929,550, U.S. Pat. No. 7,430,257, U.S. Pat. No. 6,331,837, and U.S. Pat. No. 7,076,168.

BRIEF DESCRIPTION OF DRAWINGS

Flow charts depicting disclosed methods comprise "processing blocks" or "steps" may represent computer software instructions or groups of instructions. Alternatively, the processing blocks or steps may represent steps performed by functionally equivalent circuits, such as a digital signal processor or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present disclosure. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied. Unless otherwise stated, the steps described below are unordered, meaning that the steps can be performed in any convenient or desirable order.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the invention. It should be understood, however, that the particular aspects shown and described herein are not intended to limit the invention to any particular form, but rather, the invention is to cover all modifications, equivalents, and alternatives falling within the scope of the invention as defined by the claims.

Figure 1:
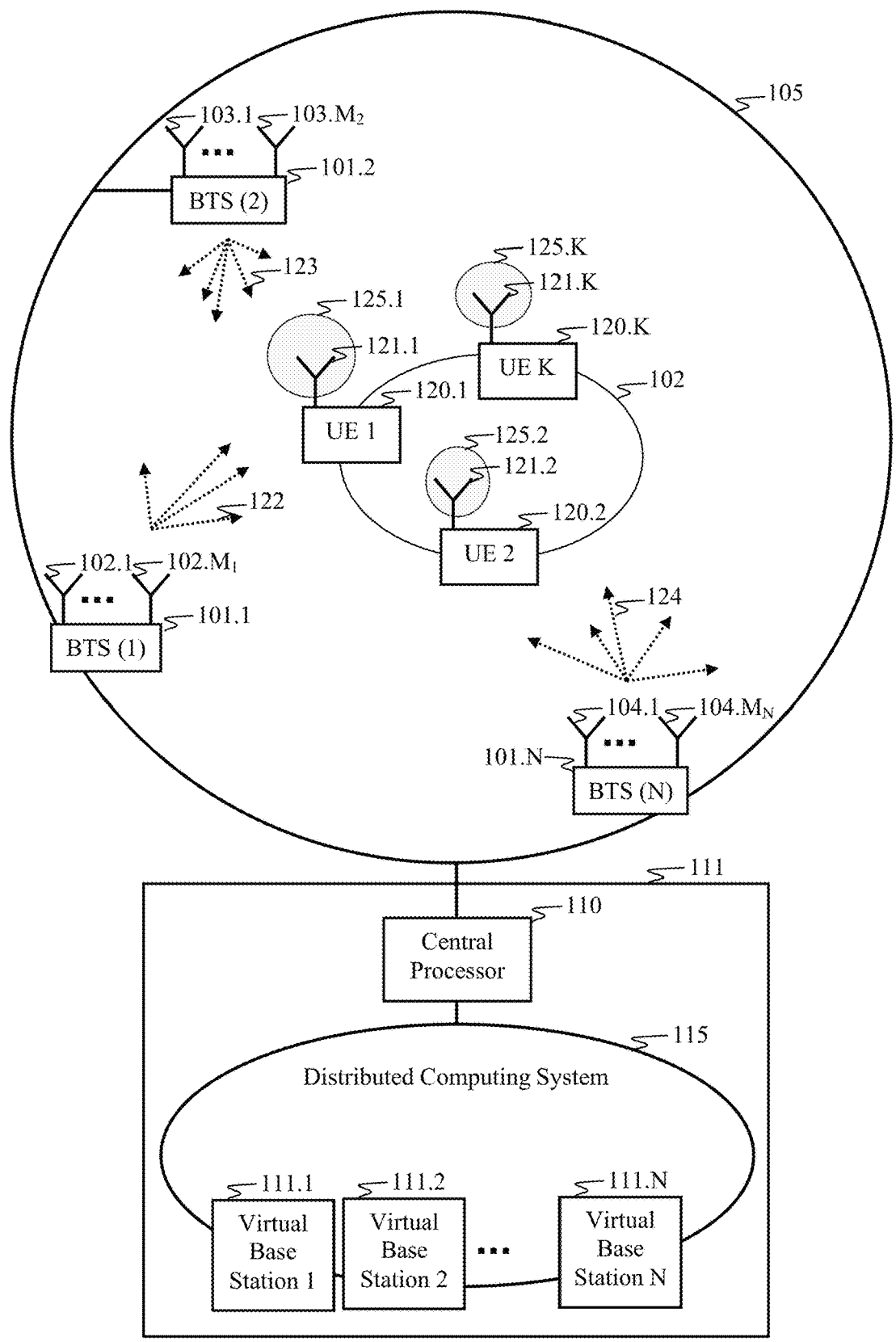
FIG. 1 is a block diagram of a communication system architecture in accordance with an exemplary aspect of the disclosure.

FIG. 1 is a block diagram of a communication network in accordance with an exemplary aspect of the disclosure. A plurality N of geographically distributed base transceiver stations 101.1-101.N (BTS(1), BTS(2), . . . , BTS(N)) are communicatively coupled to a super-array processing system 111 via a communication network 105. Each base transceiver station 101.1-101.N comprises an antenna system configured for communicating with one or more mobile units (e.g., User Equipment) 120.1-120.K via a WWAN radio access network (RAN).

In one aspect, the first base transceiver station 101.1 comprises a first antenna array comprising a first plurality $M_1$ of antennas 102.1-102.$M_1$, the second base transceiver station 101.2 comprises a second antenna array comprising a second plurality $M_2$ of antennas 102.1-102.$M_1$, and the $N^{th}$ base transceiver station 101.N comprises an $N^{th}$ antenna array comprising an $N^{th}$ plurality $M_N$ of antennas 104.1-

104.$M_N$. The base transceiver stations 101.1-101.N are configured to provide RAN services to a plurality K of mobile units 120.1, 120.2, . . . , 120.K, each having its own antenna system 121.1, 121.2, . . . , 121.K, respectively. Each antenna system 121.1, 121.2, . . . , 121.K may comprise one or more antennas.

The communication network 105 may comprise a fiber network, a cable (i.e., wired) network, a wireless network (including a free-space optical network), or any combination thereof. In some aspects, the network 105 is referred to as a "fronthaul" network. In some aspects, the network 105 can comprise a backhaul network. In accordance with one aspect of the disclosure, a network that connects base transceiver stations to a processing system configured to perform joint processing (e.g., system 111) can be referred to as a fronthaul, and a network (such as network 115) which connects processing elements of the super-array processing system 111 can be referred to as a backhaul.

The terms "backhaul" and "fronthaul" can be used interchangeably in some aspects of the disclosure. A fronthaul is similar to a backhaul, which, at its simplest, links a radio access network to a wired (e.g., cable or optical fiber) network. A fronthaul can comprise a backhaul, or a portion of a backhaul. For example, a fronthaul can comprise a connection between one or more centralized controllers and remote stand-alone radio heads. A fronthaul can connect a central processor to multiple base transceiver stations. A fronthaul connects multiple base transceiver stations together when one or more of the base transceiver stations functions as a central processor. As used herein, a fronthaul may comprise a traditional backhaul network. For example, a fronthaul can comprise at least a portion of S1 and/or X2 interfaces. A fronthaul may be part of a base station network. In patent application Ser. No. 60/286,850, it is disclosed that a fronthaul can comprise optical fiber, wired, and/or radio networks. In one aspect of the disclosure, point-to-point fiber links provide high bandwidth and low latency. In another aspect, radio (e.g., microwave) links can provide high bandwidth and low latency, and can be substantially less expensive to implement than fiber. Furthermore, wireless links enable mobile radios and/or other radio transceivers (e.g., remote radio equipment) to be networked together via a radio fronthaul, such as disclosed in patent application Ser. No. 10/131,163. Accordingly, a fronthaul can comprise any combination of wireless, wired, and optical fiber links that communicatively couple together a group of radio transceivers configured to perform cooperative MIMO. Here, a group of radio transceivers is also referred to as a "micro-cell" and a "pico-cell" in the '163 application, and as a "local group" and a "micro-network" in patent application Ser. No. 11/187,107, all of the patents and patent applications mentioned in this disclosure being incorporated by reference in their entireties.

In one aspect of the disclosure, the super-array processing system 111 comprises a distributed computing system configured to coordinate a plurality of physical processors (which may be centrally located or geographically distributed) such as to perform joint processing. In some aspects, the plurality of physical processors can be represented as processors 111.1-111.N. In other aspects, virtual processors (such as virtual base stations implemented as software-defined radios (SDRs)) can be represented as processors 111.1-111.N.

By way of example, but without limitation, physical processors in a distributed computing environment can be represented as processors 111.1-111.N. As used herein, the term "processor" can refer to a computer processor, a computer, a server, a central processing unit (CPU), a core, a microprocessor, and/or other terminology that indicates electronic circuitry configurable for carrying out instructions of a computer program. In some aspects, a processor comprises geographically distributed computing elements (e.g., memories, processing cores, switches, ports, and/or other computing or network resources). A fronthaul and/or backhaul network communicatively coupling the geographically distributed computing elements can function as a computer bus.

The processors are communicatively coupled together via at least one network, such as a backhaul network 115. The backhaul network 115 can comprise an optical fiber network, a wireline network (e.g., Ethernet or other cable links), a wireless network, or any combination thereof. In some aspects, the backhaul network 115 can comprise the RAN. In one aspect, each of N processors is programmed to function as one of a plurality N of virtual base stations 111.1-111.N. In another aspect, each virtual base station 111.1-111.N comprises multiple processing cores. In some aspects, each virtual base station 111.1-111.N represents a hardware abstraction wherein details of how the hardware is implemented are concealed within the representation of each "processor" 111.1-111.N as a single element. In such aspects, the physical implementation of each processor 111.1-111.N can comprise physical computing elements that are geographically distributed and/or physical computing elements that are shared by multiple virtual base stations 111.1-111.N.

By way of example, each virtual base stations 111.1-111.N may comprise one or more of the processors and perform base station processing operations that would ordinarily be performed by one or more corresponding base stations 101.1-101.N. Specifically, virtual base stations can be implemented via software that programs general-purpose processors. For example, an SDR platform virtualizes baseband processing equipment, such as modulators, demodulators, multiplexers, demultiplexers, coders, decoders, etc., by replacing such electronic devices with one or more virtual devices, wherein computing tasks perform the functions of each electronic device. In computing, virtualization refers to the act of creating a virtual (rather than actual) version of something, including (but not limited to) a virtual computer hardware platform, operating system (OS), storage device, or computer network resources.

In accordance with the art of distributed computing, a virtual base station's functions can be implemented across multiple ones of the plurality of processors. For example, workloads may be distributed across multiple processor cores. In some aspects, functions for more than one base station are performed by one of the processors.

As used herein, distributed computing refers to the use of distributed systems to solve computational problems. In distributed computing, a problem is divided into multiple tasks, and the tasks are solved by multiple computers which communicate with each other via message passing. A computer program that runs in a distributed system is referred to as a distributed program. An algorithm that is processed by multiple constituent components of a distributed system is referred to as a distributed algorithm. In a distributed computing system, there are several autonomous computational entities, each of which has its own local memory.

In accordance with aspects of the disclosure, the computational entities (which are typically referred to as computers, processors, cores, CPUs, nodes, etc.) can be geographically distributed and communicate with each other via message passing. In some aspects, message passing is performed on a fronthaul and/or backhaul network. The distributed computing system can consist of different types of computers and network links, and the system (e.g., network topology, network latency, number of computers, etc.) may change during the execution of a distributed program. In one aspect, a distributed computing system is configured to solve a computational problem. In another aspect, a distributed computing system is configured to coordinate and schedule the use of shared communication resources between network devices.

A distributed computing system can comprise a grid computing system (e.g., a collection of computer resources from multiple locations configured to reach a common goal, which may be referred to as a super virtual computer). In some aspects, a distributed computing system comprises a computer cluster which relies on centralized management that makes the nodes available as orchestrated shared servers. In some aspects, a distributed computing system comprises a peer-to-peer computing system wherein computing and/or networking comprises a distributed application architecture that partitions tasks and/or workloads between peers. Such distributed peer-to-peer computing systems are disclosed in the '107 application. In some aspects, peers are equally privileged, equipotent participants in the application. They are said to form a peer-to-peer network of nodes. Peers make a portion of their resources, such as processing power, disk storage, network bandwidth, etc., available to other network participants without the need for central coordination by servers or stable hosts. Peers can be either or both suppliers and consumers of resources.

In accordance with some aspects of the disclosure, the base transceiver stations 101.1-101.N are "dumb terminals," wherein base station signal processing (for example, the baseband processing) is performed by the central processor 110 (which may include the distributed computing system 111). Thus, in some aspects, the base transceiver stations 101.1-101.N are simply radio remote units. For example, the base transceiver stations 101.1-101.N might perform only basic signal-processing functions, such as RF processing (i.e., radio front-end processing), which can include frequency conversion and (optionally) ADC/DAC functions, while the central processor 110 (which may include the distributed computing system 111) performs baseband processing, including channel analysis and generating base transceiver MIMO weights.

In one aspect, the central processor 110 coordinates or performs baseband signal processing corresponding to base station operations, whereas the base transceivers 101.1-101.N provide only RF front end signal processing, including frequency conversion, and optionally, ADC/DAC. The central processor can perform waveform shaping, error detection, error correction, power control, channel selection, multiple access control, multiplexing, modulation, formatting, synchronization, coding, etc. for the plurality of base transceivers (i.e., access points) communicatively coupled to the central processor via the fronthaul network. In some aspects of the disclosure, the central processor 110 provides for base-station functionality, such as power control, code assignments, and synchronization. The central processor 110 may perform network load balancing (e.g., scheduling RAN resources), including providing for balancing transmission power, bandwidth, and/or processing requirements across the radio network. Centralizing the processing resources (i.e., pooling those resources) facilitates management of the system, and implementing the processing by employing multiple processors configured to work together (such as disclosed in the '163 application) enables a scalable system of multiple independent computing devices, wherein idle computing resources can be allocated and used more efficiently.

Some aspects allow base station processing resources (e.g., the processors in the distributed computing system 111) and the remote RF units (e.g., the base transceiver stations 101.1-101.N) to be deployed separately. For example, RAN coverage, capacity, and/or data bandwidth per UE can be improved by adding base transceiver stations, and then the SDR platform dynamically adapts to the new RAN base station configuration. Similarly, the SDR platform can adapt to the loss of one or more of the base transceiver stations 101.1-101.N. The distributed computing system (e.g., cloud network) 111 can adapt to varying processing loads by allocating computing resources as needed. Furthermore, system upgrades, such as new transmission protocols, can be easily implemented via software upgrades to the SDR platform.

In some aspects, base-station functionality is controlled by individual base transceiver stations and/or UEs assigned to act as base stations. Array processing may be performed in a distributed sense wherein channel estimation, weight calculation, and optionally, other network processing functions (such as load balancing) are computed by a plurality of geographically separated processors. In some aspects, access points and/or subscriber units are configured to work together to perform computational processing. A central processor (such as central processor 110) may optionally control data flow and processing assignments throughout the network.

As disclosed in the '850 application, the system depicted in FIG. 1 can provide system performance benefits by centralizing (e.g., pooling) much of the equipment (and/or signal processing) typically employed at the cell sites. Cost reduction is another motivation for centralizing the radio access network, as most of a cellular network's ownership costs comprise operating costs, including site rental, power, and support and maintenance expenses. Thus, instead of distributing baseband processing equipment at the edge of the network as in conventional cellular networks, centralizing the radio access network at the central processor 110 can greatly reduce capital expenditures to build out and upgrade the radio access network, as well as reduce operating expenditures.

As disclosed in the '163 application, providing for distributed computing at the central processor 110 provides network function virtualization to the RAN. Benefits that can be realized with some aspects of the disclosure include cost reduction from pooling and virtualizing baseband processing. This can eliminate the need to provision for peak capacity on a per-site basis, thus reducing processing requirements. Furthermore, instead of requiring dedicated base station hardware, some of the disclosed aspects provide for the use of commercial (e.g., general-purpose) servers running software.

As disclosed in the patents and applications incorporated by reference herein, other types of networks, including wireless networks, can connect the base transceiver stations 101.1-101.N. One of the advantages of employing the optical fiber fronthaul 105 is that optical fiber can provide the high capacity and low latency required by many aspects of the invention. For example, when a large number of baseband processors are co-located at the central processor 110, the amount of data bandwidth in the fronthaul and the synchronization requirements between base transceiver stations 101.1-101.N can increase substantially when high RF bandwidth and MIMO are employed. Different aspects of the invention can provide for different functional splits between centralized and distributed functions.

Some aspects of the invention can reduce fronthaul requirements by implementing at least some of the Physical Layer processing at the base transceiver stations 101.1-101.N while implementing other processing (e.g., higher layer processing, or the higher layer processing plus some of the Physical layer processing) at the central processor 110. Thus, in some aspects of the invention, one or more of the base transceiver stations 101.1-101.N depicted in the figures may be replaced by UEs adapted to perform as routers, repeaters, and/or elements of an antenna array.

In one aspect of the disclosure, the base station network comprising base transceiver stations 101.1-101.N is adapted to operate as an antenna array for MIMO subspace processing in the RAN. In such aspects, a portion of the network may be adapted to serve each particular UE. The SDRs (represented as the virtual base stations 111.1-111.N) can be configured to perform the RAN baseband processing. Based on the active UEs in the RAN and the standard(s) they use for their wireless links, the SDRs can instantiate virtual base station processes in software, each process configured to perform the baseband processing that supports the standard(s) of its associated UE(s) while utilizing a set of the base transceiver stations within range of the UE(s).

In accordance with one aspect of the disclosure, baseband waveforms comprising RAN channel measurements and/or estimates (such as collected by either or both the UEs and the base transceiver stations) are processed by the SDRs (such as in a Spatial Multiplexing/Demultiplexing module (not shown)) using Cooperative-MIMO subspace processing to produce pre-coded waveforms. A routing module (not shown) sends the pre-coded waveforms over the fronthaul 105 to multiple ones of the base transceiver stations 101.1-101.N, and optionally, to specific antennas 102.1-102.$M_1$, 103.1-103.$M_2$, . . . , 104.1-104.$M_N$. The base transceiver stations 101.1-101.N can be coordinated to concurrently transmit the pre-coded waveforms such that the transmitted waveforms propagate through the environment and constructively interfere with each other at the exact location of each UE 120.1-120.K.

In one aspect, the super-array processing system 111 configures complex-weighted transmissions 122, 123, and 124 from the geographically distributed base transceiver station 101.1, 101.2, and 101.N, respectively to exploit the rich scattering environment in a manner that focuses low-power scattered transmissions to produce a concentrated high-power, highly localized signal (e.g., coherence zones 125.1, 125.2, . . . , 125.K) at each UE's 120.1-120.K antenna system 121.1, 121.2, . . . , 121.K, respectively. The coherent combining of the transmitted waveforms at the location of each UE 120.1-120.K can result in the synthesis of the baseband waveform that had been output by the SDR instance associated with that particular UE 120.1-120.K. Thus, all of the UEs 120.1-120.K receive their own respective waveforms within their own synthesized coherence zone concurrently and in the same spectrum.

In accordance with one aspect of the invention, each UE's corresponding synthesized coherence zone comprises a volume that is approximately a carrier wavelength or less in width and centered at or near each antenna on the UE. This can enable frequency reuse between nearby—even co-located—UEs. As disclosed in the '107 application, Spatial Multiplexing/Demultiplexing can be configured to perform maximum ratio processing. Any of various algorithms for MIMO processing disclosed in the '107 application may be employed by methods and apparatus aspects disclosed herein. Some aspects can comprise zero forcing, such as to produce one or more interference nulls, such as to reduce interference from transmissions at a UE that is not an intended recipient of the transmission. By way of example, but without limitation, zero forcing may be performed when there are a small number of actual transmitters (e.g., base transceiver station antennas) and/or effective transmitter sources (e.g., scatterers in the propagation environment).

While the aforementioned techniques of server-side Cooperative MIMO in a multi-user MIMO system provide substantial bandwidth efficiency, which is a significant advance in wireless communications, the amount of data bandwidth available to each UE is still hard-limited based on the total radio bandwidth allocated to the WWAN. However, client-side Cooperative MIMO can elegantly circumvent the data bandwidth limitation of the aforementioned multi-user MIMO system.

By way of example, some aspects of the disclosure configure the UEs 120.1-120.K to form a cluster in which the individual UEs 120.1-120.K are communicatively coupled together via a client device fronthaul network 102, which can comprise any of various types of local area wireless networks, including (but not limited to) wireless personal area networks, wireless local area networks, short-range UWB networks, wireless optical networks, and/or other types of wireless networks. In some aspects, since the bandwidth of the client device fronthaul network 102 is typically much greater than that of the WWAN, a UE 120.1-120.K can share its access to the RAN (i.e., its WWAN spatial subchannel, or coherence zone) with other UEs 120.1-120.K in the cluster, thus enabling each UE 120.1-120.K to enjoy up to a K-fold increase in instantaneous data bandwidth.

In some aspects, otherwise inactive UEs can share their WWAN access with active UEs in the cluster. Since the activity factor of an active UE is typically a small fraction, an active UE can share its unused WWAN spatial subchannel with other UEs in the cluster. In addition to access to higher data bandwidth, there can be other incentives for a UE to cooperate in a cluster, including (but not limited to) lower power consumption (such as due to client-side antenna array gain), improved coverage and reliability, as well as other benefits and incentives.

In some aspects, a cluster of UEs can perform cooperative subspace demultiplexing. In some aspects, the cluster can perform cooperative subspace multiplexing by coordinating weighted (i.e., pre-coded) transmissions to produce localized coherence zones at other clusters and/or at the base transceiver stations 101.1-101.N. In some aspects, the UEs 120.1-120.K comprise a distributed computing platform configured to perform distributed processing (and optionally, other cloud-based services). Distributed processing may be performed for Cooperative-MIMO, other various SDR functions, and/or any of various network control and management functions.

Figure 2:
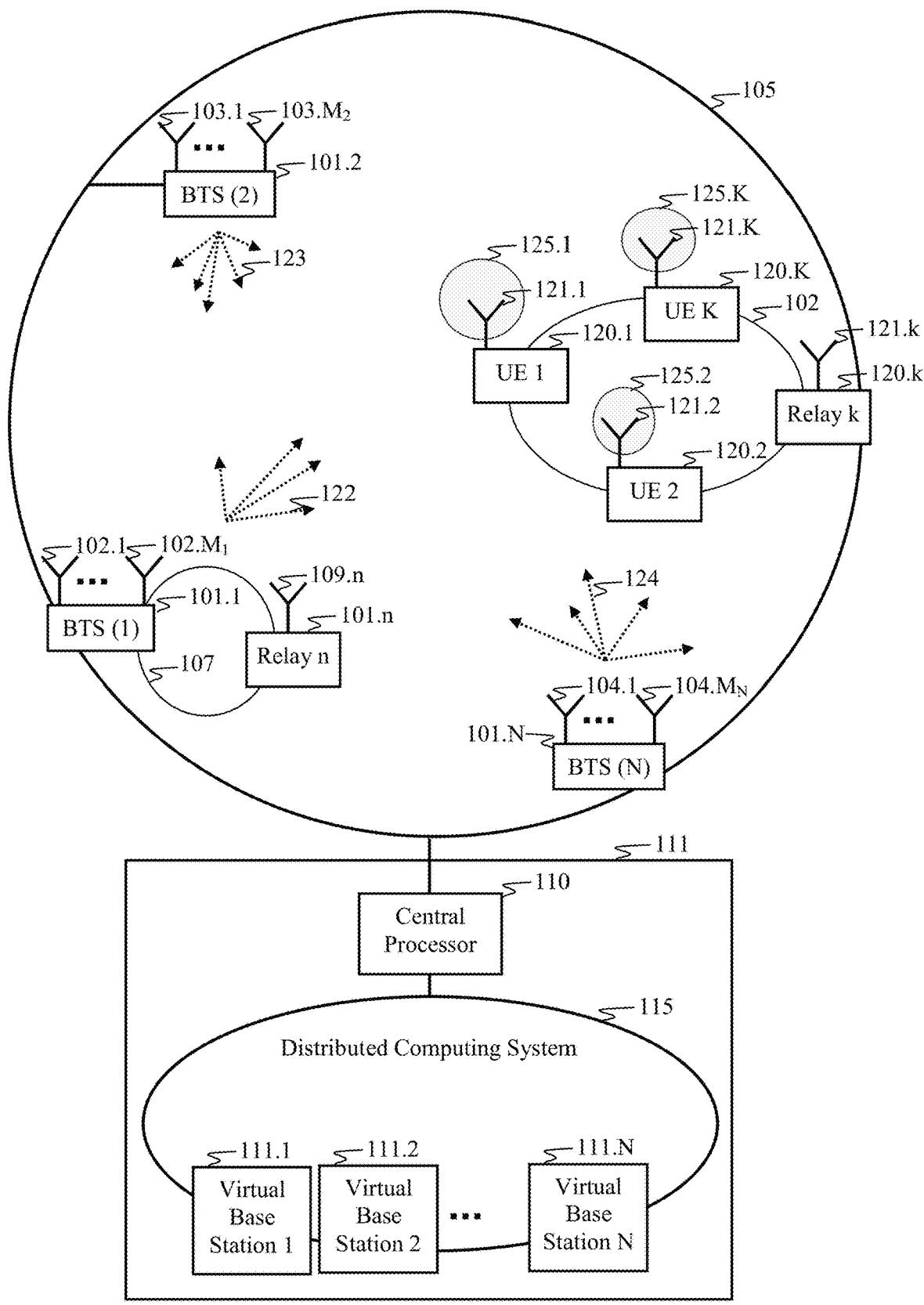
FIG. 2 illustrates a network configuration for super-array processing in accordance with some aspects of the disclosure.

FIG. 2 is a block diagram of a communication network in accordance with another exemplary aspect of the disclosure. Similar features depicted in FIG. 1 have the same reference numerals. In FIG. 2, the concept of a relay node is introduced. By way of example, a relay n 101.$n$ comprises and antenna system 109.$n$ and is communicatively coupled to at least one base transceiver station (such as BTS (1)) via a fronthaul network, which may be fronthaul 105 or a separate fronthaul 107. Similarly, a relay k 120.$k$ is depicted as being communicatively coupled to a cluster of UEs 120.1-120.K via fronthaul 102. The relay k 120.k may be coupled to other network nodes via other fronthauls (such as fronthaul 105).

In one aspect, a relay is a dedicated relay node, such as may be configured specifically to operate as part of the WWAN infrastructure. In another aspect, a relay is an abstraction which denotes any of various devices that is configurable to operate as a relay node, as a member of a UE cluster, and/or as a member of server-side (e.g., BTS) antenna system (e.g., in a base transceiver antenna cluster). In some aspects, a relay can be a UE. In some aspects, a relay can be a base transceiver station. For example, relay n 101.*n* may be a UE configurable to cooperate with base transceiver station 101.1, such as to increase the rank of the antenna system's 102.1-102.$M_1$ channel matrix. Relay k 120.*k* can comprise a base transceiver station configurable to communicate with a UE cluster 120.1-120.K via its fronthaul 102, and/or increase the rank of the cluster's channel matrix. In some aspects, a relay can simultaneously operate in multiple clusters. For example, a relay could operate in multiple UE clusters. In some aspects, a relay can operate as both a UE and a base transceiver station (or as a component of a base transceiver station's antenna system).

As disclosed in the patents and patent applications incorporated by reference herein, and particularly with respect to aspects of Cooperative-MIMO systems and methods, network nodes can function as either or both clients and servers. Furthermore, when wireless network nodes cooperate in subspace processing, they can create network resources, such as subspace (i.e., spatial multiplexing) channels, performance gains, RAN coverage area, etc. Even when UEs cooperate as a client array (e.g., a UE cluster) in a Cooperative-MIMO implementation, each UE can improve the data bandwidth, quality of service, range, and power efficiency of the other UEs in the array, or cluster. Thus, in some aspects of a Cooperative-MIMO system, UEs can extend the network infrastructure, such as to increase per-client data bandwidth, the number of clients served, coverage area, and/or quality of service without requiring substantial capital outlays from network operator to upgrade the base station network.

In Cooperative-MIMO systems, mobile UEs can opportunistically join together via a peer-to-peer overlay network (e.g., fronthaul 102) for client-side MIMO processing. In some aspects, UEs can join base transceiver arrays via an overlay network (e.g., fronthaul 107) to assist in server-side MIMO processing. Due to random movement of UEs, aspects of the disclosure do not impose a particular structure on the overlay network. Because there is no structure globally imposed upon them, unstructured networks are easy to build and allow for localized optimizations to different regions of the overlay. Also, in such aspects, because the role of all peers in the network is the same, unstructured networks can be highly robust in the face of high rates of churn (i.e., when peers are frequently joining and leaving the network).

Figure 3:
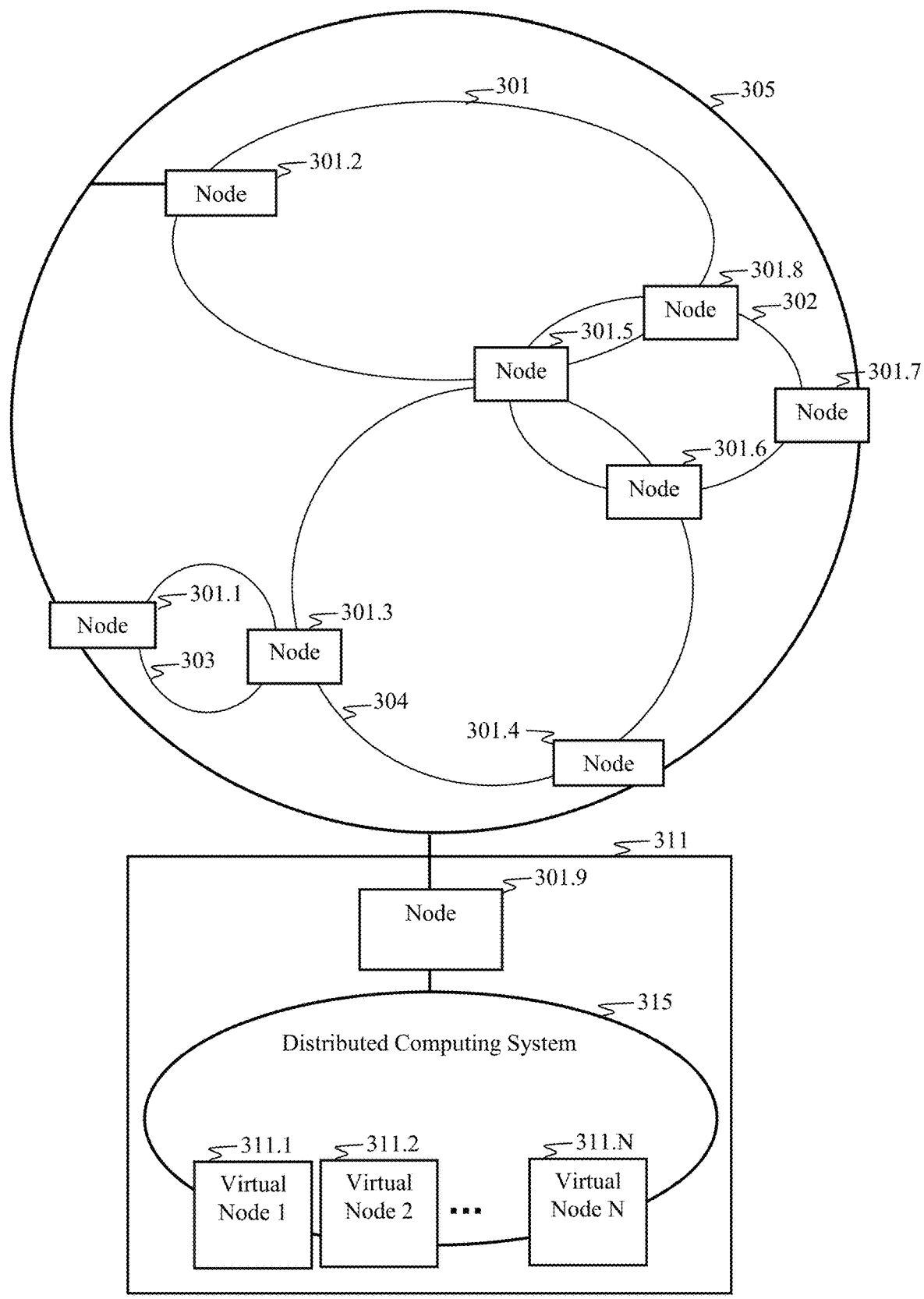
FIG. 3 is a block diagram of a network topology, the type of which can be employed in accordance with aspects of the disclosure.

FIG. 3 is a block diagram of a network topology, the type of which can be employed in accordance with aspects of the disclosure. In this network topology, a plurality of nodes (e.g., nodes 301.1-301.N) are communicatively coupled together via communication links (such as depicted by networks 301-305), which form a network fabric. The depiction of "nodes" is a generalization, as the nodes 301.1-301.N can comprise server-side devices, client-side devices, relay devices (or other intermediate devices), and/or combinations thereof.

A network fabric can comprise a switched fabric, which is a network topology in which nodes 301.1-301.N connect via one or more network switches. Switches in a switched fabric can form a mesh network. While switched fabrics are typically associated with fibre channel switched fabrics, which use fibre channel switches, aspects of the disclosure include network fabrics with wireless links between at least some of the nodes. These wireless links can be radio channels, infrared, and/or free-space optical channels.

A network topology describes the arrangement of nodes and links of a communication network, and can comprise either or both a physical topology and a logical topology. The physical topology conveys the location of each node and characteristics of the links, and can include distances between nodes, node interconnections, transmission rates, signal types, and other physical-layer attributes. The logical topology conveys the data flows within a network, which can be independent of the physical design.

In some aspects, at least some of the nodes 301.1-301.N in the network fabric can comprise aerial platforms, such as unmanned aerial vehicles (UAVs). By way of example, mobile radio communication services (such as a radio access network (RAN)) can be provided by using a network fabric comprising UAVs configured for network fronthaul and/or backhaul operations. The use of such mobile aerial platforms can be advantageous when there is a need to quickly deploy a radio network and/or dynamically adapt to changing user-demand topologies.

With the use of broadband data links between nodes in an aerial network fabric, such as can be implemented via short-range wideband radio, infrared, and/or free-space optical links, data rates over the network fabric can be commensurate with computer bus speeds. Not only can the aerial network fabric serve as the fronthaul and/or backhaul to enable the RAN's data transport, the aerial network fabric can serve as a computing bus that connects computing elements (and other resources) residing on different network nodes to support other applications.

In one aspect, each node 301.1-301.N manages its contribution of shared resources for performing at least one other application while performing its RAN data transport duties. The other application(s) could include remote sensing or other various environment-monitoring operations, transcoding or other various media-processing operations, network security operations, content delivery management, client-device services (e.g., cloud storage, cloud computing, software-as-a-service, navigation, etc.), and/or RAN-supporting applications (e.g., Cooperative-MIMO, error detection/correction, coding/decoding, etc.).

Each application can comprise a combination of a routing topology, a storage topology, and a computation topology. In one aspect, one or more of the networks 301-305 corresponds to a topology for a particular application. By way of example, a storage topology can comprise storage devices distributed across multiple network nodes, and the storage topology can comprise a routing topology that is specific to accessing the storage devices for cloud storage on the multiple network nodes. The routing topology for cloud storage is typically different than the routing topology for RAN data transport. Thus, each node may comprise separate routing cores dedicated to different routing topologies. Similarly, each node may comprise separate storage devices, such as one set dedicated to RAN data transport and another set dedicated to a cloud storage application.

By way of example, a computation topology can comprise computing elements distributed across multiple network nodes. In one aspect, such as depicted in FIG. 3, a system of resources 311 (such as a network of nodes) can be abstracted as a single node in a given topology. In some aspects, virtual nodes 311.1-311.N (where N represents the number of virtual nodes) are an abstraction that conceals a corresponding underlying physical architecture, which can comprise multiple hardware components communicatively coupled together. The hardware components of a virtual node 311.1-311.N might change during an application, such as to scale to demand for various resources (e.g., computational processing, memory, routing, etc.). Similarly, the network topology 315 might change for any of various reasons. In some aspects, the network 315 is a hidden (or concealed) network, such as a Tor network. In one aspect, a gatekeeper node (such as node 311.9) indicates the availability of certain services to the other nodes 301.1-301.8 or to specific applications while concealing from those nodes 301.1-301.8 or applications information as to how those services are acquired or arranged. In some aspects, certain services are only available to nodes within a subnetwork and are concealed from nodes outside the subnetwork. In some aspects, the network 315 comprises a virtual network overlay to a physical network. In some aspects, a virtual node 311.1-311.N (and/or network) may comprise nodes 301.1-301.8 (and/or components thereof), groups of nodes 301.1-301.8, other network resources, and/or subnetworks 301-305 (or portions thereof).

The computation topology for one application, such as RAN data transport, can be different from the computation topology used for another application. Furthermore, the computation topology can comprise a storage topology and a routing topology that are different for each application. Thus, a distributed application can employ a topology comprising dedicated apparatus-level components on different nodes 301.1-301.9, but operating together to support the application's requirements. Each instantiation of the distributed application can comprise a unique set of the apparatus-level components, and thus may employ a corresponding unique topology.

In accordance with certain aspects, a distributed computing problem can be partitioned by a combination of processes, including (but not limited to) data partitioning and computation partitioning. A first network topology can be provisioned to perform a first one of the processes and a second network topology can be provisioned to perform a second one of the processes. By way of example, the first network topology is configured to perform processing associated with data partitioning, and the second network topology is configured to perform processing associated with computation partitioning. Computation processing can be further partitioned into tasks which may be provided with their own network topologies. It should be appreciated that network topologies can be tiered. For example, a topology corresponding to a data partition may comprise multiple subnetwork topologies corresponding to computation partitions, and a computation partition may include further partitions implemented by corresponding subnetworks. It should also be appreciated that subnetwork topologies can overlap, and a device or network configured to operate in one network topology may be configured to perform (simultaneously, or in alternative time intervals) processing corresponding to another network topology. As network topologies can comprise overlapping and/or tiered topologies, in some aspects, solutions provided by a set of subnetwork topologies can be processed by a processors in an encompassing network topology, and processors in the subnetworks can be directed to a next problem in a queue and/or redirected to solve different problems. In some aspects, network topologies can be adapted, such as to adapt to corresponding processing needs. In some aspects, the topologies change as problems are completed and/or processing for new problems is commenced.

Due to the deployment of multiple UAVs to provide fronthaul and/or backhaul support for the RAN, a system for managing navigation is typically employed, which can include various combinations of centralized and decentralized air traffic control. One promising technique uses swarm intelligence.

Swarm intelligence refers generally to the collective behavior of multi-component systems that coordinate using decentralized controls and self-organization. From an engineering point of view, swarm intelligence emphasizes the bottom-up design of autonomous distributed systems that can provide adaptive, robust, and scalable behaviors. While conventional distributed air traffic control techniques provide only navigation management (e.g., collision avoidance, maintaining safe aircraft spacing, optimal routing, etc.), aspects of the invention introduce network fabric processing criteria into the navigation decision-making process. Thus, navigation may be adapted to desired network topologies for various applications. Such adaptations to a UAV's navigation decision-making may take the form of self-organizing control signals, control signals from a UAV acting as a cluster leader or local master, and/or from a ground-based processing system providing for coordinated multipoint control.

By way of example, in a MIMO wireless communication system, the arrangement of scatterers in the transmission channel affects the system's capacity (e.g., L. Hanlen, M. Fu, "MIMO Wireless Systems: Capacity Limits for Sparse Scattering," $3^{rd}$ AusCTW, Canberra, Australia, February 2002, which is incorporated by reference in its entirety). Thus, UAV navigation can be configured to employ techniques to arrange active scattering platforms in a manner that enhances system capacity. In some aspects, it is recognized that UAVs can act as passive scatterers of RAN transmissions. In such aspects, UAV navigation can be adapted to produce any of various scattering structures, such as mirrors, lenses, and waveguides. These scattering structures can comprise active scattering structures, passive scattering structures, or combinations thereof.

In some aspects, swarm intelligence is configurable with respect to additional criteria, such as the aforementioned Cooperative-MIMO processing, network topology control, scattering management, and the like. For example, local navigation decision-making may be adapted to produce complex scattering structures. In some aspects, local navigation decision-making can be adapted to produce or shape a network topology. In such aspects, the local rule base employed for navigation by each UAV can be adapted such that complex structures and/or topologies can be achieved with minimal or no centralized control. In other aspects, at least a small amount of centralized control, whether from a ground-based controller or an airborne cluster master, may provide for at least some navigation control. Such centralized control and management can be configured with other control and management activities. By way of example, such centralized control may be configured with timing management operations, such as disclosed in the other patents and patent applications which are incorporated by reference. Thus, aspects of the disclosure include devices, methods, and cooperating systems of devices configured for performing aerial fabric acrobatics.

In accordance with aspects of the disclosure, precoding aspects (including devices, device components, systems of devices, methods, and instructions for configuring a processor(s)) are disclosed herein for use in a variety of network configurations, including cellular networks (such as LTE networks), WPANs, WLANs, ad-hoc peer-to-peer networks, and multi-hop networks, to advanced network configurations, such as any of the variety of Cooperative-MIMO networks and airborne networks disclosed herein. It should be appreciated that aspects disclosed herein, including the precoding aspects, can be configured for any type of wireless network mentioned in any of the references incorporated herein.

Figure 4A:
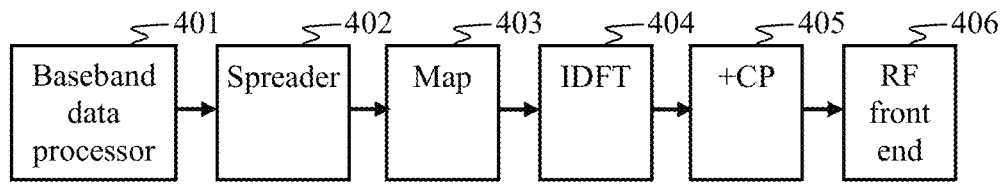
FIG. 4A is a block diagram of a spread-OFDM transmitter in accordance with an aspect of the disclosure.

FIG. 4A is a block diagram of a spread-OFDM transmitter in accordance with an aspect of the disclosure. A baseband data processor 401 generates original data symbols from user data, reference signals, or some combination thereof. A spreader 402 spreads the original data symbols into spread data symbols. A mapper 403 maps the spread data symbols to OFDM subcarriers, such as to input bins of an oversampled inverse discrete Fourier transform (IDFT) 404, which is typically implemented as an oversampled fast transform (e.g., an FFT). The spread-OFDM signal output from the IDFT 404 is prepended with a cyclic prefix (in "+CP" circuit 405) before amplification and up-conversion to RF in an RF front end 406. Inter-symbol interference can be avoided if the cyclic prefix (or a guard interval) is longer than the delay spread of the impulse response of the channel.

In spread-OFDM, N subcarriers can be shared by every original data symbol in a block of up to N original data symbols if the spreading codes are configured to be orthogonal. The spreader 402 enables the N subcarriers to be shared by a block of up to N original data symbols. In one aspect, the function of the spreader 402 can be explained as follows: Each original data symbol of the block is replicated into N parallel copies. Each copy is then multiplied by a code chip from a corresponding spreading signature. A spreading signature can comprise a row or column of a spreading matrix, and may be referred to as a spreading code or a code space. The products are summed such that each sum (referred to as a spread data symbol) comprises one of N linear combinations of the original data symbols, wherein the coefficients are the code chips (e.g., a row or column of a corresponding spreading matrix), and the unknowns are the original data symbols. Each spread data symbol is modulated onto one of the N subcarriers, all of which are to be transmitted in parallel. The usual implementation of OFDM calls for the IDFT 404 to convert the parallel chips into serial form for transmission. In OFDM, the IDFT 404 is typically implemented via oversampling, so the input symbol block to the IDFT 404 is typically zero-padded, since zero padding in one domain (e.g., time or frequency) results in an increased sampling rate in the other domain (e.g., frequency or time). The cyclic prefix is appended to remove the interference between successive symbols and to accommodate the circulant convolution provided by the FFT.

In a receiver configured to receive spread-OFDM signals (such as the receiver block diagram depicted in FIG. 5A), a received spread-OFDM transmission is filtered, converted to baseband, and digitized by an RF front end 501, and then the cyclic prefix is removed (such as by a cyclic prefix removal circuit 502 or some equivalent). The receiver can comprise N matched filters, which can be implemented in the discrete baseband domain, such as by performing a DFT 503. The output of the DFT 503 has the form of the transmitted signal multiplied by a diagonal channel matrix whose diagonal values are flat-fading coefficients, which allows for simple equalization 504. The IDFT 404 and DFT 503 operations and the role of the cyclic prefix are implicitly absorbed through the diagonal structure of the channel response. Thus, aspects of the disclosure can provide for configuring the spreader 402 to provide various benefits, including (but not limited to) orthogonal codes, use of a fast-transform algorithm, and low PAPR.

In accordance with some aspects of the disclosure, a processor-based transceiver can include a non-transitory computer-readable memory with instructions stored thereon and configured to perform any of the algorithms disclosed herein. In reference to the spreader 402, by way of example, each original data symbol in a block can be multiplied by a complex-valued spreading code, such as via a matrix multiplication operation. For example, a $j^{th}$ original data symbol $d_j$ is multiplied by a $j^{th}$ column vector of an N×N spreading matrix S, where the $j^{th}$ column vector corresponds to the spreading code for symbol $d_j$, and N (which equals the number of subcarriers onto which the spread data is modulated) corresponds to the bandwidth expansion factor (e.g., spreading gain) to produce a $j^{th}$ spread data-symbol vector. The N different spread data vectors are summed to produce a vector of spread data symbols (of length N) before serial-to-parallel conversion and processing by the IDFT. It should be appreciated that if fewer than N original data symbols (e.g., n<N) are in a block, then N−n of the symbols in the block may be set to zero while still producing a length-N vector of spread data symbols.

Figure 4B:
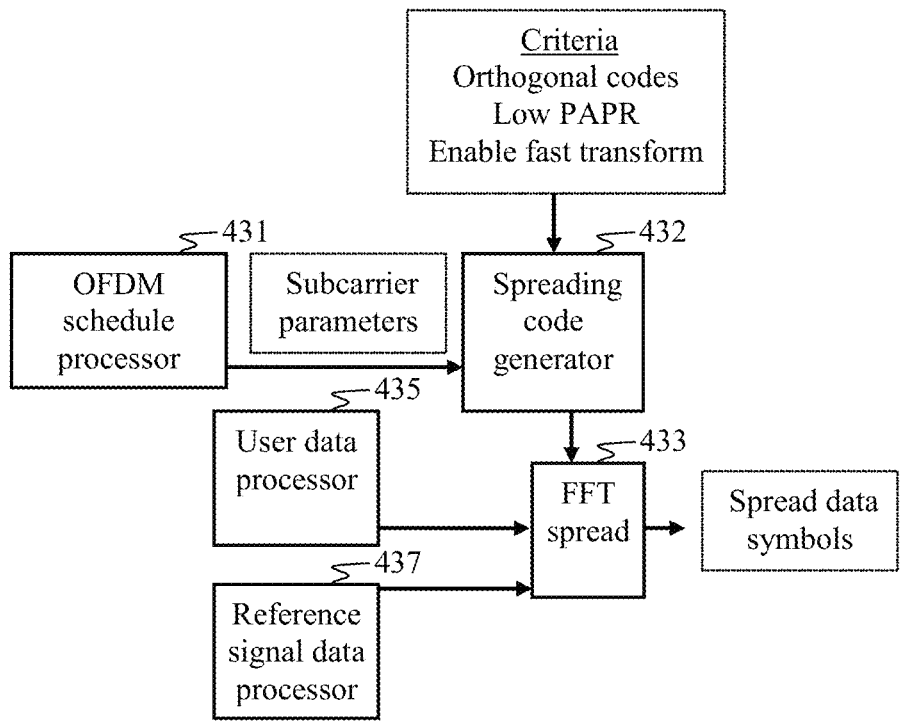
FIG. 4B is a block diagram of a spread-OFDM spreader (such as spreader 402) in accordance with some aspects of the disclosure.

FIG. 4B is a block diagram of a spread-OFDM spreader (such as spreader 402) in accordance with some aspects of the disclosure. An OFDM schedule processor 431 receives scheduling information which assigns a set of OFDM subcarriers to the corresponding transmitter. For example, if the transmitter is a UE, then the OFDM network assigns specific resource blocks (which includes a set of OFDM subcarriers) to be used by the UE for uplink transmissions. The OFDM schedule processor 431 obtains subcarrier parameters (e.g., number of subcarriers N, subcarrier spacing, and the like) which are conveyed to a spreading code generator 432.

The spreading code generator 432 can be configured to process the subcarrier parameters and one or more criteria elements to select spreading codes. For example, the criteria can include code space orthogonality (i.e., orthogonal spreading codes), low PAPR, and enabling a fast transform operation for code generation and/or for encoding original data symbols. Other criteria may be employed. For example, a criterion which relates to pulse shaping (e.g., time-domain and/or frequency-domain shaping, or windowing) can further reduce PAPR by sacrificing some bandwidth efficiency. In one aspect, a mask (e.g., a spectral mask) may be applied to the subcarriers, such as by way of the coding or directly following the coding, in order to shape the spread-OFDM signal. This can achieve pulse shaping without directly processing the output of the IDFT 404.

In one aspect, spreading is achieved via a fast transform operation (such as an FFT spreader 433). The FFT spreader's 433 input parameters can be controlled by the spreading code generator in accordance with the criteria elements. In one aspect, FFT spreader 433 parameters, such as FFT size, input data block size, input data values, can be controlled by the spreading code generator 432. In some aspects, the spreading code generator 432 can select how a fast transform is performed, such as by directly controlling the transform's operations or by indirectly controlling the transform via FFT size, and the like.

In one aspect, a user data processor 435 provides user data symbols to the spreader 433 for spreading. In another aspect, a reference signal data processor 437 provides reference signal data symbols to the spreader 433 for spreading. In some aspects, the user data processor 435 and the reference signal data processor 437 are configured to multiplex user data and reference signal data to produce the original data symbols, which are then spread by the spreader 433 to produce the spread data symbols.

Orthogonal Spreading

In accordance with an aspect of the disclosure, in a client device (such as a UE) configured to operate in an OFDM network, the spreading-code generator 432 is responsive to OFDM scheduling that assigns a particular set of uplink subcarriers to the client device, such as based on favorable channel conditions between the client device and one or more base transceiver stations. For example, channel-dependent scheduling of the uplink subcarriers to the client device can be made to avoid interference, such as deep fades experienced by one or more subcarrier frequencies in a flat-fading environment, and/or interference caused by other transmitters. Responsive to the number of assigned uplink subcarriers, the spreading-code generator 432 selects a set of orthogonal complex spreading codes. Orthogonal functions (that is, signals or sequences) have zero cross-correlation. Zero correlation occurs if the product of two signals summed over a period of time (or sequence length) is zero. A set of signals or sequences in which all have zero cross-correlation with each other constitutes an orthogonal code space(s).

In one aspect, responsive to an assignment of N OFDM subcarriers, the spreading-code generator 432 selects an orthogonal N×N complex spreading matrix that comprises DFT coefficients. Some matrices comprising DFT coefficients are not orthogonal. While it is well known that some orthogonal functions can be generated or expanded using various algorithms, such as a seed algorithm or some other recursive technique, some of these algorithms do not provide codes with desirable features, such as orthogonality and low PAPR. For example, an N×N spreading matrix constructed by concatenating rows or columns of an N/2×N/2 DFT spreading matrix can yield fewer than N orthogonal spreading codes. Similar deficiencies result from concatenations and other combinations of different-size DFT matrices, permutations of DFT matrices, punctured DFT matrices, truncated DFT matrices, and the like. Thus, in some aspects, the spreading-code generator 432 advantageously provisions an N×N spreading matrix (or corresponding set of complex codes) to provide for N orthogonal spreading codes. This can be referred to as an orthogonal code space with dimension N.

In some aspects of the disclosure, the spreading-code generator 432 can orthogonally spread a block of up to N original data symbols with DFT-based complex spreading codes to produce a length-N vector of spread data symbols. In other aspects, the spreading-code generator 432 can employ complex spreading codes to spread N'>N original data symbols onto N subcarriers. While these complex spreading codes are not all orthogonal, the codes can be configured to have low cross correlation. Various techniques may be employed to select a code set having optimal features, such as low cross correlation, low PAPR, or a combination thereof. In some aspects, at least some of the spreading codes can be orthogonal to each other.

Low PAPR

In addition to providing for orthogonal spreading, the spreading code generator 432 can be responsive to OFDM scheduling to configure the complex spreading matrix to provide the spread-OFDM signal with a low PAPR. Unlike other PAPR-reduction techniques (such as clipping, peak cancellation, and others) which employ the IDFT 404 output (i.e., the spread-OFDM signal), the spreader 402 employs complex orthogonal spreading codes to spread original data symbols (which provides frequency diversity gain) while shaping the spread-OFDM signal to provide low PAPR.

Parameters of the assigned subcarriers, such as subcarrier frequency spacing and the number of subcarriers, can be used to determine complex orthogonal spreading codes that also produce a low-PAPR signal at the IDFT output. By way of example, the spreading-code generator can generate an orthogonal N×N spreading matrix wherein N is the number of subcarriers assigned to the transceiver, and the complex values of the spreading matrix can be generated based on the configuration of the assigned subcarriers, such as frequency spacing.

In one aspect, responsive to an assignment of a block of contiguous subcarrier frequencies, the spreading-code generator 432 can generate a complex spreading matrix with constant-modulus (e.g., constant magnitude) polyphase values derived from a DFT. In another aspect, if the subcarrier assignment comprises non-contiguous subcarriers with different frequency spacings, the complex spreading matrix that provides for low PAPR might comprise values with different magnitudes. Even in such aspects, the spreading-code generator 432 can generate a complex spreading matrix which achieves desired features corresponding to the criteria list, including low PAPR.

Fast Transforms

In accordance with some aspects of the disclosure, in a client device (such as a UE) configured to operate in an OFDM network, the spreading-code generator 432 is responsive to OFDM uplink scheduling to employ a complex spreading matrix that can be implemented via a fast transform algorithm. For example, based on a number of assigned OFDM subcarriers, an N×N complex spreading matrix can be selected in which the matrix-generation algorithm exploits the factorization of N. In some aspects, the number of assigned OFDM subcarriers equals N. In other aspects, a spreading matrix with dimension less than the number of assigned OFDM subcarriers might be selected, such as to facilitate spreading with a small sacrifice in data bandwidth, enable further PAPR reduction, or provide for other benefits. In some aspects, the scheduling is configured by the OFDM network such as to provide a number of assigned subcarriers that facilitates use of a fast transform algorithm by the spreading-code generator 432.

The implementation of the DFT spreading as a fast algorithm (e.g., an FFT) can provide an efficient alternative to conventional Carrier Interferometry (CI) coding. In some aspects, an OFDM transceiver can employ the same FFT processor (e.g., such as FFT spreading module 433, which can be an application-specific processor, a general purpose processor programmed to perform an FFT, or some other hardware configured to perform an FFT) and/or reuse a software program configured to perform spreading to perform other transceiver functions, such as OFDM modulation (e.g., IDFT 404) and/or demodulation (e.g., DFT 503). In such aspects, a common FFT hardware (e.g., module 433, 404, 503, or 505) or software module (e.g., program, object, function, or some other program construct) can be configured to adjust FFT processing parameters, such as relative to whether the FFT is being used for spread-OFDM coding, spread-OFDM decoding, OFDM modulation, or OFDM demodulation. FFT processing parameters can include one or more of oversampling factor, sampling rate, FFT length, zero-padding, truncating, modulo-length data wrapping, Radix-2 implementation, FFTW implementation, decimation in time, decimation in frequency, output ordering, input data format, rounding mode, saturate on integer overflow, sine table data type, product output data type, accumulator data type, output data type, output minimum, output maximum, and lock data type. Other FFT processing parameters can be employed.

A fast DFT algorithm, such as the Cooley-Tukey algorithm, can express a DFT of size $N=N_1N_2$ in terms of smaller DFTs of size $N_1$ and $N_2$ recursively to reduce the computation complexity to order of N log N for highly composite N (e.g., smooth numbers). The 2-smooth numbers are powers of 2 (i.e., a number of the form $2^n$ where n is an integer). Radix-2 implementation can comprise various algorithms, including (but not limited to) butterfly operation, double-signal algorithm, half-length algorithm, decimation-in-time algorithm, and decimation-in-frequency algorithm.

Since the Cooley-Tukey algorithm breaks the DFT into smaller DFTs, it can be combined with other DFT algorithms. For example, Rader's algorithm, Bluestein's algorithm, Braun's algorithm, or other FFT algorithms can be used to handle large prime factors that cannot be decomposed by Cooley-Tukey, or the prime-factor algorithm can be exploited for greater efficiency in separating out relatively prime factors.

In many OFDM systems, the number N of subcarriers assigned to a transceiver is commonly a power of 2, which enables efficient OFDM modulation and demodulation. Thus, a radix-2 FFT of size N for DFT coding can also provides notable computational advantages. A processor for an OFDM transmitter configured to perform an IFFT, for example, can be easily configured to perform fast DFT spreading. Accordingly, some aspects of the disclosure employ a radix-2 DFT matrix to spread data symbols. This enables computationally efficient spreading, and like CI spreading, when the spread-DFT data is input to selected bins of an IFFT used in an OFDM transmitter, the resulting spread-DFT OFDM signal can have a low PAPR.

In accordance with some aspects of the invention, in an OFDM transmitter apparatus, a radix-2 DFT spreader (e.g., spreader 402) and the subcarrier mapper 403 are configured in a manner such that the combination of DFT spreading and subcarrier allocation produces a transmitted OFDM signal with low PAPR. By way of example, the size N can equal the number of subcarriers allocated to the OFDM transmitter apparatus, and wherein the allocated subcarriers are uniformly spaced in frequency. The allocated subcarriers can comprise a block of contiguous subcarriers, such as may be assigned to the OFDM transmitter apparatus based on favorable channel conditions between the OFDM transmitter apparatus (e.g., a UE) and at least one server-side WWAN terminal (e.g., a base transceiver station). A determination of favorable channel conditions may be made by either or both the OFDM transmitter apparatus and the at least one server-side WWAN terminal (including a scheduler communicatively coupled to multiple WWAN terminals) and may be based on measurements and/or estimates of the channel at either or both the OFDM transmitter apparatus and the at least one re server-side WWAN terminal.

A processor for an OFDM receiver configured to perform an FFT, for example, might be configurable to perform the DFT spreading. In some aspects, the receiver processor does not normally operate while its associated transceiver device is in transmit mode, so the receiver's FFT is available to support transmit processing, such as to provide for the DFT spreading. In some aspects, the transmitter may employ the same processor to perform both DFT spreading and the IFFT. Such implementations can provide various benefits (e.g., reduce complexity, improve efficiency, reduce cost, reduce power consumption, etc.) by employing the same hardware to perform both spreading and OFDM modulation.

With regard to software, such implementations disclosed herein can enable code reuse. In some aspects, pipelined FFT processing can be provided. By way of example, pipelined processing can be configured to provide multiple simultaneous FFT operations, such as DFT-spreading and subcarrier modulation (e.g., via IFFT). In some aspects, pipelined processing can be performed as part of cooperative processing between multiple processing cores (such as in a data center), or residing on different WWAN terminals (e.g., UEs and/or base transceiver stations) in a cooperating cluster.

In accordance with other aspects of the disclosure, an FFT processor configured for at least one transmitter operation can be configured for a receiver operation. In some aspects, a single FFT processor can be employed to enable multiple operations, including any combination of OFDM modulation, OFDM demodulation, DFT spreading, and DFT de-spreading.

Figure 5A:
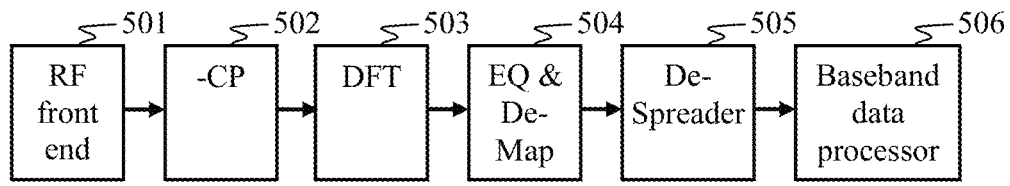
FIG. 5A is a block diagram of a receiver configured to receive and process spread-OFDM signals in accordance with aspects of the disclosure.

In accordance with some aspects of the disclosure, the block diagram shown in FIG. 4A comprises the transmitter part of a UE configured to transmit an uplink spread-OFDM signal with low PAPR, and the block diagram in FIG. 5A comprises the receiver part of a server-side WWAN device (or system) configured to receive the UE's uplink spread-OFDM signal. In the server-side WWAN device (or system), an RF front-end system 501 filters, amplifies, down-converts, and digitizes the received spread-OFDM signal to produce a received baseband signal. The cyclic prefix is stripped (in "—CP" circuit 502) and the OFDM signal is demodulated by the DFT 503. Equalization and demapping 504 (which can include soft and/or hard decision processing) produces received spread-OFDM symbols. The de-spreader 505 can comprise an IFFT to efficiently de-spread DFT-spread symbols to produce estimates of the original data symbols. The baseband processor 506 performs additional down-stream baseband processing on the estimates, such as error detection, error correction, transcoding, formatting, and/or other post-processing operations.

Figure 5B:
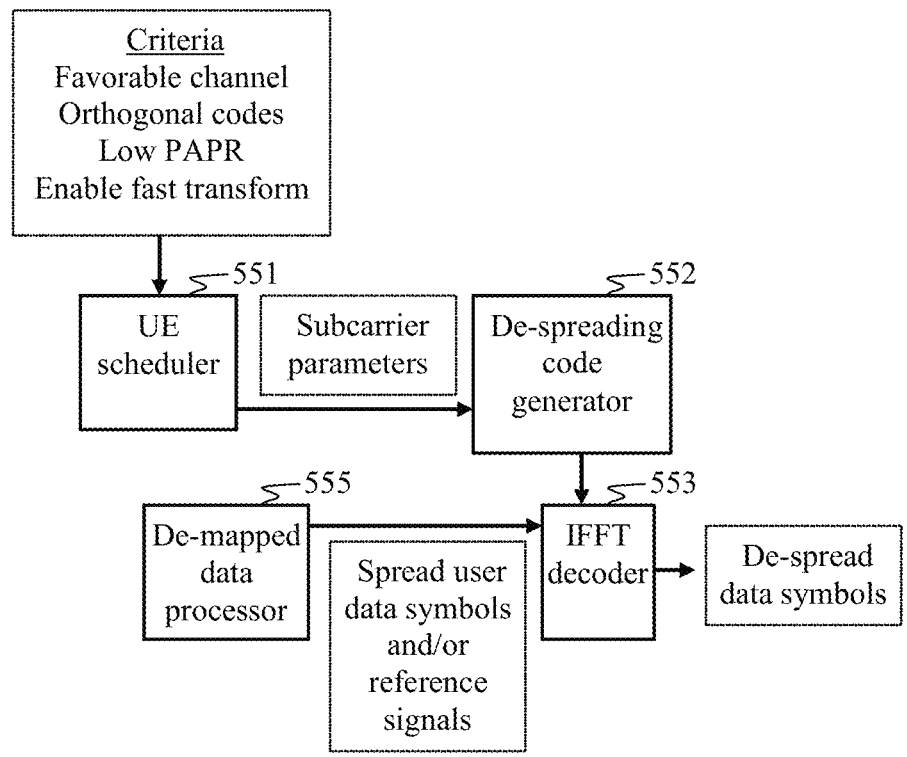
FIG. 5B is a block diagram that depicts a portion of a receiver, such as a receiver that may be employed in a server-side WWAN terminal or system.

FIG. 5B is a block diagram that depicts a portion of a receiver, such as a receiver that may be employed in a server-side WWAN terminal or system. In one aspect, the de-spreader 505 comprises the system shown in FIG. 5B. A de-spreading code generator 552 processes subcarrier parameters corresponding to the received spread-OFDM signal to control decoder 553. Since the server side of the WWAN can schedule the uplink OFDM subcarriers used by each UE, the subcarrier parameters can be retrieved from a UE scheduler 551.

In some aspects, the UE scheduler 551 assigns uplink subcarriers to a UE based on favorable channel conditions for that UE (which is referred to as channel-dependent scheduling). In addition to favorable channel conditions, a criteria list employed by the UE scheduler for assigning uplink subcarriers might include providing for orthogonal spreading codes, enabling spreading codes that produce a transmitted spread-OFDM signal with low PAPR, and/or enabling a fast transform to be used for spreading and de-spreading. While channel-dependent scheduling might identify a particular group of candidate subcarriers to be assigned to a UE uplink channel, the other criteria can specify the number N of subcarriers, the subcarrier spacing, as well as other signal parameters assigned by the scheduler 551. For example, selecting N to be a power of 2 can enable certain fast transforms to be used in spreading and/or de-spreading. Selecting contiguous subcarriers or uniformly spaced subcarriers can facilitate (and possibly ensure) the UE's implementation of orthogonal spreading codes that provide low PAPR features.

In one aspect, a de-mapped data processor 555 can provide spread data symbols comprising spread user data symbols, spread reference signals, or both to the decoder 553. The decoder 553 can employ a fast transform, such as an IFFT, to de-spread the spread data symbols and produce de-spread data symbols which are output for further processing. The de-mapped data processor 555 may be part of the equalizer and de-mapper 504 or it may be part of the de-spreader 505.

Figure 6A:
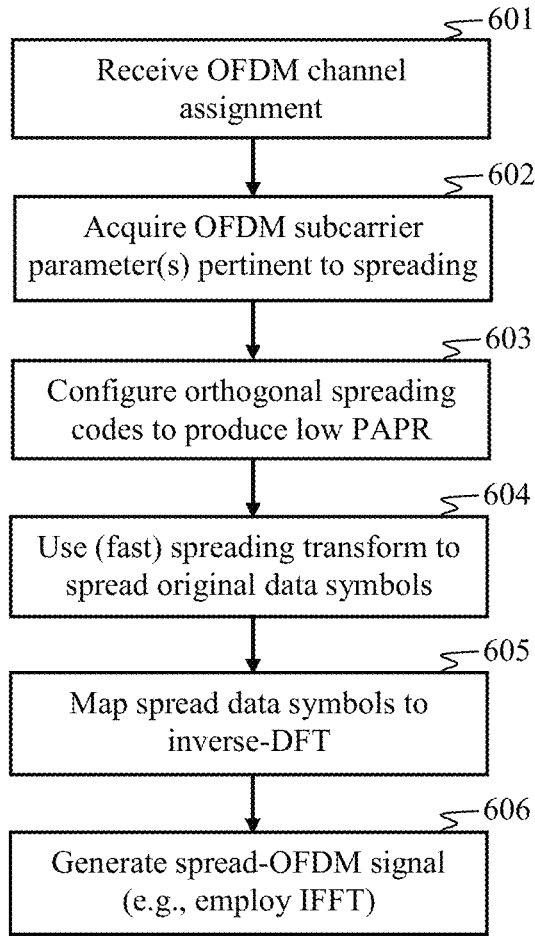
FIG. 6A is a flow diagram that depicts a method performed in a radio transceiver, which can employ a fast algorithm to generate a spread data sequence from an original data sequence in accordance with some aspects of the disclosure.

DFT-Spreading Method:

In accordance with one aspect of the disclosure, as depicted in FIG. 6A, a method performed in a radio transceiver is provided, which can employ a fast algorithm to generate a spread data sequence from an original data sequence. The algorithm which generates the spread data sequence is configured to provide a low PAPR to an OFDM signal modulated with the spread data sequence. Specifically, the spreading causes the transmitted OFDM signal (such as a signal output from IDFT 404) to have a low PAPR compared to an un-spread OFDM signal (such as the resulting transmitted OFDM signal if spreading is not performed).

In some aspects, the method depicted in FIG. 6A comprises functional steps implemented via software instructions operable to cause a processor (such as a general-purpose processor) to execute the steps in a process which produces a spread-OFDM signal. In some aspects, one or more of the functional steps are embodied in hardware, such as circuits.

By way of example, application-specific integrated circuits (ASICs), field-programmable gate arrays (FPGAs), and/or other circuits can be provided as embodying one or more of the functional steps disclosed throughout the specification and depicted in the drawings. In some aspects, multiple ones of the functional steps can be implemented by a common processor or circuit. For example, certain efficiencies might be achieved by configuring multiple functional steps to employ a common algorithm (such as an FFT and/or some other algorithm), thereby enabling a circuit, a processor, or some other hardware component to be used for different functions, and/or enabling software instructions to be shared for the different functions.

The radio transceiver, such as a UE, receives an OFDM channel assignment 601 from a scheduler in the WWAN. For example, OFDM channels in the WWAN might be assigned via channel-dependent scheduling. The OFDM channel assignment is processed to acquire OFDM subcarrier parameters pertinent to operation of the transceiver 602. Based on the subcarrier parameters, orthogonal spreading codes are configured in a manner to cause a corresponding spread-OFDM signal to have low PAPR 603. For example, the spread-OFDM signal is configured to have a lower PAPR than if spreading was not performed. Configuring the spreading codes in accordance with step 603 can comprise a combination of a) determining a spreading code length(s) based on the number of subcarriers assigned to the transceiver; b) determining spreading code values based on the spreading code length(s) and the configuration of subcarriers (e.g., subcarrier spacing) assigned to the transceiver; and c) arranging the spread data symbols (which can include re-ordering the output of a spreading function) in a particular order or arrangement such that each spread data symbol maps to a particular one of the assigned subcarriers to achieve at least one objective, such as to provide the spread-OFDM signal with a low PAPR.

In aspects of the disclosure, one or more spreading code parameters (such as code length) can optionally be configured to enable use of a fast spreading algorithm, such as an FFT, to perform spreading 604. In other aspects, the spreading codes may be retrieved from a memory and employed in a matrix multiply or equivalent operation. For example, spreading codes might be generated for different subcarrier parameters (e.g., number of subcarriers, subcarrier spacing, and the like), possibly using a fast spreading algorithm, and stored in the memory. Then spreading codes corresponding to particular subcarrier parameter(s) can be retrieved from the memory to be used in spreading 604.

Code parameters, such as code length and the code values, can be selected to allow a fast algorithm (such as the FFT) to be used for spreading-code generation and/or to spread original data symbols, such as via a fast transform. This can include selecting a block size of input original data symbols (and corresponding spreading matrix dimension) to facilitate use of a fast transform and/or achieve other processing efficiencies. In some aspects, zero values can be added to the block of original data symbols to provide a predetermined block size.

By way of example, but without limitation, a spreading code matrix can comprise complex spreading codes selected from a larger set of spreading codes, such as CI codes, which are complex spreading codes that exist for any code length. For example, restricting the code length (or matrix dimension) N to a length that is a power of 2 enables a specific set of spreading code values that permit a fast transform algorithm (such as a radix-2 decimation-in-time (DIT) FFT) to be employed as the spreading algorithm 604. In other aspects, N can be selected to equal a product of small prime numbers which can include numbers other than 2.

Selecting the code length and the code values (such as specific code values corresponding to particular OFDM subcarriers assigned to the radio transceiver) can provide for configuring the spreading code 603 to produce a spread-OFDM signal (at the output of step 606) with low PAPR. For example, in one aspect, an OFDM network might employ non-contiguous blocks of subcarriers (such as for opportunistic transmissions, cognitive radio applications, channel optimization, and/or for other purposes). Thus, the code values (and optionally, the code length) can be selected 603 to provide a low PAPR to the resulting transmitted OFDM signal. The code values and code length can also be selected to affect the orthogonality of the codes as part of step 603, such as to provide orthogonal codes, sacrifice orthogonality for lower PAPR, sacrifice bandwidth efficiency for lower PAPR, or some combination thereof.

The spread data symbols are mapped to particular OFDM subcarriers 605. In some aspects, mapping 605 comprises sequence reordering to map specific spread symbols to specific subcarriers, which can achieve certain advantages. For example, a preferred mapping of the spread data symbols to the OFDM subcarriers achieves the low PAPR, whereas an alternative mapping may not. Even when contiguous subcarriers and spread-DFT or CI codes are employed, the selection of the spreading codes 603 and the mapping 605 affects the PAPR. A proper mapping 605 of the spread data symbols to specific subcarriers achieves the low PAPR.

In one aspect, besides the trivial case of all ones, a spread-DFT code (which is a constant-modulus complex code) can be regarded as comprising a uniform phase increment in the complex plane from one code value to each successive value in the DFT code vector. In the trivial case, the phase increment is zero. Each spread data symbol comprises a sum of the products of each original data symbol with a code value from the original data symbol's corresponding spread-DFT code. This spreading can be implemented via a matrix multiply, such as between a spreading code matrix and a vector of original data symbols. The spreading can be implemented via a DFT, such as an FFT. However, the spread data symbols are markedly different from the frequency responses derived from a spectrum analyzer, which also uses a DFT.

Each spread data symbol comprises a linear combination of the original data symbols, wherein each coefficient in the linear combination comprises the code value corresponding to the original data symbol's code and a common location in the code vector of that code. Stated another way, consider an $n^{th}$ original data symbol do spread by a corresponding $n^{th}$ DFT spreading vector $c_n=[c_{n1}, c_{n2}, \ldots, c_{nN}]$. An $m^{th}$ spread data symbol in a spread data symbol vector x is the sum, $$x_m = \sum_{n=1}^{N} c_{mn} s_n,$$

which indicates that the $m^{th}$ spread data symbol is the sum of each data symbol $s_n$ multiplied by the $m^{th}$ code value in its corresponding code vector $c_n$. The $m^{th}$ code value $c_{nm}$ represents the $m^{th}$ uniform phase increment in the complex plane for that code cn. Thus, the $m^{th}$ spread data symbol can be associated with an $m^{th}$ set of uniform phase increments. Spreading yields N spread data symbols, whereas spectrum analysis (which uses a DFT) produces frequency responses corresponding to N/2 (orthogonal) tones due to the Nyquist limit.

In one aspect, the mapping 605 comprises arranging the spread data symbols in accordance with increasing uniform phase increments, and matching the spread data symbols according to this arrangement to a set of OFDM subcarriers having increasing uniform frequency increments. The mapping 605 of the spread data symbols having increasing uniform phase increments to the OFDM subcarriers with corresponding increasing frequency increments provides for producing a spread-OFDM signal with low PAPR. In serial implementations, arranging the spread data symbols can take the form of sequencing the symbols in ascending or descending order relative to their corresponding phase increments. In parallel implementations, arranging the spread data symbols can take the form of arranging the symbols relative to input bins of an IFFT for corresponding increasing OFDM subcarrier frequencies. Thus, in some aspects, the mapping 605 can comprise sequence reordering of a DFT output.

In some aspects, the mapping 605 order of symbols to IFFT bins may be fixed. Thus, configuring the spreading codes 603 and/or spreading 604 may be provisioned to configure the mapping 605 which ensures a low-PAPR spread-OFDM signal. For example, configuring the spreading codes 603 can comprise arranging the order of values in a spreading code matrix to produce a vector of spread symbol values arranged in a manner that the fixed mapping 605 results in a spread-OFDM signal with low PAPR, the order relating to a mathematical relationship with the subcarrier frequencies that achieves the low PAPR regardless of the arrangement of the original data symbols. In another aspect, the spreading 604 is configured to arrange the spread data symbols in a manner that the mapping 605 results in a spread-OFDM signal with low PAPR regardless of the order of the original data symbols.

In accordance with some aspects of the disclosure, such as in relationship to methods, software instructions, and devices which perform step 603, the code length N can correspond to a number of OFDM subcarriers allocated to the radio transceiver. For example, the code length N might equal the number of OFDM subcarriers, which is commonly a power of 2. In some aspects, the code length N might be less than the number of assigned OFDM subcarriers. In other aspects, the code length N might be greater than the number of OFDM subcarriers, such as a multiple thereof. In some aspects, the code length N might equal the number of OFDM subcarriers assigned as user-data channels for the radio transceiver. In some aspects, the code length N might equal the number of OFDM subcarriers assigned as reference signals for the radio transceiver. In some aspects, unlike in conventional spread-OFDM, transmitted reference signals are spread. In some aspects, the reference data can be spread with the user data.

In one aspect, an N×N spreading code matrix is selected wherein N is a power of 2 and the code matrix values are selected from the set of basic CI code values to permit use of a radix-2 FFT for spreading a set of original data symbols. The CI coding may be provided via a DFT in order to provide for DFT spreading, which can be implemented by a fast transform, such as an FFT. The input to the radix-2 FFT can comprise a block of up to N original data symbols, and the fast spreading algorithm generates N spread data symbols.

At least one of an original data sequence length and a spread data sequence length is selected to enable use of a fast DFT transform. By way of example, the original data sequence length can equal the spread data sequence length, and this length can be selected to be a power of 2, which permits a radix-2 decimation-in-time (DIT) FFT to spread the original data sequence.

It should be appreciated that in alternative aspects, the spreading code matrix need not be a square matrix. In some aspects, the spreading codes can comprise alternative complex-valued code families, and the code values and code length can be selected to permit use of a fast spreading algorithm to spread the original data symbols and provide a resulting transmitted spread-OFDM signal with low PAPR.

Various types of fast spreading algorithms can be employed to spread the original data symbols to produce spread data symbols. In some aspects, the fast spreading algorithm comprises a DFT spreading operation.

The DFT spreading operation is defined by $$x_k = \sum_{n=0}^{N-1} s_n e^{-i2\pi nk/N}$$

Where $x_k$ represents the $k^{th}$ spread data symbol, $s_n$ are the original data symbols, and N is the length. In this example, both the index k and the index n range from 0 to N-1.

The Radix-2 DIT FFT computes the DFTs of the even indexed inputs ($s_{2m}=s_0, s_2, \ldots, s_{N-2}$) and the odd indexed inputs ($s_{2m+1}=s_1, s_3, \ldots, s_{N-1}$), and then combines the results to produce the DFT-spread data sequence. For example, the Radix-2 DIT algorithm expresses the DFT-spreading of original data symbols $s_n$ as a sum of spread even-numbered indices (n=2m) and spread odd-numbered indices (n=2m+1):

$$x_k = \sum_{m=0}^{N/2-1} s_{2m} e^{-i2\pi(2m)k/N} + \sum_{m=0}^{N/2-1} s_{2m+1} e^{-i2\pi(2m+1)k/N}$$

The common multiplier $e^{-i2\pi k/N}$ can be factored out of the second sum, so the spread data symbols can be represented as:

$$x_k = x_{even(k)} + e^{-i2\pi k/N} x_{odd(k)}$$

Where $x_{even(k)}$ is the even-indexed part, and $x_{odd(k)}$ is the odd-indexed part of $X_k$.

Due to the periodicity of the DFT, $X_{even(k+N/2)} = X_{even(k)}$ and $x_{odd(k+N/2)} = x_{odd(k)}$. Thus, $$x_k = \begin{cases} x_{even(k)} + e^{-i2\pi k/N} x_{odd(k)} & \text{for } 0 \le k < N/2 \\ x_{even(k-N/2)} + e^{-i2\pi k/N} x_{odd(k-N/2)} & \text{for } N/2 \le k < N \end{cases}$$

Since the "twiddle" factor $$e^{-i2\pi\left(k+\frac{N}{2}\right)/N} = -e^{-i2\pi k/N},$$

this reduces the number of these calculations by half. The spread sequence of length-N can be expressed recursively in terms of two spreading operations of size N/2 (0≤k<N/2)

$$x_k = x_{even(k)} + e^{-i2\pi k/N} x_{odd(k)}$$

$$x_k = x_{even(k)} - e^{-i2\pi k/N} x_{odd(k)}$$

This decimation operation can be performed down to the 2×2 DFT. The final outputs are obtained by a +/− combination of $x_{even(k)}$ and $e^{-i2\pi k/N} x_{odd(k)}$, which is simply a size-2 DFT.

It should be appreciated that other fast algorithms may be employed, including algorithms that exploit symmetry, remove redundant parts of a computation, and/or achieve other efficiencies, as well as other divide-and-conquer algorithms.

It should be appreciated that in practice, the actual performance of a fast algorithm depends on additional factors which affect computation speed, memory use, power consumption, and various processing overheads, such as communications between processors. In some aspects, in-place algorithms, bit reversal, data reordering, non-blocking pipelined configurations, and the like can be implemented in the fast algorithm. As such, operations of the fast algorithm can be configured to employ the required mapping that achieves the lowest possible PAPR for a given code set.

In some cases, performance metrics depend on the computing architecture employed. Thus, in accordance with some aspects of the disclosure, in addition to configuring the fast spreading algorithm 503 to improve performance on a given computing architecture, configuring the spreading code parameters to enable use of a fast spreading algorithm 501 can include selecting and/or adapting the spreading code parameters in a manner that improves the performance of the fast spreading algorithm.

In OFDM, active subcarriers are typically assigned with data symbols. For unassigned subcarriers, OFDM provides for zero-valued inputs for the IFFT (transmitter) and zero-valued outputs for the FFT (receiver). Often, conventional FFT/IFFT algorithms are not efficient due to the unwanted operations on zero values. Therefore, in some aspects of the disclosure, efficient FFT/IFFT algorithms can be employed to dynamically eliminate the multiplication and addition operations associated with deactivated subcarriers. For example, FFT pruning methods eliminate operations on input and output values which are not required. The basic concept involves determining the index of the butterflies to be chosen for computations and those to be discarded. Thus, FFT computation time can be significantly reduced by pruning the operations on zero values in the discarded butterflies. Most of these algorithms are suitable for applications with specific zero-input or zero-output pattern distributions. These types of efficient algorithms can be used in the FFT spreading and/or IFFT de-spreading operations, such as when zero-valued inputs and/or outputs are employed.

Figure 6B:
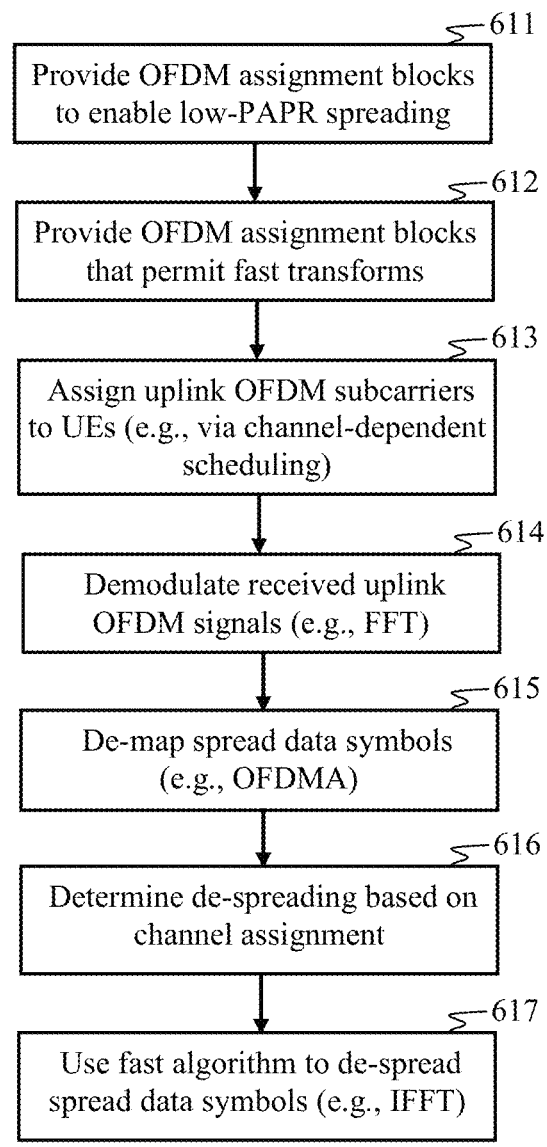
FIG. 6B is a flow diagram that depicts a method for processing received spread-OFDM signals, which can be employed in accordance with various aspects of the disclosure.

FIG. 6B is a flow diagram that can be employed in accordance with various aspects of the disclosure, such as for processing received spread-OFDM signals. In one aspect, for example, the method depicted in FIG. 6B is performed by a server-side device or system in a WWAN. A scheduler in the WWAN arranges OFDM assignment blocks in a manner that facilitates low-PAPR spreading 611. Different block sizes may be allocated to accommodate different data rates. For example, if the blocks are configured such that resources assigned to a UE comprise contiguous (or otherwise equally spaced) OFDM subcarriers, then this can facilitate uplink spreading (by the UE) which achieves a low-PAPR spread-OFDM signal.

In some aspects, the scheduler arranges the OFDM assignment blocks in a manner that facilitates fast transforms to be employed for spreading (and, optionally, de-spreading) 612. For example, the number of OFDM subcarriers in each block might be selected to equal a product of small prime numbers. In some aspects, the block sizes are configured to enable a Radix-2 DIT FFT for spreading (and optionally, a Radix-2 DIF IFFT for decoding).

As described herein and in patents and applications incorporated by reference, the uplink OFDM subcarriers can be assigned for use by the UEs 613, such as via channel-dependent scheduling. The server-side device or system typically demodulates received uplink OFDM signals 614 by using a DFT, such as an FFT. Demodulation 614 can include equalization. In some aspects, the demodulated symbols, which are DFT-spread data symbols, are de-mapped 615, such as via an OFDMA de-multiplexer, which separates the received uplink signals by UE. Thus, for each UE, a received uplink signal can be de-spread by determining the de-spreading codes based on the UE's channel assignment (which indicates the number of OFDM subcarriers and the subcarrier spacing) 616, followed by employing a fast algorithm (e.g., an IFFT) configured to de-spread the spread data symbols 617.

Figure 7A:
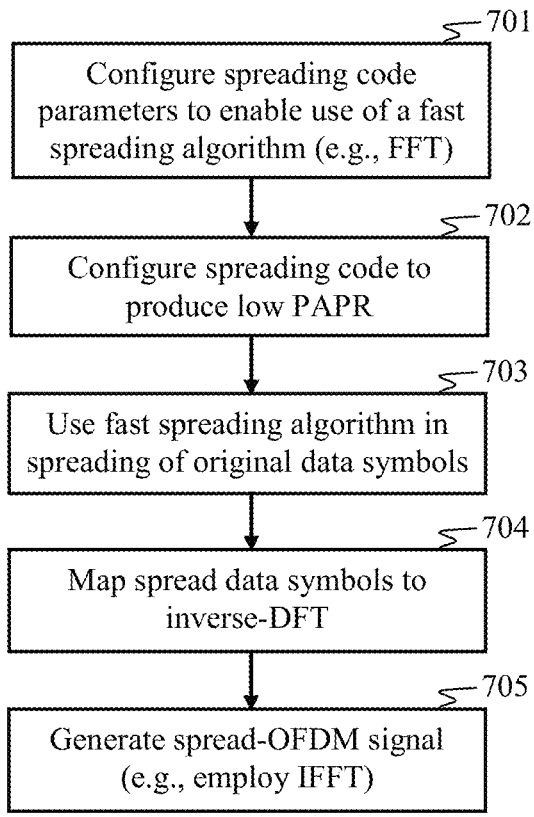
FIG. 7A is a flow diagram that depicts a method for generating spread-OFDM signals in accordance with some aspects of the disclosure.

FIG. 7A is a flow diagram that depicts a method for generating spread-OFDM signals in accordance with some aspects of the disclosure. Responsive to the subcarrier assignment and/or selection, the spreading code parameters can be configured to enable use of a fast spreading algorithm 701 and configured to produce a transmitted spread-OFDM signal with low PAPR 702. The fast spreading algorithm, such as an FFT, is configured to spread the original data symbols with orthogonal spreading codes to produce the spread data symbols 703, which are then mapped to an IFFT 704. The IFFT modulates the spread data symbols onto the assigned (or selected) OFDM subcarriers to produce a spread-OFDM signal 705. The spreading 703 and the IFFT 705 can each employ one or more of the FFT pruning methods, including modified FFT pruning, partial FFT pruning, split-radix FFT pruning, or traced FFT pruning. In some aspects, such as in hardware implementations of FFTs, a transform decomposition can be performed.

In accordance with some aspects of the disclosure, instead of separately calculating the spreading 703 and IFFT 705, both transforms are combined into a single transform. In one aspect, this can be accomplished by using a unified butterfly so that the number of arithmetic operations, delays, and indexing are reduced. One approach can employ an algorithm based on a sparse matrices factorization method, such as via the Kronecker product technique. In another aspect, the spreading 703 and IFFT 705 are combined into a single fast transform that comprises a fast orthonormal unitary transform. The aforementioned techniques for spreading and OFDM modulation can also be adapted for OFDM demodulation and de-spreading operations.

In accordance with some aspects of the disclosure, non-contiguous subcarriers can be employed, such as due to assignment of non-contiguous OFDM subcarriers to the radio transceiver or due to selection of a subset of subcarriers (e.g., reference signals or user data signals) to be provided with separate coding from the rest of the subcarriers. In such aspects, one or more of the steps in FIG. 7A can be configured accordingly. In some cases, certain tradeoffs can be made between PAPR, orthogonality, and/or bandwidth efficiency.

In one aspect of the disclosure, the spread data symbols are critically sampled (one sample per information symbol/subcarrier) and grouped in information signal blocks of length N. By way of example, but without limitation, the spread data symbols are generated at the critical sampling rate $f_s=1/T_s$ and modulated 705 onto the N orthogonal subcarriers during a time interval defined for one OFDM symbol with period $N/f_s$. In practice, the output of the IFFT 705 is a well-interpolated baseband signal. For example, oversampling in the time domain is usually achieved via frequency-domain interpolation, which is achieved by zero-padding the IFFT. If the oversampling rate is $f_{os}=Lf_s$, where L is the oversampling factor, the IDFT matrix has dimension (NL×NL). Although not shown, following block 705, a cyclic prefix or guard interval is typically added to each OFDM symbol, followed by filtering, D/A conversion, frequency up-conversion, amplification, and possibly other radio front-end processing.

Figure 7B:
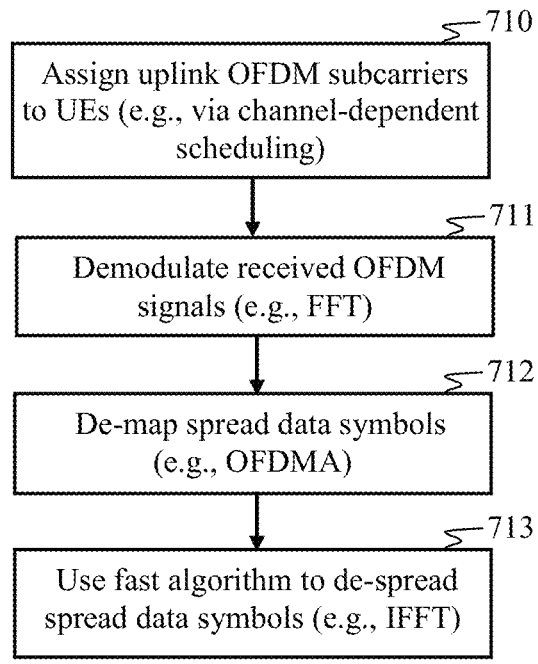
FIG. 7B is a flow diagram that depicts a method of processing received spread-OFDM signals in accordance with some aspects of the disclosure.

FIG. 7B is a flow diagram that depicts a method of processing received spread-OFDM signals in accordance with some aspects of the disclosure. By way of example, the method depicted in FIG. 7B can be performed by a server-side WWAN device or system to receive spread-OFDM uplink signals from at least one UE.

The WWAN assigns uplink OFDM subcarriers to UEs, such as via channel-dependent scheduling or some other scheduling scheme 710. Uplink OFDM subcarriers can be scheduled dynamically, such as in response to specified bandwidth needs. Different blocks of subcarriers can be configured prior to assignment or on the fly, and in a manner that subcarrier parameters (such as the number of subcarriers and their spacing) are configured to enable orthogonal spreading codes (or at least spreading codes with low cross correlations), complex spreading codes with low PAPR, and/or coding/decoding that can utilize fast algorithms (such as FFTs).

In some aspects, a WWAN device has subcarrier parameter information available from the scheduling 710. In other aspects, the WWAN device receives the subcarrier parameter information by some other means. In one aspect, the WWAN device reads the subcarrier parameter information transmitted in a control channel, which might include a broadcast channel containing scheduling information. In other aspects, the WWAN device reads and/or determines subcarrier parameter information from uplink UE transmissions. The subcarrier parameter information can then be used in subsequent steps or blocks, such as depicted in FIG. 7B.

Received spread-OFDM signals are demodulated 711. In some aspects, the subcarrier parameter information can be used to demultiplex received OFDMA signals, followed by demodulation 711 of the OFDM subcarriers corresponding to each UE. Although not shown, demodulation 711 can include RF front-end processing (such as amplification, filtering, down-conversion, ADC, etc.), cyclic prefix removal, equalization, and/or matched filtering. In some aspects, demodulation 711 can comprise spatial demultiplexing (such as MIMO subspace processing). Other types of demultiplexing may be performed. Demodulation 711 typically comprises performing an over-sampled FFT, although other types of demodulation may be employed. In some aspects, demodulated OFDM signals can be equalized, such as via frequency-domain equalization (not shown).

Estimated spread data symbols produced from demodulation 711 are de-mapped 712. In one aspect, demodulation 711 comprises performing an FFT on all the received signals, and de-mapping 712 can comprise demultiplexing (e.g., separating the estimated spread data symbols with respect to corresponding UE). The subcarrier parameter information can be used to group the estimated spread data symbols according to their respective UEs. Demodulation 711 and/or de-mapping 712 can employ data re-ordering (e.g., symbol re-ordering and/or bit re-ordering) to facilitate de-spreading 713.

De-spreading 713 can comprise utilizing a fast algorithm, such as an FFT, to de-spread the estimated spread data symbols. Input parameters to the de-spreading algorithm can be selected based on the subcarrier parameter information, such as to provide a correct de-spreading code length and/or appropriate de-spreading code values for de-spreading the estimated spread data symbols. Outputs from the de-spreading 713 comprise de-spread data symbols, which can be processed to generate estimates of the original data symbols. These estimates may be grouped by UE.

Figure 9:
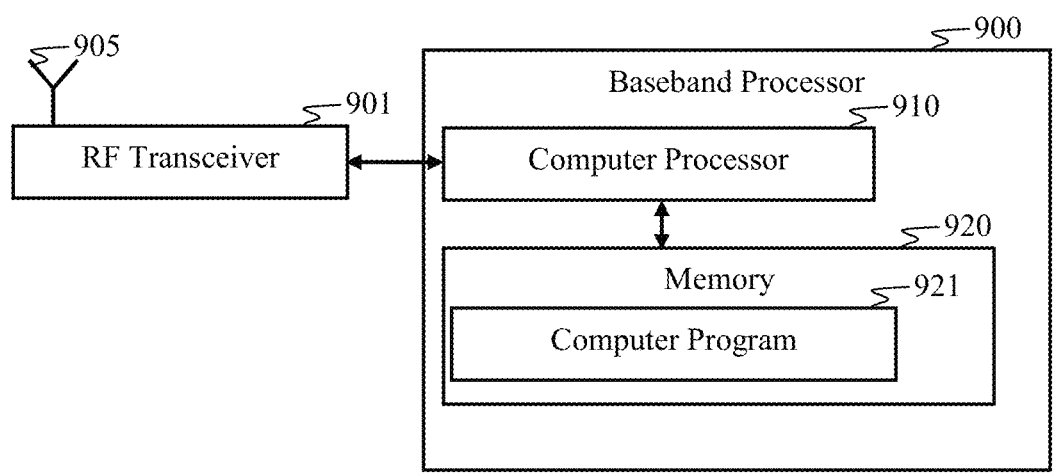
FIG. 9 is a block diagram of a transceiver that can be configured to operate in accordance with aspects of the disclosure.

In one aspect, a spread-OFDM transceiver comprises a non-transitory computer-readable memory storing DFT-spread OFDM software instructions thereon and at least one processor configured to execute the DFT-spread OFDM software instructions to operate as a spread-OFDM transmitter. Such a transceiver is depicted in FIG. 9.

Figure 8A:
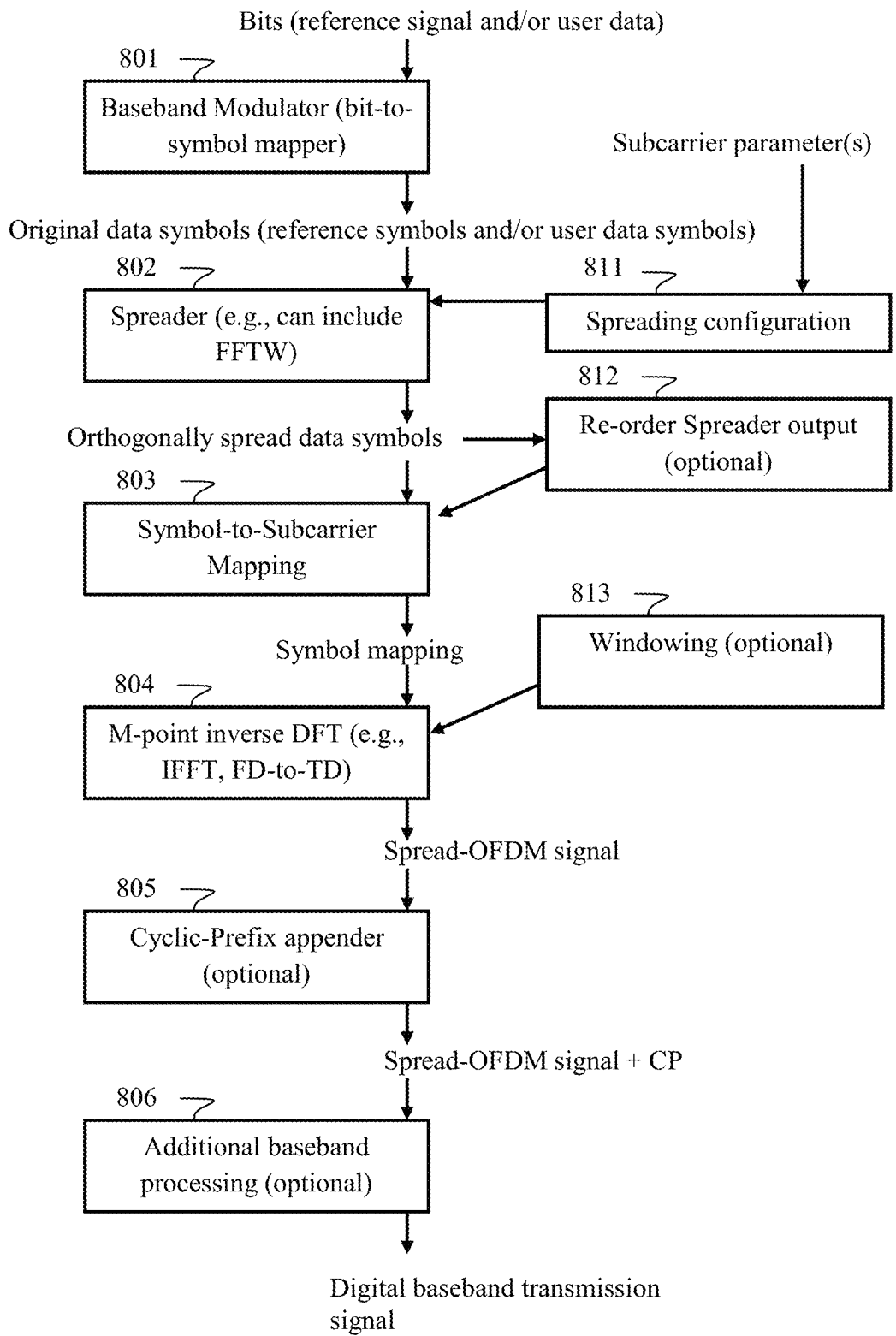
FIG. 8A is a block diagram that depicts modules corresponding to processing functions that can be implemented by a computer processor programmed to perform methods in accordance with aspects of the disclosure. The blocks can be interpreted as software modules, hardware components, or some combination thereof. The modules can represent steps in a method. In some aspects, the block diagram is indicative of structure and/or function of a client device (such as a UE) or a system of client devices.

In one aspect of the disclosure, FIG. 8A depicts a set of modules, each comprising instructions stored on a non-transitory computer-readable memory and configured to instruct a general-purpose processor (such as a processor core, a server, a distributed computing system, etc.) to perform functions disclosed herein. In other aspects, one or more modules can comprise a specific-purpose processor, such as an application-specific integrated circuit or some other circuit.

A baseband modulator, which can be implemented as a software module 801, transforms a binary input to a multi-level sequence of complex numbers in one of several possible modulation formats, including binary phase shift keying (BPSK), quaternary PSK (QPSK), 16-level quadrature amplitude modulation (16-QAM) and 64-QAM. The modulator 801 can adapt the modulation format, and thereby the transmission bit rate, to match current channel conditions of the transceiver. The output signal is referred to as original data symbols.

A spreader, which can be implemented as a software module 802 which provides spreading instructions to a processor, groups the original data symbols into blocks, each comprising N symbols. The spreader is configured to perform an N-point discrete Fourier transform (DFT) to produce a set of spread data symbols. In accordance with certain aspects of the disclosure, it is instructive to note that the DFT-spread output signal (i.e., the set of spread data symbols) differs from the customary frequency-domain representation of a spectral analysis that produces frequency responses according to tones (i.e., OFDM tones constitute the transform's basis functions). For example, the DFT-spreading output signal comprises N spread data symbols, whereas the spectral analysis produces only N/2 frequency responses, as the bandwidth of the baseband frequency response signal is limited to the range of positive frequencies, 0 to half the sampling rate ($=f_{Nyquist}$).

We begin with the definition of frequency, which Merriam-Webster Dictionary defines as the number of repetitions of a periodic process in a unit of time; the number of complete alternations per second of an alternating current; and the number of complete oscillations per second of energy (as sound or electromagnetic radiation) in the form of waves. The definition of frequency offers no distinction between a negative frequency and a positive frequency. Rather, what differentiates a negative frequency from a positive frequency relates to direction, not tone.

The mathematical representation of negative frequency can be found in the expression of physical signals as a sum of complex exponential components. For example, the negative frequency can be seen in the representation of cosine and sine functions as the weighted sums of the corresponding exponential function:

$$cos(107\ t) = Re\{e^{i\omega t}\} = (e^{i\omega t} + e^{-i\omega t})/2$$

$$sin(107\ t) = Im\{e^{i\omega t}\} = (e^{i\omega t} - e^{-i\omega t})/2i$$

In discrete systems, the frequency $f = \omega/2\pi$ of an analysis interval can range from 0 to $f_{sam}$, or equivalently, from $-f_{sam}/2$ to $+f_{sam}/2$, where $f_{sam}$ is the sampling frequency (i.e., the number of samples per interval). In discrete-time systems, the frequency response is constrained by the Nyquist frequency, which is half the sampling rate $f_{sam}$.

in general, when a sinusoid of frequency f is sampled with frequency $f_{sam}$, the resulting number of cycles per sample is $f/f_{sam}$ (known as normalized frequency), and the samples are indistinguishable from those of another sinusoid (called an alias) whose normalized frequency differs from $f/f_{sam}$ by any integer (positive or negative). Replacing negative frequency sinusoids by their equivalent positive frequency representations, all the aliases of frequency f can be expressed as $f_{alias}(n)=|f-nf_{sam}|$ for any integer n, with $f_{alias}(0)$ being the true value.

Aliasing matters when analyzing a signal, such as performing spectrum analysis, which expresses the discrete signal of N complex data symbols as a set of N/2 frequency responses, sometimes referred to as tones. Tones are defined herein in the usual and customary sense with regard to the fields of OFDM and Fourier transforms as orthogonal frequencies, e.g., spectral components. The typical analysis technique employs the smallest of the $f_{alias}(n)$ frequencies. So it is important that $f_{alias}(0)$ be the unique minimum. A necessary and sufficient condition for this is $f_{sam}/2 > |f|$, where $f_{sam}/2$ is the Nyquist frequency of a system with sampling rate $f_{sam}$. For example, with Fourier transform analysis in a digital spectrum analyzer, it is necessary to sample the input signal with a sampling frequency that is at least twice the bandwidth of the input signal due to the Nyquist limit. The Fourier transform will then produce a spectrum containing frequencies from 0 to $f_{sam}/2$. While only N/2 frequency responses are achievable, N-point spreading disclosed herein can produce N spread data symbols.

The following software code can be used to implement DFT spreader 802 in accordance with aspects of the disclosure. By way of example, the FFTW program (such as can be found at www.fftw.org, all the descriptions and documentation described therein and the contents of the links provided, being incorporated by reference in their entireties) can be employed to compute a DFT, such as a one-dimensional DFT of size N:

```
#include <fftw3.h>
...
{
    fftw_complex *in, *out;
    fftw_plan p;
    ...
    in = (fftw_complex*) fftw_malloc(sizeof(fftw_complex) * N);
    out = (fftw_complex*) fftw_malloc(sizeof(fftw_complex) * N);
    p = fftw_plan_dft_1d(N, in, out, FFTW_FORWARD, FFTW_ESTIMATE);
    ...
    fftw_execute (p); /* repeat as needed */
    ...
    fftw_destroy_plan(p);
    fftw_free(in); fftw_free(out);
}
```

To use the FFTW program, this code example is linked with the fftw3 library. The example code first allocates the input and output arrays using the fftw_malloc function.

The data is an array of type fftw_complex, which is by default a double [2] composed of the real (in [i][0]) and imaginary (in [i][1]) parts of a complex number. The next step is to create a plan, which is an object that contains all the data that FFTW needs to compute the FFT. This function creates the plan:

fftw_plan fftw_plan_dft_1d(int N, fftw_complex*in, fftw_complex*out, int sign, unsigned flags);

The first argument, N, is the size of the transform that will be computed. While the size N can be any positive integer, sizes that are products of small factors can be transformed most efficiently, such as described herein. The next two arguments are pointers to the input and output arrays of the transform. These pointers can be equal, indicating an in-place transform. The fourth argument, sign, can be either FFTW_FORWARD (−1) or FFTW_BACKWARD (+1) to indicate the direction of the transform. Technically, it is the sign of the exponent in the spreading codes. While aspects of the disclosure discuss forward transforms for spreading, other aspects can employ the backward (e.g., inverse) transform for spreading. For example, an IDFT can be implemented as an IFFT to provide for spreading or generating the spreading code(s). Thus, the term DFT as used herein is meant to include its corresponding backward (e.g., inverse) transform. The flags argument is usually either FFTW_MEASURE or FFTW_ESTIMATE. FFTW_MEASURE instructs FFTW to run and measure the execution time of several FFTs in order to find the best way to compute the transform of size N.

Once the plan has been created, it can be used multiple times for transforms on the specified input and output arrays by computing the transforms via fftw_execute (plan):
void fftw_execute(const fftw_plan plan);

The DFT results are stored in-order in the output array (out) , with the zero-frequency (DC) component in out [0]. If in !=out, the transform is out-of-place and the input array (in) is not modified. Otherwise, the input array is overwritten with the transform. To transform a different array of the same size, a new plan is created with fftw_plan_dft_1d, and FFTW automatically reuses the information from the previous plan, if possible. The plan can be deallocated by calling fftw_destroy_plan (plan) .

FFTW uses the standard "in-order" output ordering, meaning that the $n^{th}$ output corresponds to the frequency n/N (or n/T, where T is the total sampling period). In terms of positive and negative frequencies, this means that the positive frequencies are stored in the first half of the output and the negative frequencies are stored in backwards order in the second half of the output (i.e., the frequency –n/N is the same as the frequency (N-n)/N).

The output ordering of the FFT depends on the type of FFT employed, including whether the FFT is implemented in hardware or software. For example, an FFT block can output the frequency indices in linear or bit-reversed order. Linear ordering of the frequency indices requires a bit-reversal operation. Thus, in some aspects, it may be necessary for the FFT or the mapper to re-order the output, such as to provide a mapping to the OFDM subcarriers which yields the low PAPR.

In some aspects of the disclosure, spreader 802 may be implemented via the following steps. A DFT can be used to generate the spreading codes, which are then stored in memory. Based on OFDM subcarrier assignment, subcarrier parameter(s) is (are) input, and a corresponding set of codes is selected from the memory and used to spread the original data symbols, such as via a matrix multiplication operation. For example, the input vector (in) can be a kernel used by the FFTW program to generate the spreading matrix, which can then be stored in non-transitory memory, and selected thereafter (such as with respect to the number of subcarriers N, subcarrier spacing, and/or any other subcarrier parameter(s)) for use in a matrix multiplication operation with a matrix comprising the original data symbols.

In aspects disclosed herein, the input vector comprises the data symbols, wherein the vector length N can be selected to have small prime factors (which can provide certain processing performance advantages). The input data vector can be configured, such as via zero insertion and scaling, to affect the distribution and/or scaling of non-zero terms in the output vector.

In one aspect, a spreading configuration module 811 processes subcarrier parameters corresponding to resource blocks (e.g., OFDM subcarriers) assigned to the transmitter. The subcarrier parameters can be determined from scheduling information received in a control channel, such as a downlink broadcast channel in a WWAN used to communicate resource block assignments to the UEs for use in uplink transmissions. The spreading configuration module 811 might receive scheduling information or subcarrier parameters from a UE's RAN control module (not shown) configured to process network control information.

While aspects disclosed herein provide examples of uniformly spaced OFDM subcarriers, alternative spreading algorithms (which may employ a DFT) can be used to produce complex spreading codes adapted to other subcarrier topologies to provide for an advantageous combination of orthogonality (i.e., cross correlation) and low PAPR. Some of these spreading codes can be poly- magnitude as well as polyphase. In some aspects, better cross correlation can be sacrificed for improved PAPR. Bandwidth efficiency might be sacrificed to achieve better PAPR and/or orthogonality. Thus, in some aspects, various performance metrics (which can include PAPR, orthogonality, bandwidth efficiency, as well as others) can be employed in an optimization scheme in which the values of such metrics are weighted, and optimization comprises evaluating a weighted sum (or some other function) of the performance metrics.

The spreading configuration module 811 can configure (including dynamically adapting) the spreader 802 to produce the spread data symbols in accordance with the subcarrier parameter(s) and at least one spreading criterion. Spreading criteria can include objectives, such as providing a PAPR below a predetermined threshold, providing orthogonality (which can comprise an evaluation, such as whether spreading code cross correlations are below a threshold value), and enabling efficient spreading (such as via a fast transform algorithm, or other types of processing). Other spreading criteria may be employed.

By way of example, in IEEE 802.11a, the FFT size is typically 64 with a sample rate of 20 MHz. This yields a subcarrier spacing of 312.5 kHz. Of these 64 potential subcarriers, 12 of them are unused (sometimes referred to as "virtual carriers"). Of the remaining 52 subcarriers, 4 contain pilot tones, so only 48 subcarriers carry information at any given time. Instead of transmitting one original data symbol per 312.5 kHz subcarrier, the spreader 802 provides spread data symbols, each representing a linear combination of the original data symbols, which allows a portion of each original data symbol to be transmitted on all 48 or 52 subcarriers. While this IEEE 802.11a example is described, it should be appreciated that aspects of the disclosure described herein can be employed in other cases, which can include other systems.

In one aspect, the spreading configuration module 811 might configure the spreader 802 to employ a 52-point FFT to generate the spread data symbols corresponding to the reference signals plus user data signals. The resulting 52 spread data symbols are then mapped by the mapper 803 to the IFFT 804. Since 52 has prime factors of 2,2,13 and 48 has prime factors of 2,2,2,2,3, the spreading configuration module 811 could configure the spreader 802 to employ a 48-point FFT to spread the user data signals and a 4-point FFT to spread the reference signals, which might provide more efficient spreading than the 52-point FFT spreading. However, employing separate spreading of the reference signals and user data signals could result in a higher PAPR. Thus, the spreader 802 might employ an algorithm that weighs the efficiency and PAPR criteria to select which spreading mode to employ. It should be appreciated that the algorithm employed by the spreader 802 can employ various additional criteria. In some cases, the additional criteria can affect the weights of the spreading criteria (e.g., efficiency and PAPR). For example, operating criteria, such as (but not limited to) the UE's transmitted signal power, modulation scheme, modulation constellation size, pre-coding, MIMO operation, etc., can affect how the spreading configuration module 811 configures the spreader 802 to spread the original data symbols. In some aspects, operating conditions, such as determined from channel state information, network traffic, network topology information, received signal strength, routing tables, and the like, can affect how the spreading configuration module 811 configures the spreader 802 to spread the original data symbols. In some aspects, the operating conditions may be measured to infer the UE's operating parameters (such as transmit power, modulation, pre-coding, etc.). In some aspects, higher PAPR might be tolerable when a small constellation size (e.g., BPSK modulation) and/or low transmit power is employed, so spreading can be configured to improve processing efficiency and/or orthogonality at the expense of allowing for a higher PAPR. When high transmission power and/or modulations that produce a high-PAPR signal are employed, there might be less PAPR budget for the spreader 802 to exploit. Thus, the spreading configuration module 811 might configure the spreader 802 to sacrifice processing efficiency and/or orthogonality in favor of lower PAPR.

In another aspect, with respect to the IEEE 802.11a example, the spreading configuration module 811 might configure the spreader 802 to employ a 64-point FFT to generate the 52 spread data symbols corresponding to the reference signals plus user data signals. For example, the spreader 802 might be configured to generate a pre-spread input of 64 pre-spread original data symbols to the 64-point FFT, wherein the pre-spreading causes the FFT output to comprise only 52 non-zero spread data symbols. The resulting 52 spread data symbols are then mapped by the mapper 803 to the IFFT 804. It should be appreciated that aspects of a spreading configuration can be used in other scenarios and in other systems to employ N-point transforms for generating fewer than N non-zero outputs, the outputs comprising spread data symbols that satisfy one or more criteria, which can include low PAPR and/or orthogonality.

In some aspects of the disclosure, instead of a fixed algorithm for computing the DFT, the spreading configuration module 811 can adapt the DFT algorithm in the spreader 802 relative to details of the underlying hardware in order to maximize performance. For example, while FFTW's planner determines the fastest way to compute the transform for the machine on which it resides, other factors that depend on the subcarrier parameters can affect the processing efficiency. Thus, the spreading configuration module 811 can interface with the planner (or perform functions of the planner) to adapt the DFT algorithm relative to specific features of the calculations that will be performed. Various features, such as DFT size, sparseness of the spreading matrix, and/or characteristics of the input data, can be employed along with information about the underlying hardware to configure the DFT algorithm. The planner produces a data structure called a plan that contains this information. Subsequently, the plan is executed to transform the array of input data as dictated by the plan.

In some aspects, pulse shaping can be performed by "windowing" the output of the spreader 802. This can be performed as part of the spreading, or it may be performed by the mapper 803, such as applied to inputs of the IFFT 804. For example, a tapered window can taper the amplitudes of at least some of the spread data symbols such that the taper is applied to the edges of the allocated spectrum. Raised cosine and Gaussian filter shapes are often used, but other types of pulse shaping can be employed.

The spreader 802 and/or the mapper 803 can configure the spread data symbols by arranging their order relative to the IFFT 804 input. Output values of the FFT are appropriately mapped to OFDM subcarriers in a manner that produces a low-PAPR spread-OFDM signal (regardless of the order or values of the original data symbols). In one aspect, ordering provides for mapping spread data symbols (relative to ascending spreading-code index) to ascending subcarrier frequencies, such as wherein the zero-frequency (DC) value corresponds to the lowest subcarrier frequency, in order to provide low-PAPR spread-OFDM signal.

The mapper 803 maps each of the NDFT outputs to one of the M>NIFFT 804 bins. As in OFDMA, a typical value of M is 256 subcarriers and N=M/Q is an integer submultiple of M. Q is the bandwidth expansion factor of the symbol sequence. The result of the subcarrier mapping is a set of complex subcarrier amplitudes, where N of the amplitudes are non-zero. As in OFDMA, the M-point IDFT 804 transforms the subcarrier amplitudes to a complex time domain signal, which is the spread-OFDM signal.

The transmitter can comprise a cyclic prefix appender 805, which inserts a cyclic prefix in order to provide a guard time to prevent inter-block interference (MI) due to multipath propagation. In general, the cyclic prefix is a copy of the last part of the block, which is added at the start of each block. If the length of the cyclic prefix is longer than the maximum delay spread of the channel, or roughly, the length of the channel impulse response, then, there is no IBI. Since the cyclic prefix is a copy of the last part of the block, it converts a discrete time linear convolution into a discrete time circular convolution. Thus, transmitted data propagating through the channel can be modeled as a circular convolution between the channel impulse response and the transmitted data block, which, in the frequency domain, is a pointwise multiplication of the DFT frequency samples. Then, to remove the channel distortion, the DFT of the received signal can simply be divided by the DFT of the channel impulse response point-wise, or a more sophisticated frequency domain equalization technique can be implemented.

Additional baseband processing 806 can be performed. For example, pulse shaping can reduce out-of-band signal energy. In electronics and telecommunications, pulse shaping is the process of changing the waveform of transmitted pulses. Its purpose is to make the transmitted signal better suited to its communication channel, typically by limiting the effective bandwidth of the transmission. In RF communication, pulse shaping is essential for making the signal fit in its frequency band. At baseband, the time sequence of the spread-DFT signal is filtered by the pulse-shaping filter. The spectrum of the transmission is thus determined by the filter.

Digital-to-analog conversion (DAC), frequency up-conversion, and amplification are typically performed to produce a transmitted signal. In practical implementations, typical DACs use digital interpolation filtering before implementing the D-to-A conversion. By interpolating the data samples, the performance of the reconstruction filter is improved, as increasing the sampling frequency can be seen to directly reduce the analog filter requirements for alias suppression.

Interpolation in OFDM is typically performed by the IFFT 804. Interpolators in OFDM are described in U.S. Pat. No. 6,597,745, which is incorporated by reference, wherein a transform-domain interpolation unit expands a length-N transform domain vector by inserting zeros in the length-N transform domain vector to produce a length-2N transform domain vector. This transform-domain up-sampling unit interpolates the transform domain vector.

Interpolators in spread-OFDM transmitters can be employed in various aspects of the disclosure. By way of example, interpolation is disclosed throughout U.S. Pat. No. 6,686,879 (such as illustrated in FIG. 19), which is incorporated by reference, wherein a data sequence is serial-to-parallel converted and then modulated onto multiple OFDM subcarriers, which are provided with phase offsets to synthesize a desired pulse shape for the resulting data-modulated pulse waveform. This process of transforming a serial data stream into a sequence of data-modulated pulses is implemented using an invertible transform function, such as an IFFT. Interpolation can also be provided via pulse shaping.

Aspects of the disclosure can include any of various types of interpolation. In order to perform frequency-domain interpolation, the input data is up-sampled before IFFT 804 processing. The up-sampling can be performed by zero-padding the middle samples of the input sequence. One disadvantage of frequency-domain interpolation is the increase in the IFFT size. For this reason, the oversampling rate is often kept relatively low.

As discussed above, in accordance with certain aspects of the disclosure, DFT-spreading 802 employs an N-point DFT to spread a sequence of data symbols s(n) to produce N spread symbols, x(n), which are to be modulated onto N OFDM subcarriers. To the contrary, in spectrum analysis, the transform of a discrete signal produces frequency responses corresponding to tones. The limitation of the transform's orthonormal basis to tones discards the negative-frequency components. Whether a pair of signals have negative and positive frequencies, or they have a relative phase offset (e.g., in-phase and quadrature phase), if they have the same frequency, then they are the same tone. The basic idea behind employing a DFT on a discrete signal to calculate frequency responses corresponding to tones is that the negative frequency components of the Fourier transform are superfluous due to Hermitian symmetry. These negative frequency components are discarded with no loss of information, leaving a complex-valued function. But in aspects of the disclosure, it is unnecessary to discard spread-DFT symbols produced by the DFT-spreading 802.

To generate a spread-OFDM up-sampled-by-M analytic time signal (assuming Nis even) from the spread symbols, x(n), a method, circuit, and/or processor, for example, according to one aspect of the disclosure can provide for performing the following steps.

1. Create an M·N-point spectral sequence $x_{int}(m)$ initially set to all zeros. In some aspects, the product M·N can be an integer power of two.
2. Assign $x_{int}(0)=x(0)$, and $x_{int}(N/2)=x(N/2)$.
3. Assign $x_{int}(m)=2x(m)$, for $1 \leq m \leq (N/2)-1$. For example, when performed by a UE, this step and the previous one can provide for mapping non-zero symbol values to the OFDM subcarriers assigned to the UE.
4. Compute an MN-point IFFT of $x_{int}(m)$ to yield the desired M·N-length analytic (complex) $x_{c,int}(n)$ sequence.
5. Optionally, multiply $x_{c,int}(n)$ by M to compensate for the 1/M scaling factor.

In the domain of digital signal processing, the term interpolation refers to the process of converting a sampled digital signal to that of a higher sampling rate (i.e., up-sampling) using various digital filtering techniques (e.g., convolution with a frequency-limited impulse signal). In such applications, there is a specific requirement that the harmonic content of the original signal be preserved without creating aliased harmonic content of the original signal above the original Nyquist limit of the signal (i.e., above $f_s/2$, which is half of the original signal sample rate, 1/T). For example, Let X(f) be the Fourier transform of a function, x(t), whose samples at some sampling interval, T, equal the x[n] sequence. The passband bandwidth of the corresponding interpolation filter is defined by its cut-off frequency, 0.5/L, where L is the oversampling factor. In terms of actual frequency, the cutoff is ½·(1/T) Hz, which is the Nyquist frequency of the original x[n] sequence.

Bandwidth is the difference between the upper and lower frequencies in a continuous set of frequencies. The passband bandwidth is the difference between the upper and lower cut-off frequencies of, for example, a band-pass filter, a communication channel, or a signal spectrum. In the case of a low-pass filter or baseband signal, the bandwidth is equal to its upper cut-off frequency, $f_s/2$.

Figure 8B:
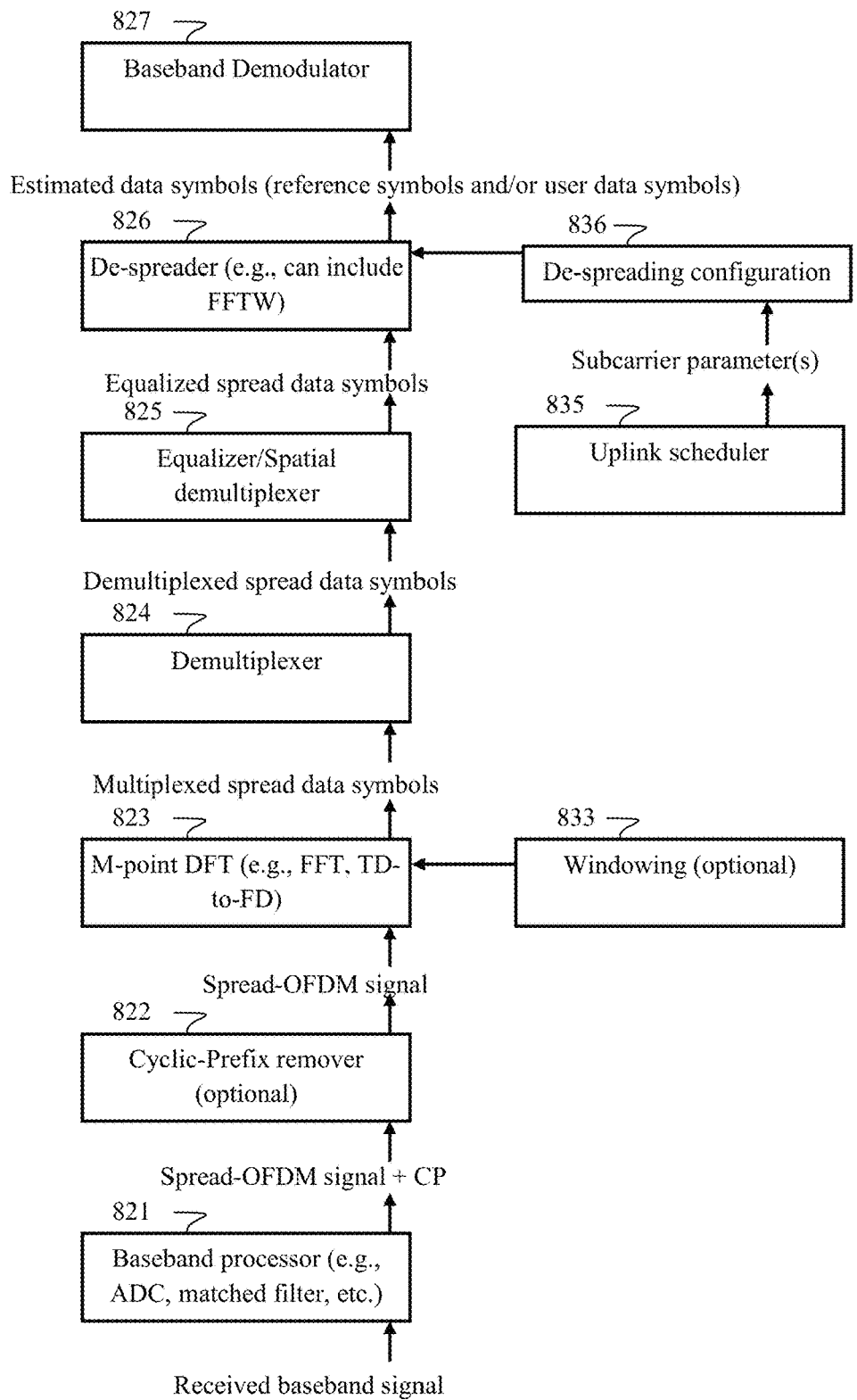
FIG. 8B is a block diagram that depicts modules corresponding to processing functions that can be implemented by a computer processor programmed to perform methods in accordance with aspects of the disclosure. The blocks can be interpreted as software modules, hardware components, or some combination thereof. The modules can represent steps in a method. In some aspects, the block diagram is indicative of structure and/or function of a server-side device (such as a base transceiver station (e.g., an eNodeB) or a central processor coupled to one or more base transceiver stations), or a system of server-side devices, such as a Coordinate Multipoint system.

FIG. 8B is a block diagram that depicts modules corresponding to processing functions that can be implemented by a computer processor programmed to perform methods in accordance with aspects of the disclosure. In accordance with an aspect of the disclosure, a server-side device or system receives spread-OFDM transmissions from one or more UEs in a WWAN. After processing by one or more RF front-ends (not shown), a server-side processor (or processors) can receive the down-converted baseband signal(s). A baseband processor(s) 821 can process the received baseband signal, typically providing ADC processing, matched filtering (e.g., pulse shape filtering), amplification, and/or possibly other baseband processing operations to produce a spread-OFDM signal(s), which possibly has a cyclic prefix. A cyclic prefix remover 822 can optionally remove any cyclic prefix. The spread-OFDM signal(s) is processed by an M-point DFT (or some equivalent time-domain to frequency-domain converter) 823 to produce spread data symbols, which may be estimates of the spread original data symbols that were transmitted on each OFDM subcarrier. In some aspects, the DFT 823 may be configured to perform frequency-domain windowing, such as via control of a windowing module 833. A demultiplexer 824 may optionally be used to provide OFDMA demultiplexing if necessary. The spread data symbols are usually equalized by an equalizer 825 prior to despreading. However, equalization may not be necessary in certain aspects. In some aspects, the equalizer 825 may comprise a spatial demultiplexer. In some aspects, the spatial demultiplexer is configured to perform MIMO subspace demultiplexing, such as Cooperative-MIMO subspace demultiplexing.

A despreader 826 despreads the spread data symbols to produce estimates of the original (despread) data symbols. The despreader 826 can employ a fast transform algorithm, such as an IFFT, which can be implemented with the FFTW software. The despreader 826 is controlled by a despreading configuration module 836, which can receive one or more subcarrier parameters corresponding to the OFDM subcarriers assigned to a particular UE(s). Subcarrier parameters, which can include number of subcarriers, subcarrier spacing, and the like, provide an indication of spreading parameters (and thus, despreading parameters), which the despreader 826 can use to despread received spread data symbols. In some aspects, subcarrier parameters are understood to comprise spreading (and/or despreading) parameters associated with OFDM resource blocks. In some aspects, such spreading (and/or despreading) parameters may be pre-associated with each resource block assignment and communicated via the scheduler 835 to the despreading configuration module 836. In some aspects, the despreading configuration module 836 listens to a scheduling channel broadcast by an uplink scheduler 835 to determine the subcarrier parameters. In other aspects, the despreading configuration module 836 might determine the subcarrier parameters from the UE transmissions.

The despreader 826 can be configured to perform hard decisions, soft decisions, or mixed-decision processing to produce the estimated data symbols. A baseband demodulator 827 may optionally be provided to perform further baseband processing of the estimated data symbols.

As depicted in FIG. 9, a transceiver configured in accordance with aspects disclosed herein can include a controller, such as at least one computer or data processor 910, at least one non-transitory computer-readable memory medium embodied as a memory 920 that stores a program of computer instructions 921, and at least one suitable radio frequency (RF) transmitter/receiver 901 for bidirectional wireless communications with at least one other transceiver via one or more antennas 905. The exemplary aspects of the disclosure (including those depicted in the flow diagrams and block diagrams) may be implemented, at least in part, by computer software executable by the data processor 910. The transceiver shown in FIG. 9 can be a UE, a base transceiver station, a relay, or some other transceiver.

Aspects disclosed herein can include Cooperative-MIMO precoding, and can comprise configuring the spreading codes to provide for spreading across a combination of subcarriers and antennas (such as across multiple UEs). In such aspects, precoding can be configured to achieve a combination of cooperative spatial multiplexing across a plurality of UEs and a low PAPR for each UE's transmissions. In other aspects, precoding may comprise pre-equalizing the transmitted signal. In such aspects, for example, pre-equalization weights applied to transmitted OFDM subcarriers, such as may be implemented by incorporation into the spreading codes, can be derived from channel information. Various techniques, including multi-objective optimization and other multi-objective algorithms can be employed to generate spreading codes that optimize (or at least achieve a predetermined performance threshold relative to) certain objectives, such as low PAPR, low cross correlations, and/or other objectives.

Figure 10A:
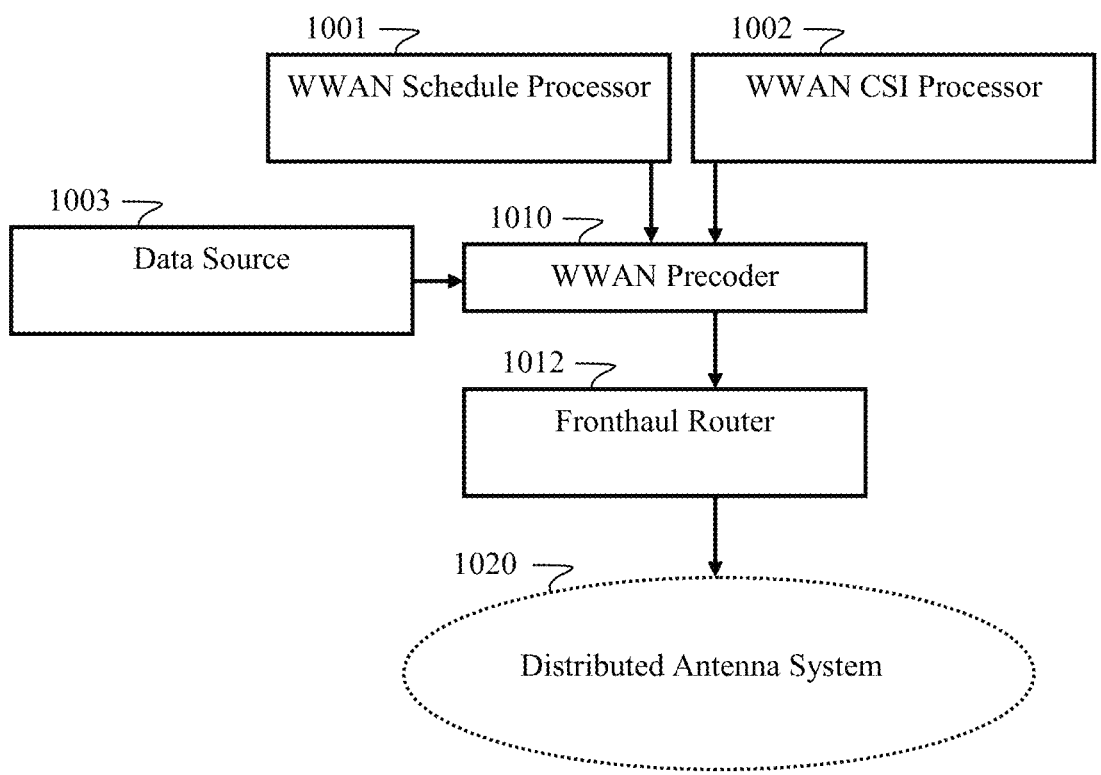
FIGS. 10A and 10B are block diagrams that illustrates transceiver configurations in accordance with aspects of the disclosure. The blocks can comprise processing elements that provide necessary computing facilities for the transceiver. By way of example only, processing elements can include special purpose hardware accelerators, such as co-processors for Fast Fourier Transform (FFT), encryption and decryption security processors, or programmable Central Processing Units (CPUs).
Figure 10B:
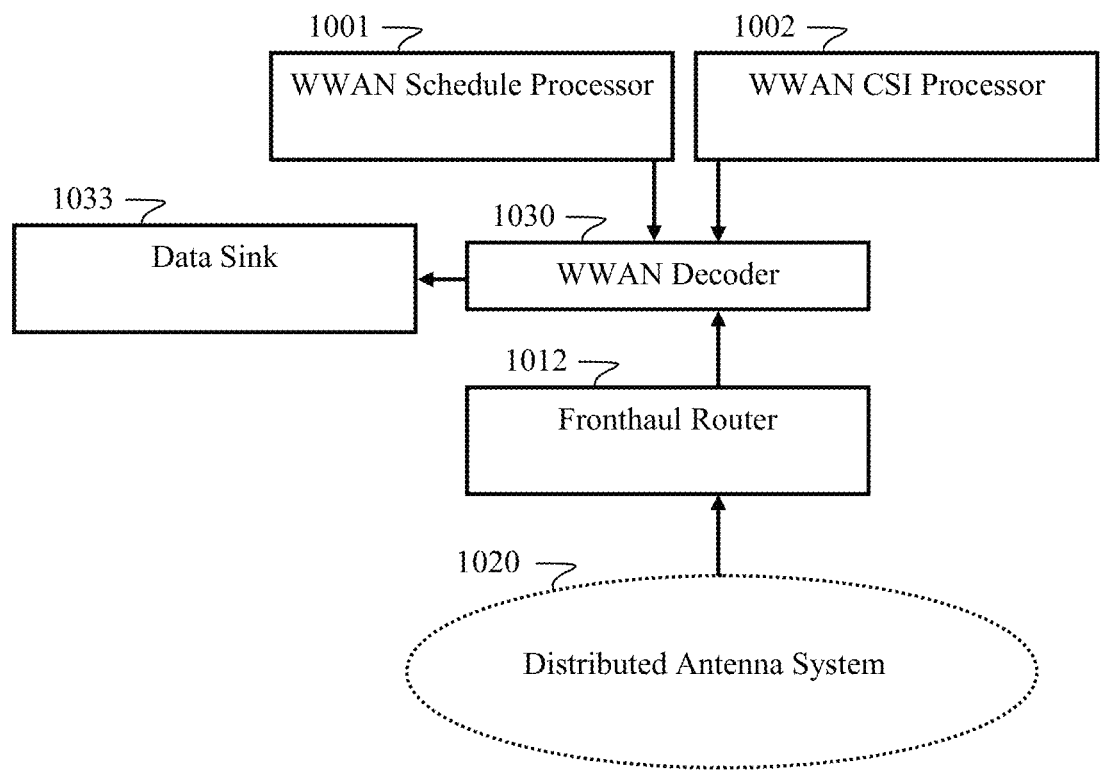

A transceiver configured in accordance with aspects of the disclosure is depicted in the block diagrams of FIGS. 10A and 10B. The transceiver can comprise a client-side device or system, a server-side device or system, a relay device or system, and/or other WWAN transceivers. In some aspects, the blocks can comprise hardware components, such as circuits. The blocks can comprise processors, such as general-purpose processors programmed to perform functions in accordance with methods disclosed herein. The blocks are also indicative of functions that can be performed by a transceiver (which includes a network of transceivers) in accordance with aspect disclosed herein. In some aspects, the blocks can comprise separate devices communicatively coupled together via at least one network. In some aspects, at least some of the separate devices can be coupled together via a WLAN, which can include a radio and/or optical network.

In FIG. 10A, the transceiver comprises a WWAN precoder 1010, which is configured to calculate precoder weights for use in a distributed antenna system 1020. The precoder 1010 receives information from a WWAN scheduler, such as a WWAN schedule processor 1001 and a WWAN CSI processor 1002. A data source 1003 provides original data symbols to the WWAN precoder 1010. The precoder 1010 is communicatively coupled to a fronthaul router 1012, which is connected to the distributed antenna system 1020.

In FIG. 10B, the transceiver comprises a WWAN decoder 1030, which is configured to calculate decoder weights for processing received signals, such as signals received from the distributed antenna system 1020. The decoder 1010 receives information from the WWAN schedule processor 1001 and the WWAN CSI processor 1002. A data sink 1033 processes decoded data symbols from the WWAN decoder 1030. The decoder 1010 is communicatively coupled to the fronthaul router 1012, which is connected to the distributed antenna system 1020. In some aspects, the WWAN precoder 1010 and the WWAN decoder 1030 can be a single component or system.

In some aspects, blocks disclosed herein comprise processing elements that provide necessary computing facilities for the device or system. By way of example only, processing elements can include special purpose hardware, such as FFT, coding and/or decoding processors, or programmable CPUs. In aspects wherein one or more of the blocks are communicatively coupled together via a network, such as may be implemented in a distributed system, the blocks can comprise interfaces which contain appropriate traffic format conversion circuitry between the blocks and the interconnect network input and output. In some aspects, the system further includes internal resources with shared usage among various system blocks. By way of example only, these internal resources may comprise memory and a memory access controller.

In some aspects, the router 1012 includes Input-Output (I/O) device interface units that provide connection between the precoder 1010 and external devices of the distributed antenna system 1020 through one or more fronthaul interfaces. By way of example only, these devices may include Ethernet, wireless standard compliant networking, fiber networking, and/or an expansion interface for creating larger systems using multiple systems of the type shown in figure.

In one aspect, the transceiver is a server-side device or system, and the WWAN schedule processor 1001 is a scheduler, which assigns resource blocks (e.g., blocks of OFDM subcarriers) for uplink and downlink communications with one or more client-side devices (e.g., UEs). The WWAN precoder 1010 can use the scheduling information to determine a set of OFDM subcarriers for which precoding weights will be generated. The precoder 1010 can also use the scheduling information to help determine which antennas in the distributed antenna system 1020 to allocate for possible use in serving the client devices. For example, the scheduling information might contain geographical information about each corresponding client device. This can assist in allocating distributed computing resources operated by the WWAN precoder 1010, for example, when multiple processing cores are employed. The WWAN precoder 1010 couples precoded-data signals or precoding weights and the original data signals to selected antennas of the distributed antenna system 1020 via the fronthaul router 1012.

In another aspect, the transceiver is a client-side device or system, and the WWAN schedule processor 1001 receives WWAN scheduling information, such as is typically broadcast in the WWAN. However, the schedule processor can receive the WWAN scheduling information by other means. In one aspect, cooperating client devices may convey their corresponding scheduling information to the WWAN schedule processor 1001, such as via the fronthaul network. The WWAN precoder 1010 can use the scheduling information to determine a set of OFDM subcarriers for which precoding weights will be generated. In some aspects, the WWAN precoder 1010 comprises a distributed computing system, such as may comprise multiple processing cores residing on different client-side devices. In some aspects, at least some of the processing cores of the WWAN Precoder 1010 might reside in a non-client device, such as a relay or a server-side device. The WWAN Precoder 1010 might be configured to use the scheduling information to allocate distributed computing resources (e.g., processing cores, memory, fronthaul resources, etc.), such as for precoding and/or other processing operations. The WWAN precoder 1010 can couple precoded-data signals or precoding weights and the original data signals to selected antennas of the distributed antenna system 1020 via the fronthaul router 1012.

In one aspect, the transceiver is a server-side device or system, and the WWAN CSI processor 1002 provides downlink CSI to the WWAN precoder 1010. For example, in a reciprocal channel, the CSI processor 1002 can infer downlink CSI from uplink CSI measurements. In some aspects, the client-side devices can measure CSI in the downlink and feedback their measurements to the server-side. The WWAN precoder 1010 then provides those CSI measurements to the WWAN precoder 1010. The WWAN precoder 1010 can use the CSI to select antennas in the distributed antenna system 1020 to serve each client device and then use the CSI to calculate the precoding weights. By way of example, the WWAN precoder 1010 might select a preliminary, or candidate, plurality of antennas to be used for precoding, and then refine the selection of antennas based on various criteria. One objective of the WWAN precoder 1010 might include determining a set of the antennas that enables low-PAPR pre-coded transmissions per antenna. The WWAN precoder 1010 is operable to configure the precoding in order to provide low-PAPR transmissions. The WWAN precoder 1010 may be configured to achieve additional criteria, including enabling use of a fast transform, providing for code orthogonality (e.g., code spaces with low cross correlations), limiting WLAN overhead, etc.

In accordance with some aspects of the disclosure, it should be appreciated that blocks depicted in the figures can comprise interconnects that are not shown. By way of example, the WWAN CSI processor 1002 can be communicatively coupled to at least the WWAN schedule processor 1001 (such as in FIGS. 10A and 10B). In some aspects, the WWAN schedule processor 1001 employs CSI and/or other channel information for scheduling, such as to provide for channel-dependent scheduling. Channel-dependent scheduling can comprise selecting OFDM resource blocks with estimated and/or measured channel conditions that are advantageous for specific client devices. In some aspects, channel-dependent scheduling can comprise scheduling resource blocks to client devices in a manner that is advantageous to the operation of the server-side system. For example, scheduling may provide for assigning the same or overlapping resources (e.g., resource blocks and/or other network resources, such as antennas, processors, fronthaul capacity, backhaul capacity, etc.) to a set of client devices, which may be clustered together or geographically separated, such as to enhance network efficiency and/or performance.

While CI coding eliminates the effect of data randomization on the PAPR of OFDM transmissions from a single user, channel-based precoding (such as MIMO precoding, pre-equalization, etc.) can introduce randomization into the transmittal signals' crest factors due to the natural randomness of the multipath channel, which translates into randomness in the precoding. Thus, some aspects of the disclosure are configured to exploit additional degrees of freedom available in a MIMO channel when the number of available transmit antennas exceeds the minimum required rank of the channel matrix to reduce the crest factors. For example, in one aspect, a set of active transmit antennas in the distributed antenna system can be selected from a larger set of candidate antennas in the distributed antenna system. In another aspect, the set of active transmitting antennas can comprise a larger number than the number of antennas receiving the precoded transmissions, the precoder 1010 exploiting the extra antennas to provide for reducing PAPR, reducing spatial cross correlation, improving diversity, and/or the like. This enables antenna selection to advantageously provide a set of antennas per OFDM tone that achieves low-PAPR transmissions per antenna and/or per device. A low-PAPR criterion might include an aggregate of PAPR across antennas and/or devices, PAPR corresponding to a subset of antennas and/or devices, an average PAPR, a mean PAPR, a peak PAPR, some other function of PAPR, or some function of PAPR weighted relative to some other criterion. In some aspects, the selection of antennas per tone can be performed for each set of original data symbols.

In one aspect, the transceiver is a client-side device or system, and the WWAN CSI processor 1002 provides uplink CSI to the WWAN precoder 1010. For example, in a reciprocal channel, the CSI processor 1002 can infer uplink CSI from downlink CSI measurements. In some aspects, the server-side devices might measure CSI in the uplink and feedback their measurements to the clients. The WWAN precoder 1010 provides the uplink CSI to the WWAN precoder 1010. The WWAN precoder 1010 can use the CSI to select antennas in the distributed antenna system 1020, which can include other client devices configured to operate in a Cooperative MIMO network, and then use the CSI to calculate the precoding weights. By way of example, the WWAN precoder 1010 might select a preliminary, or candidate, plurality of antennas to be used for precoding, and then refine the selection of antennas based on various criteria. One objective of the WWAN precoder 1010 might include determining a set of the clients that enables low-PAPR pre-coded transmissions per client.

The data source 1003 provides a stream of original data symbols (which can comprise user data and/or reference signals) to the WWAN precoder 1010. In one aspect, the WWAN precoder 1010 calculates precoding weights separately for the user data and the reference signals. In other aspects, the WWAN precoder 1010 provides precoding weights for a data set comprising both user data and reference signals. In one aspect, the WWAN precoder 1010 is configured to select a block of the original data symbols from the data source 1003 and generate the precoding weights specific to the selected block of data. In other aspects, the WWAN precoder 1010 can calculate the precoding weights without a data input and then precode blocks of data from the data source 1003. In some aspects, the data source 1003 might reside in a client device and receive data from at least one other client device in a cluster of devices communicatively coupled together via the fronthaul network. Data from at least one other device can be input to the WWAN precoder 1010, which performs at least one of determining the precoding weights and precoding the data.

In a server-side device or system, the fronthaul router 1012 can comprise a local network manager, such as a Coordinated Multipoint router, communicatively coupled to the distributed antenna system 1020 (e.g., base transceiver stations, relays, remote radio heads, etc.) via any combination of fiber optic and wireless links. In a client-side device, the fronthaul router 1012 can comprise a local network manager, such as a cluster master, communicatively coupled to the distributed antenna system 1020 (e.g., the other clients in the cluster, relays, etc.) via wireless links.

In some aspects, the system shown in the figures can comprise a distributed system wherein the blocks are communicatively coupled via a fronthaul interconnect and may also include an interconnect network scheduler (not shown) which can configure and service communication traffic between I/O devices, processing elements, and shared resources. The interconnect network scheduler can control and configure accesses through the fronthaul interconnect, optimize the overall system for metrics, such as performance and access latency using trade-off parameters (such as power consumption, overall system efficiency, and a fronthaul schedule program). In some aspects, the interconnect network scheduler can be implemented as a distributed mechanism, which may be inherently part of internal elements of the blocks, and may include routing units, integrated hardware with processing elements, shared resources, I/O devices, and/or software program(s) executed by processing elements.

In accordance with aspects disclosed with reference to FIG. 3, different network topologies (such as can be employed for connecting blocks, the distributed antenna system, and/or other resources within the blocks in FIGS. 10A and 10B) can be representative of data traffic created or used during precoding and/or decoding and can further comprise subnetwork topologies corresponding to partitioned processes (e.g., via data partitioning and/or computation partitioning). FIG. 3 depicts a reconfigurable interconnect network topology and scheduler wherein the scheduler provides control, configuration, and optionally status collection capabilities to and from the network nodes. There can be one or several subnetworks, each consisting of point-to-point interconnects and/or broadcasts. Each communication link can be established via routing elements, which can direct traffic streams to and/or from various processing units, memories, other shared resources, and/or distributed antennas. The quantity, topology and parameters of the links and routing elements can determined at design time and/or dynamically configured.

Network topologies can be classified based on application operation mode and global characteristics, such as bandwidth, latency, and burst behavior. By way of example, different network topologies can be employed to process data corresponding to different OFDM subcarriers, different client devices being served, and/or different antennas in the distributed antenna system. In some aspects, computational partitioning can be performed. Different network topologies can correspond to different component problems. By way of example, a first network topology can be configured for processing CSI. A set of network topologies can be configured for determining precoding weights for each of a plurality of OFDM subcarriers. At least another network topology can be configured for configuring the precoding weights to provide a low-PAPR precoded transmission for one or more antennas and/or devices.

A fronthaul interconnect network schedule program can determine configuration of various nodes that meet concurrent communication traffic requirements of one or several application modes. Alternatively, each application operation mode may have its own schedule program. Configuration and operation of interconnect nodes can be statically determined or dynamically adapted based on the schedule program. The schedule program can organize input and output data for each node into distinct categories based on characteristics of interest, such as bandwidth, latency, ordering for more efficient resource utilization, quality of service, etc.

Mechanisms to employ multiple traffic schedules, including loading and storage of the new schedule programs can be provided. A router in the fronthaul interconnect may provide internal storage, selection, and forwarding of multiple traffic streams from multiple inbound links to multiple outbound links. A router may accommodate multiple traffic types based on a predetermined fabric schedule program.

In some aspects, multiple blocks or components may share a fronthaul interface. As determined by a fronthaul scheduler, a particular link may be used to carry traffic for multiple communicating units at a variety of transfer granularity sizes, service schedules, and/or durations. Multiple links may be selected to operate in tandem to provide required services for incoming or outgoing traffic.

For some topologies, it may be desirable to subdivide a stream into several streams across different links. This enhancement may facilitate potentially more efficient system operation, and each subdivision might be accommodated by a different schedule program. Alternatively, it may be beneficial to aggregate several data streams (possibly corresponding to different topologies) into one stream over a shared link.

Figures 11, 12:
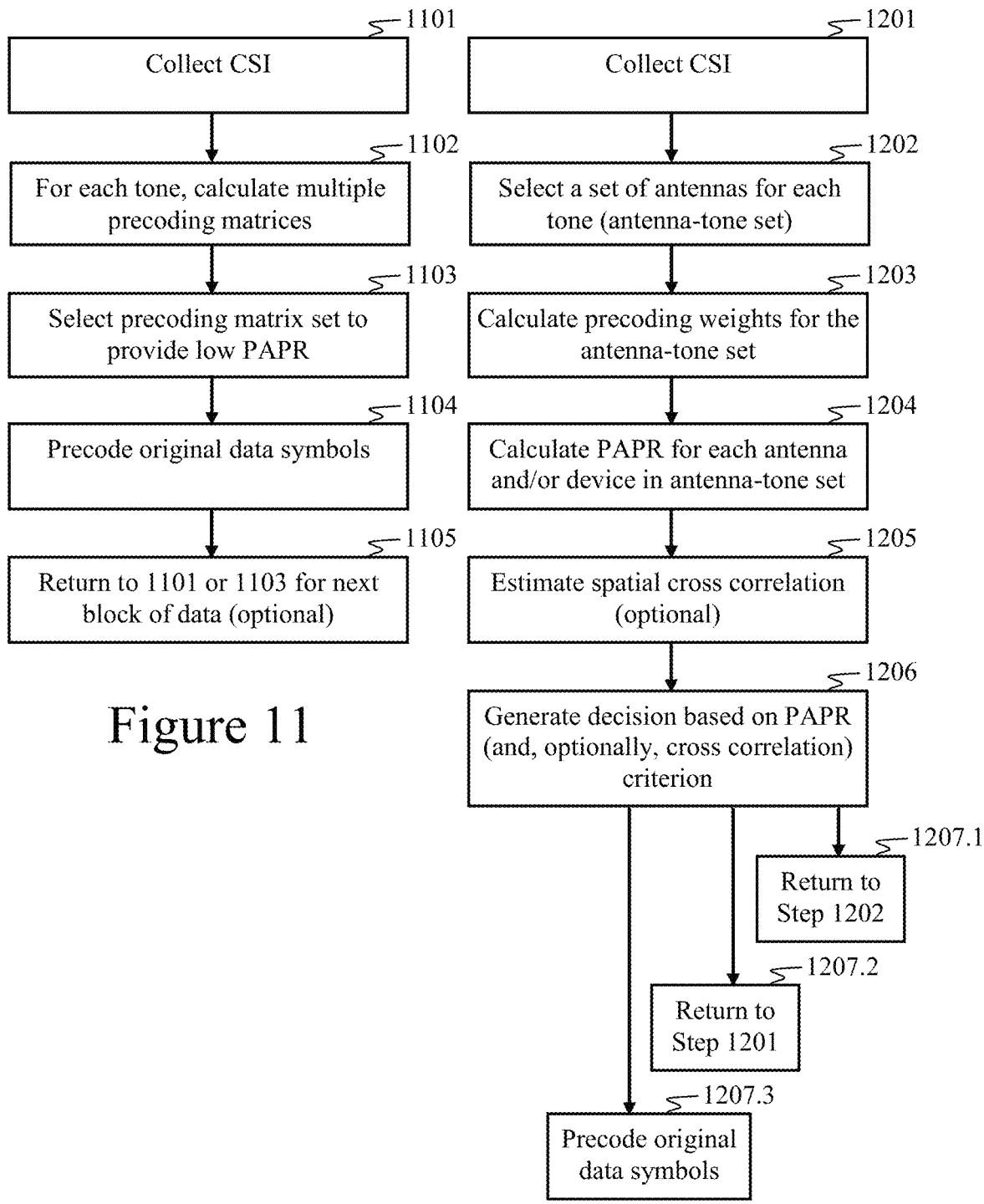
FIG. 11 is a flow diagram that depicts a precoding method in a distributed antenna system in accordance with some aspects of the disclosure.
FIG. 12 is a flow diagram that depicts a precoding method in a distributed antenna system in accordance with some aspects of the disclosure.

FIG. 11 is a flow diagram that depicts a precoding method in a distributed antenna system in accordance with some aspects of the disclosure. CSI for a MIMO-OFDM channel is collected 1101 and is used for calculating multiple precoding matrices 1102 for each tone, each precoding matrix corresponding to a different antenna set. A set of precoding matrices, one for each tone, is selected 1103 according to a predetermined criterion based on PAPR. The selected set of precoding matrices is used to precode a block of the original data symbols 1104. In some aspects, this process may be performed for each of a plurality of original data blocks. Step 1105 provides for returning to step 1101 or step 1102. For example, in one aspect, steps 1103-1104 are repeated for a next block of original data symbols. In some aspects, steps 1101-1104 are repeated for the next block of original data symbols.

As disclosed above, the CSI may comprise measured channel conditions and/or statistical channel conditions. CSI may be inferred from channel measurements. For example, uplink CSI may be inferred from measured downlink CSI (and vise versa). Similarly, CSI corresponding to a particular tone may be interpolated from CSI corresponding to another tone. CSI may be directly measured from training signals (e.g., pilots) received by antennas in the distributed antenna system. In some aspects, CSI may be provided via data directed channel estimation. In some aspects, CSI is measured by devices communicatively coupled to the distributed antenna system via the WWAN and then fed back to the precoder(s) configured to perform the methods disclosed herein. By way of example, in an OFDM system, CSI can comprise flat-fading channel measurements and/or estimates (including statistics) corresponding to at least a subset of the antennas and for each tone.

Based on the CSI, a set of the antennas can be selected for each antenna on a device being served by the distributed antenna system via the WWAN. In some aspects, the device's antenna may be served by a first set of the antennas corresponding to a first tone and a second (different) set of antennas corresponding to a second tone. Some aspects disclosed herein provide for the distributed antenna system comprising a larger number of antennas than the aggregate number of antennas being served. This allows a subset of the antennas of the distributed antenna system to at least equal the aggregate number of antennas being served.

In one aspect, the distributed antenna system comprises a cluster of client devices, and the device(s) being served can comprise any of various antenna systems, including a server-side distributed antenna system, a server-side antenna array, one or more relay antennas, and/or one or more client-device antennas (e.g., a cluster of client devices, a client device antenna array, or some combination thereof). In some aspects, a cluster of devices may cooperate, such as in mesh networks, ad-hoc networks, multi-hop networks, cellular networks, and in other types of networks. In another aspect, the distributed antenna system can comprise a plurality of server-side antennas, including antennas residing on multiple base transceiver stations, and possibly antennas residing on other server-side devices and/or systems, including relays, remote radio heads, and the like. The device(s) being served can include any of the aforementioned client-side, server-side, and/or any intermediary devices.

In step 1102, multiple combinations of serving antennas can be provided for each device (and/or antenna) being served, and there can be multiple combinations of serving antennas per tone per device (and/or antenna) being served. The serving distributed antenna system can comprise a larger number of candidate antennas than the aggregate number of antennas being served, which allows each selected subset of the antennas of the distributed antenna system to at least equal the aggregate number of antennas being served. In some aspects, the number of active antennas in the distributed antenna system serving a cluster of served antennas is larger than the number of antennas in the cluster being served. This results in extra degrees of freedom which are ordinarily used for array processing purposes, such as to provide added antenna-array gain, diversity, redundancy, and the like. Aspects of the disclosure can exploit these extra degrees of freedom to reduce PAPR of the transmissions from each antenna and/or device. For example, the extra degrees of freedom can provide for adaptations to the precoding matrix which can achieve objectives, such as low PAPR, that are not directly related to array processing performance.

In some aspects, additional degrees of freedom can be achieved by employing extra spectrum, which may include extra tones, for transmission. By way of example, the IDFT can be configured to employ extra tones in order to reduce the PAPR of the transmitted OFDM signal. In one aspect, the extra tones might be transmitted in a manner that avoids interfering with the WWAN system. For example, the extra tones may comprise unscheduled resources in the WWAN. In another case, the extra tones may comprise WWAN control channels which are not transmitted during the uplink timeslot. In some aspects, the extra tones can correspond to a different communication system other than the WWAN. In these aspects, the extra tones can be weighted such as to reduce PAPR of the transmitted signals. In another aspect, the extra tones might comprise pilot tones, and data corresponding to weights applied to the pilots tones such as to reduce the PAPR may be communicated to the receive side such that the receive side can compensate for the weights in the received pilots. In such aspects, some data bandwidth is sacrificed to improve PAPR performance.

In some aspects disclosed herein, additional spectral bandwidth can be used to help reduce PAPR. However, the additional spectral bandwidth does not need to comprise tones. In some aspects, signals employed for reducing the PAPR can be pseudo-orthogonal or non-orthogonal relative to the spread-OFDM signal.

In one aspect of the disclosure, step 1102 comprises generating multiple precoding matrices for at least one tone such that each precoding matrix achieves a predetermined minimum cross correlation between subspace channels. By way of example, the degree of cross correlation can be determined based on spatial subchannel eignevalues.

In step 1103, a precoding matrix set can comprise one precoding matrix per tone. For each set, the PAPR for each antenna and/or device can be determined for the precoded transmission across the full set of tones. At least one PAPR criterion based on these PAPRs can be determined, and the precoding matrix set qualifying as "low PAPR" based on the at least one PAPR criterion can be selected.

It should be appreciated that in some aspects, step 1102 depends on the CSI but not on the data block being precoded, so it may be updated based on the channel conditions changing (such as may be determined by coherence time or some similar channel characterization). Step 1103 might depend on the data block being precoded, and may be repeated for each block of original data symbols to be precoded. In some aspects, step 1102 may be repeated for each block. For example, given a new block of original data symbols, a new set of precoding matrices may be selected. This can include adapting previous precoding matrices.

In some aspects, steps 1102 and 1103 can be combined in an iterative process wherein the precoding matrices are adapted and the PAPR criterion for the adapted set is evaluated, and the process is repeated until a predetermined criterion is satisfied, such as a maximum number of iterations, an elapsed amount of time, a predetermined PAPR threshold, or the like. In some aspects, step 1103 comprises selecting a precoding matrix set from multiple sets which correspond to a best PAPR. In some aspects, step 1102 can comprise adapting the matrices according to one or more adaptation schemes. By way of example, an adaptation scheme may comprise randomly adapting at least one precoding weight, adapting precoding weights in response to how a previous adaptation changed a metric (such as PAPR, cross correlation, etc.), and/or adapting at least one precoding weight according to a measured characteristic of the channel and/or original data symbols. In some aspects, certain configurations of CSI values and/or data can be used to determine how to adapt the precoding matrices. Such adaptations may be determined, based on a given configuration(s), to have a high probability of yielding a lower PAPR. Such determinations may be based on historical data, perhaps being associated with correlated behaviors and/or identified trends, and/or they may be determined analytically.

In some aspects, favorable cross correlation can be sacrificed for favorable PAPR, or vise versa. In some aspects, it should be appreciated that the low PAPR criteria may be weighted with respect to particular antennas and/or devices that are transmitting the precoded signals. For example, in one aspect, low PAPR can be more important for battery-powered transceivers.

Thus, a precoding matrix set may be selected that allows for higher PAPR among devices that receive line power to enable lower PAPR among devices that are battery powered. In some aspects, the transmit power of each device may determine how important it is to be provided with a low-PAPR coded signal. For example, devices that are currently transmitting with low transmit power might tolerate a high-PAPR transmission better than devices transmitting at high power. In some aspects, the inherent PAPR of the modulation constellation being used by each device may determine the low-PAPR criterion. In some aspects, power consumption per device may be employed to determine the PAPR criterion. For example, it may be important to provide for uniform power consumption across the transmitting devices. In some aspects, the type of device for each transmitting device may be used to determine its weight in the low-PAPR criterion. In some aspects, an operating status of a device may be used to determine its weight. For example, it may be more important for devices with low battery power to be provided with low-PAPR coded signals. It should be appreciated that other operating parameters and device characteristics may be employed to determine the low-PAPR criterion.

FIG. 12 is a flow diagram that depicts a precoding method in a distributed antenna system in accordance with some aspects of the disclosure. CSI for a MIMO-OFDM channel is collected 1201 and can be used for selecting a set of antennas for each tone 1202. Precoding weights are calculated for each antenna-tone set (i.e., a set of antennas for each tone) 1203. PAPR is calculated 1204 for each active antenna and/or device in the distributed antenna system. Spatial cross correlations of the weighted transmissions may optionally be calculated 1205. A decision is based on the PAPR (and optionally the cross correlations) 1206, and the decision determines where control is transferred to in the flow diagram.

In one aspect, if the decision 1206 indicates that a PAPR criteria is not met with the current antenna-tone set, the method returns to step 1202 (indicated by decision result 1207.1) in order to select a new antenna-tone set. In some aspects, step 1207.1 can comprise sending information (such as decision information, precoding weights, cross correlation information, and/or instructions for selecting the new antenna-tone set) to step 1202.

In another aspect, the decision 1206 can cause control to return to step 1201 via step 1207.2. For instance, decision 1206 can comprise a determination of whether the CSI needs to be updated. In some aspects, the CSI is collected 1201 based on a predetermined time interval, when measured reference signals indicate a sufficient change in the channel state, for each block of original data symbols, or via some other criteria or mechanism.

In another aspect, the decision 1206 can cause control to transfer to block 1207.3 wherein a set of precoding weights is selected to precode the original data symbols. For example, when a predetermined PAPR criterion is met, the original data symbols are precoded 1207.3 using the weights that satisfy the criterion. The weights may be selected from weights of a corresponding antenna-tone set that best satisfies the PAPR criterion after a predetermined number of iterations, or the weights may satisfy the PAPR criterion, at which point the iterations cease and control is transferred to block 1207.3. In some aspects, additional criteria may be employed in the decision 1206 as described above, and when those criteria are satisfied, the original data symbols are precoded 1207.3.

In one aspect, step 1202 comprises selecting a destination group of antennas. For example, a server-side system can select which client devices it will serve for a given set of distributed antennas. Optionally, this can be done for each OFDM tone or set of tones. In some aspects, the selected client devices comprise a cluster (which may be in close geographical proximity with each other), such as may be advantageous when the client devices are configured to perform client-side Cooperative MIMO. In other aspects, the selected clients may be geographically distributed, such as to ensure that reused frequency channels are uncorrelated. In some aspects, a similar decision on destination antennas is made by a cluster of client devices, such as a local group of UE's communicatively coupled together and configured to perform client-side Cooperative MIMO. The system (or cluster) can then select which antennas in its distributed antenna system to serve each destination antenna (or device), and this selection can be made for each tone or set of tones. For at least one tone, the selection can comprise a number of candidate distributed antennas that is greater than the channel-matrix rank necessary to provide a sufficient number of spatial subchannels to serve the destination antennas. For example, the number of transmitting antennas can be greater than the number of receiving antennas.

As described in the patents and applications incorporated by reference, the selection of spectral components (e.g., OFDM tones) and their association with particular wireless terminals can be performed to optimize WWAN system performance relative to the current WWAN channel. For example, the spectral components can be selected to minimize the effects of deep fades and/or interference. Spectral-component selection (e.g., scheduling) may be selected and/or adapted to optimize one or more WWAN link-performance metrics, including, but not limited to, SNR, BER, PER, and throughput. Spectral-component selection may be performed to achieve other objectives, such as to distribute processing loads across devices.

In accordance with certain aspects of the disclosure, scheduling can comprise one of two types of subcarrier mapping. Localized mapping comprises a contiguous block of subcarriers (e.g., a continuous frequency band), whereas distributed mapping comprises a non-contiguous (e.g., discontinuous, or frequency-interleaved) set of subcarriers. With localized subcarrier mapping, it is possible to exploit frequency selective gain via channel-dependent scheduling (e.g., assigning uplink frequencies to each UE based on favorable channel conditions).

A set of precoding matrices, one for each tone, can be calculated 1203 according to a predetermined criterion based on PAPR. In accordance with some aspects of the disclosure, a precoder configures the precoding matrix to provide a spread-OFDM transmission(s) with low PAPR. By way of example, low PAPR can be achieved by selecting appropriate spreading codes (such as may be based on number of OFDM tones and tone spacing) and properly configuring the order in which spread data symbols are mapped to particular tones. The spreading codes can be generating using a DFT that is configured with appropriate input parameters. Thus, the precoder can provide for frequency-domain synthesis to generate a spread-OFDM signal that comprises a set of contiguous and/or non-contiguous OFDM tones. In aspects wherein the precoder is configured to perform MIMO subspace precoding in addition to spread-OFDM coding, the precoder can be configured to produce low-PAPR transmissions, such as by employing the methods corresponding to FIGS. 11-13. In some aspects, the precoder can adapt the transmit power of certain spatial subchannels in order to effect changes in the aggregate PAPR. By way of example, the precoder can scale the weights of a particular eigenvector to adjust power in the corresponding spatial direction.

The selected set of precoding matrices is used to precode a block of the original data symbols, and then the PAPR of each precoded transmission (such as transmitted by each transmitting antenna or device) can be calculated 1204, such as by aggregating precoded signals across all the tones allocated to the antenna or device. In some aspects, the PAPR (and thus the precoding) may be specific to each block of original data symbols, so this process may be performed for each original data block.

As precoding is adapted to reduce the PAPR of the spread-OFDM signal(s), there can be a tradeoff between desirable PAPR and spatial correlation attributes. Estimating the spatial correlation 1205 can be performed, which in one sense can be regarded as a measure of code cross-correlation, which can be used to characterize orthogonality of the codes. Although many different techniques can be employed for determining the spatial correlation 1205, it should be appreciated that spatial correlation depends on the eigenvalue distributions of the correlation matrices. Each eigenvector represents a spatial direction of the channel, and its corresponding eigenvalue describes the average channel/signal gain in this direction. For example, for the transmit-side spatial correlation matrix, it describes the average gain in a spatial transmit direction. In some aspects, both transmit-side and receive-side spatial correlation matrices are determined. In some aspects, step 1205 can comprise determining some value derived from or otherwise based on spatial correlation. For example, channel capacity, which depends on spatial correlation, might be determined instead.

Figure 13:
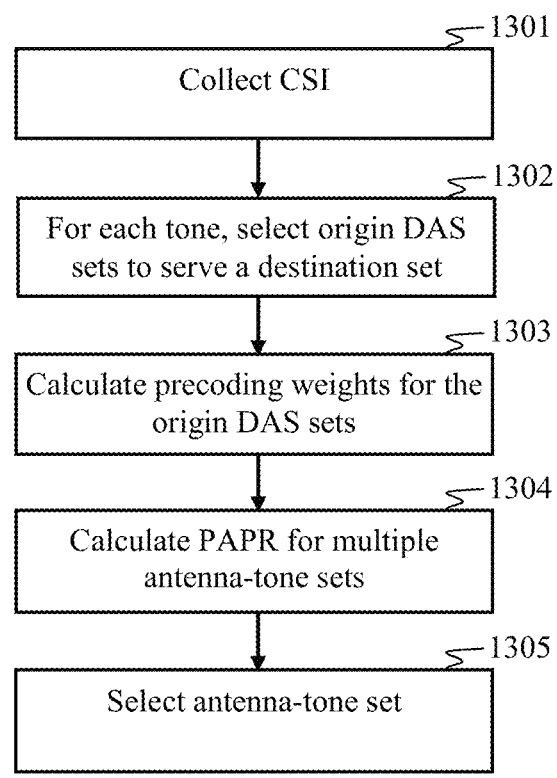
FIG. 13 is a flow diagram that depicts a precoding method in a distributed antenna system in accordance with some aspects of the disclosure.

FIG. 13 is a flow diagram that depicts a precoding method in a distributed antenna system in accordance with some aspects of the disclosure. CSI is collected 1301, and then for each OFDM tone, a set of antennas in an origin distributed antenna system is selected to serve a set of destination antennas 1302. Precoding weights are calculated for each origin set 1303. PAPR is calculated for each antenna (and/or device) in the origin set 1304. After one or more iterations, one of the origin sets is selected 1305 to be used for precoding.

In one aspect of the disclosure, a set of UEs comprises the distributed antenna system, and the method depicted in FIG. 13 provides for precoding uplink transmissions from the UEs to a set of eNodeBs. For each of a plurality $N_{tones}$ of OFDM tones, step 1302 provides for selecting a number $N_{sets}(n_{tones})$ of f different UE sets to transmit pre-coded signals, where a particular number $N_{sets}(n_{tones})$ denotes a number of UE sets corresponding to an $n_{tones}^{th}$ OFDM tone. For each of the $N_{tones}$ tones, step 1303 calculates precoding weights for all the corresponding UE sets. If there are $N_{sets}$ UE sets for each of the $N_{tones}$ OFDM tones, then there might be up to a total of $N_{sets} \cdot N_{tones}$ precoding matrices. A combination of precoding matrices is provided by selecting one precoding matrix for each of the $N_{tones}$ OFDM tones. Step 1304 provides for calculating the PAPR for each of multiple combinations of the precoding matrices. By way of example, a PAPR can be calculated from an IDFT of a set of spread original data symbols comprising the original data symbols spread by a corresponding precoding matrix.

Step 1305 can comprise any of various techniques for selecting an antenna-tone set. For example, if the corresponding combination of precoding matrices satisfies a threshold criterion, such as can be based on PAPR, then the antenna-tone set is selected and the combination of precoding matrices is used to encode the original data symbols. In other aspects, a "best" metric (such as may be based on PAPR) may be determined, such as from an exhaustive search or a combinatorial search. A combinatorial search is one that might exploit one or more pruning strategies to avoid testing all possible candidate combinations. Combinatorial searches can include branch and bound, greedy, local search methods, and a variety of heuristics that use partial knowledge about the structure of the solution space, which can achieve a "good" solution, if not the "best" solution.

The various blocks shown in the figures may be viewed as method steps, and/or as operations that result from operation of computer program code, and/or as a plurality of coupled logic circuit elements constructed to carry out the associated function(s).

In general, the various exemplary aspects may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary aspects of the disclosure may be practiced in various components such as integrated circuit chips and modules, and that the exemplary aspects of this disclosure may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary aspects of this disclosure.

Various modifications and adaptations to the foregoing exemplary aspects of this disclosure may become apparent to those skilled in the relevant arts in view of the foregoing description, when read in conjunction with the accompanying drawings. However, any and all modifications will still fall within the scope of the non-limiting and exemplary aspects of this disclosure.

The invention claimed is:

1. A method of communication performed by a user equipment (UE) in a wireless network, the method comprising:
    employing a plurality of orthogonal polyphase codes to encode a plurality of data symbols for generating a plurality of coded data symbols;
    modulating each of the plurality of coded data symbols onto one of a plurality of orthogonal subcarrier frequencies assigned for use by the UE, for generating an Orthogonal Frequency Division Multiplex (OFDM) signal; and
    transmitting the OFDM signal to a base station in the wireless network;
    wherein each of the plurality of orthogonal polyphase codes comprises a set of linear phase terms, and each phase term in the set of linear phase terms is expressed by $e^{i2\pi kn/N}$, where e is Euler's number, $i=\sqrt{-1}$, $\pi$ is mathematical constant pi, k is an integer that denotes a $k^{th}$ one of the plurality of orthogonal polyphase codes, and n is an integer that denotes an $n^{th}$ one of the set of linear phase terms, where n comprises values from 0 to (N-1), where N is a code length; and
    wherein the plurality of orthogonal polyphase codes includes at least one pair of orthogonal polyphase codes comprising a first code and a second code, the first code being a complex conjugate of the second code.

2. The method of claim 1, wherein the plurality of orthogonal polyphase codes comprises at least one column or row of complex values from a discrete Fourier transform matrix or an inverse discrete Fourier transform matrix.

3. The method of claim 1, wherein each of the plurality of coded data symbols equals an inner product of the plurality of data symbols with one of the plurality of orthogonal polyphase codes.

4. The method of claim 1, wherein the plurality of orthogonal polyphase codes form an orthonormal basis.

5. The method of claim 1, further comprising, before transmitting, adding a cyclic prefix to the OFDM signal.

6. The method of claim 1, wherein the plurality of subcarrier frequencies have one of a set of selectable frequency spacings that comprise integer multiples of a first frequency spacing.

7. The method of claim 1, wherein the OFDM signal comprises one or more pilot tones.

8. The method of claim 1, wherein each of the plurality of orthogonal polyphase codes has a code length N, wherein N equals the plurality of orthogonal subcarrier frequencies.

9. The method of claim 1, wherein the plurality of data symbols equals a number N, the plurality of orthogonal polyphase codes equals N, the plurality of coded data symbols equals N, and the plurality of orthogonal subcarrier frequencies equals at least N.

10. An apparatus for communication by a user equipment (UE) in a wireless network, the apparatus comprising:
at least one processor; and
a non-transitory computer-readable memory coupled to the at least one processor, the non-transitory computer-readable memory including a set of instructions stored therein and executable by the at least one processor for:
employing a plurality of orthogonal polyphase codes to encode a plurality of data symbols for generating a plurality of coded data symbols;
modulating each of the plurality of coded data symbols onto one of a plurality of orthogonal subcarrier frequencies assigned for use by the UE, for generating an Orthogonal Frequency Division Multiplex (OFDM) signal; and
transmitting the OFDM signal to a base station in the wireless network;
wherein each of the plurality of orthogonal polyphase codes comprises a set of linear phase terms, and each phase term in the set of linear phase terms is expressed by $e^{i2\pi kn/N}$, where e is Euler's number, $i=\sqrt{-1}$, $\pi$ is mathematical constant pi, k is an integer that denotes a $k^{th}$ one of the plurality of orthogonal polyphase codes, and n is an integer that denotes an $n^{th}$ one of the set of linear phase terms, where n comprises values from 0 to (N-1), where N is a code length; and
wherein the plurality of orthogonal polyphase codes includes at least one pair of orthogonal polyphase codes comprising a first code and a second code, the first code being a complex conjugate of the second code.

11. The apparatus of claim 10, wherein the plurality of orthogonal polyphase codes comprises at least one column or row of complex values from a discrete Fourier transform matrix or an inverse discrete Fourier transform matrix.

12. The apparatus of claim 10, wherein each of the plurality of coded data symbols equals an inner product of the plurality of data symbols with one of the plurality of orthogonal polyphase codes.

13. The apparatus of claim 10, wherein the plurality of orthogonal polyphase codes are configured to form an orthonormal basis.

14. The apparatus of claim 10, wherein the non-transitory computer-readable memory includes a set of instructions stored therein and executable by the at least one processor for, before transmitting, adding a cyclic prefix to the OFDM signal.

15. The apparatus of claim 10, wherein the plurality of subcarrier frequencies have one of a set of selectable frequency spacings that comprise integer multiples of a first frequency spacing.

16. The apparatus of claim 10, wherein the non-transitory computer-readable memory includes a set of instructions stored therein and executable by the at least one processor for adding one or more pilot tones to the OFDM signal.

17. The apparatus of claim 10, wherein each of the plurality of orthogonal polyphase codes has a code length N, wherein N equals the plurality of orthogonal subcarrier frequencies.

18. The apparatus of claim 10, wherein the plurality of data symbols equals a number N, the plurality of orthogonal polyphase codes equals N, the plurality of coded data symbols equals N, and the plurality of orthogonal subcarrier frequencies equals at least N.

19. A non-transitory computer-readable storage device having computer-readable program code stored therein, the program code containing instructions executable by one or more processors of a computer system to implement a method comprising:
employing a plurality of orthogonal polyphase codes to encode a plurality of data symbols for generating a plurality of coded data symbols;
modulating each of the plurality of coded data symbols onto one of a plurality of orthogonal subcarrier frequencies assigned for use by the UE, for generating an Orthogonal Frequency Division Multiplex (OFDM) signal; and
transmitting the OFDM signal to a base station in the wireless network;
wherein each of the plurality of orthogonal polyphase codes comprises a set of linear phase terms, and each phase term in the set of linear phase terms is expressed by $e^{i2\pi kn/N}$, where e is Euler's number, $i=\sqrt{-1}$, $\pi$ is mathematical constant pi, k is an integer that denotes a $k^{th}$ one of the plurality of orthogonal polyphase codes, and n is an integer that denotes an $n^{th}$ one of the set of linear phase terms, where n comprises values from 0 to (N-1), where N is a code length; and
wherein the plurality of orthogonal polyphase codes includes at least one pair of orthogonal polyphase codes comprising a first code and a second code, the first code being a complex conjugate of the second code.

20. The non-transitory computer-readable storage device of claim 19, wherein the plurality of orthogonal polyphase codes comprises at least one column or row of complex values from a discrete Fourier transform matrix or an inverse discrete Fourier transform matrix.

21. The non-transitory computer-readable storage device of claim 19, wherein each of the plurality of coded data symbols equals an inner product of the plurality of data symbols with one of the plurality of orthogonal polyphase codes.

22. The non-transitory computer-readable storage device of claim 19, wherein the plurality of orthogonal polyphase codes are configured to form an orthonormal basis.

23. The non-transitory computer-readable storage device of claim 19, wherein the program code contains instructions executable by one or more processors of the computer system for adding a cyclic prefix to the OFDM signal before transmitting the OFDM signal.

24. The non-transitory computer-readable storage device of claim 19, wherein the plurality of subcarrier frequencies have one of a set of selectable frequency spacings that comprise integer multiples of a first frequency spacing.

25. The non-transitory computer-readable storage device of claim 19, wherein the program code contains instructions executable by one or more processors of the computer system for adding one or more pilot tones to the OFDM signal.

26. The non-transitory computer-readable storage device of claim 19, wherein each of the plurality of orthogonal polyphase codes has a code length N, wherein N equals the plurality of orthogonal subcarrier frequencies.

27. The non-transitory computer-readable storage device of claim 19, wherein the plurality of data symbols equals a number N, the plurality of orthogonal polyphase codes equals N, the plurality of coded data symbols equals N, and the plurality of orthogonal subcarrier frequencies equals at least N.

\* \* \* \* \*